(12) United States Patent
Kershbaumer et al.

(10) Patent No.: US 12,243,397 B2
(45) Date of Patent: Mar. 4, 2025

(54) SYSTEM, METHOD, AND APPARATUS FOR TRACKING MACHINE USE

(71) Applicant: BARZCASH INC., Levittown, PA (US)

(72) Inventors: James J. Kershbaumer, Langhorne, PA (US); James Peter Kershbaumer, Langhorne, PA (US)

(*) Notice: Subject to any disclaimer, the term of this patent is extended or adjusted under 35 U.S.C. 154(b) by 328 days.

(21) Appl. No.: 18/046,697

(22) Filed: Oct. 14, 2022

(65) Prior Publication Data

US 2024/0127659 A1 Apr. 18, 2024

Related U.S. Application Data

(63) Continuation-in-part of application No. 17/179,811, filed on Feb. 19, 2021, now Pat. No. 11,504,602, which is a continuation-in-part of application No. 17/101,125, filed on Nov. 23, 2020, now Pat. No. 11,348,405, which is a continuation-in-part of application No. 16/662,708, filed on Oct. 24, 2019, now Pat. No. 10,960,291, which is a continuation-in-part of application No. 16/587,278, filed on Sep. 30, 2019, now Pat. No. 10,891,832.

(60) Provisional application No. 62/830,761, filed on Apr. 8, 2019.

(51) Int. Cl.
| G07F 5/02 | (2006.01) |
| A63D 15/20 | (2006.01) |
| G06K 7/14 | (2006.01) |
| G07F 15/00 | (2006.01) |
| G07F 17/28 | (2006.01) |
| G07F 17/32 | (2006.01) |

(52) U.S. Cl.
CPC ............ *G07F 5/02* (2013.01); *A63D 15/20* (2013.01); *G06K 7/1413* (2013.01); *G07F 15/001* (2013.01); *G07F 15/003* (2013.01); *G07F 17/28* (2013.01); *G07F 17/3202* (2013.01)

(58) Field of Classification Search
CPC ........ G07F 5/02; G07F 15/001; G07F 15/003; G07F 17/28; G07F 17/3202; A63D 15/20; G06K 7/1413
USPC ............................................................ 377/7
See application file for complete search history.

(56) References Cited

U.S. PATENT DOCUMENTS

| 3,444,974 | A | * | 5/1969 | Green | G07F 17/38 |
| | | | | | 194/240 |
| 4,355,802 | A | * | 10/1982 | Sargent | A63D 15/20 |
| | | | | | 273/125 A |
| 5,803,451 | A | * | 9/1998 | Kelly | G07F 17/3297 |
| | | | | | 273/123 R |
| 8,016,687 | B2 | * | 9/2011 | Martin | G07F 17/38 |
| | | | | | 473/24 |
| 11,049,083 | B2 | | 6/2021 | Nathan | |

(Continued)

*Primary Examiner* — Allen Chan
(74) *Attorney, Agent, or Firm* — McCarter & English, LLP; James M. Smedley; Alex Korona

(57) ABSTRACT

An electro-mechanical device is disclosed. The electro-mechanical device has an electrical switch and a mechanical meter operably connected to the electrical switch. The mechanical meter includes at least one aperture. The mechanical meter includes at least one movable member having at least one of a plurality of barcodes or a plurality of characters. The at least one of the plurality of barcodes or the plurality of characters is selectively visible through the at least one aperture.

20 Claims, 32 Drawing Sheets

(56) References Cited

U.S. PATENT DOCUMENTS

| | | | |
|---|---|---|---|
| 2005/0215317 A1* | 9/2005 | Gramstrup | G07F 17/32 |
| | | | 463/29 |
| 2006/0121982 A1* | 6/2006 | Martin | G07F 17/38 |
| | | | 463/25 |
| 2008/0195443 A1 | 8/2008 | Nathan | |
| 2009/0170602 A1* | 7/2009 | Martin | G07F 17/3227 |
| | | | 463/39 |
| 2013/0190078 A1* | 7/2013 | Goto | G07F 17/3258 |
| | | | 463/25 |

* cited by examiner

| SW1 | TIME 1 (A) | TIME 2 (B) | FUNCTION |
|---|---|---|---|
| | OFF | OFF | STRAIGHT VEND |
| | OFF | ON | 5 MIN* |
| | ON | OFF | 10 MIN* |
| | ON | ON | 15 MIN* |

| | COIN COUNT (C) | COIN PULSE (D) |
|---|---|---|
| | OFF | OFF |
| | ON | ON |

*ADDITIONAL TIME WITH JP2
- 20 MIN
- 30 MIN
- 45 MIN
- 60 MIN

FIG. 11

| SW2 | COIN 1 (A) | COIN 2 (B) | COIN 3 (C) | COIN 4 (D) | COST |
|---|---|---|---|---|---|
| | OFF | OFF | OFF | OFF | 0.25 |
| | OFF | OFF | ON | OFF | 0.50 |
| | OFF | ON | OFF | OFF | 0.75 |
| | OFF | ON | ON | OFF | 1.00 |
| | ON | OFF | OFF | OFF | 1.25 |
| | ON | OFF | ON | OFF | 1.50 |
| | ON | ON | OFF | OFF | 1.75 |
| | ON | ON | ON | OFF | 2.00 |
| | OFF | OFF | OFF | ON | 2.50 |
| | OFF | OFF | ON | ON | 3.00 |
| | OFF | ON | OFF | ON | 3.50 |
| | OFF | ON | ON | ON | 4.00 |
| | ON | OFF | OFF | ON | 4.50 |
| | ON | OFF | ON | ON | 5.00 |
| | ON | ON | OFF | ON | 5.50 |
| | ON | ON | ON | ON | 6.00 |

FIG. 12

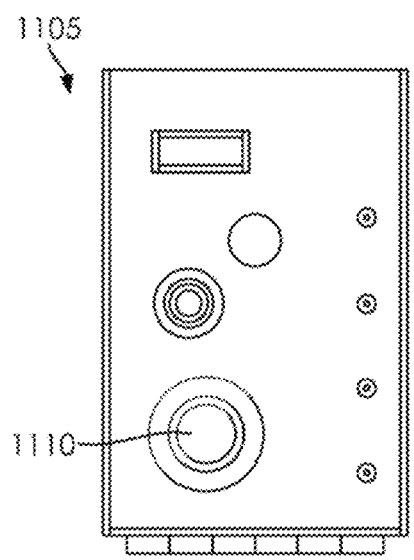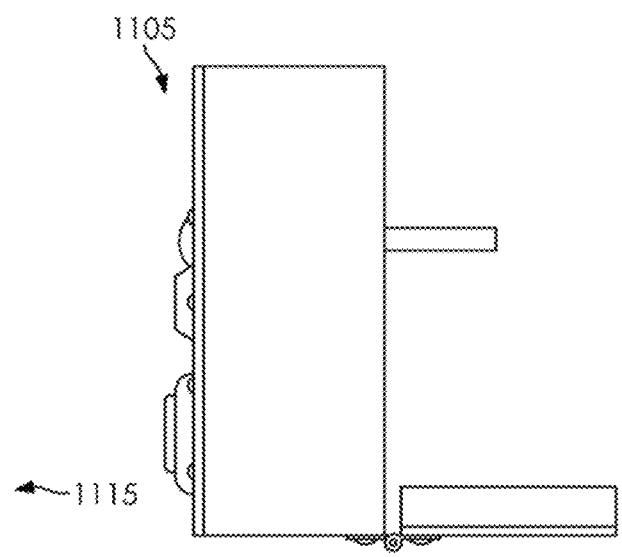
FIG. 21A     FIG. 21B
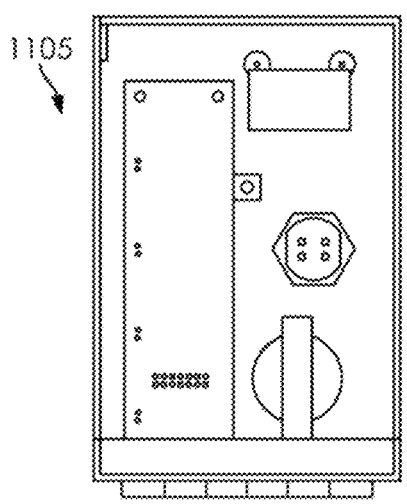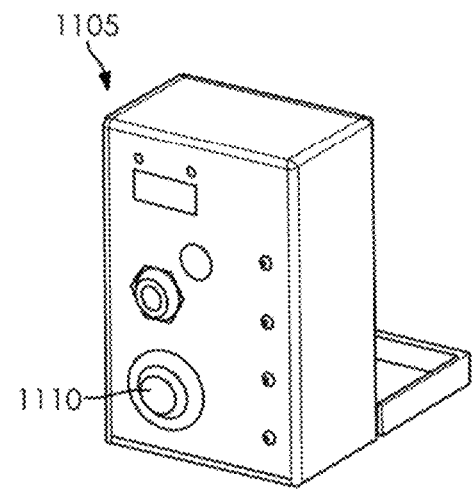
FIG. 21C     FIG. 21D
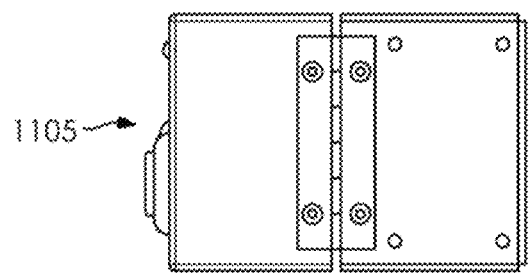
FIG. 21E

| SW1 | TIME 1 (1) | TIME 2 (2) | JP2 | FUNCTION |
|---|---|---|---|---|
| | ON | ON | S | 3 MIN* |
| | ON | OFF | S | 5 MIN* |
| | OFF | ON | S | 10 MIN* |
| | OFF | OFF | S | 15 MIN* |
| | ON | ON | D | 20 MIN |
| | ON | OFF | D | 30 MIN |
| | OFF | ON | D | 45 MIN |
| | OFF | OFF | D | STRAIGHT |

FIG. 22A

| COIN COUNT (3) | COIN PULSE (4) |
|---|---|
| OFF | OFF |
| ON | ON |

FIG. 22B

| SW2 | COIN 1 (1) | COIN 2 (2) | COIN 3 (3) | COIN 4 (4) | COST |
|---|---|---|---|---|---|
| | OFF | OFF | OFF | OFF | 0.25 |
| | OFF | OFF | ON | OFF | 0.50 |
| | OFF | ON | OFF | OFF | 0.75 |
| | OFF | ON | ON | OFF | 1.00 |
| | ON | OFF | OFF | OFF | 1.25 |
| | ON | OFF | ON | OFF | 1.50 |
| | ON | ON | OFF | OFF | 1.75 |
| | ON | ON | ON | OFF | 2.00 |
| | OFF | OFF | OFF | ON | 2.50 |
| | OFF | OFF | ON | ON | 3.00 |
| | OFF | ON | OFF | ON | 3.50 |
| | OFF | ON | ON | ON | 4.00 |
| | ON | OFF | OFF | ON | 4.50 |
| | ON | OFF | ON | ON | 5.00 |
| | ON | ON | OFF | ON | 5.50 |
| | ON | ON | ON | ON | 6.00 |

FIG. 22C

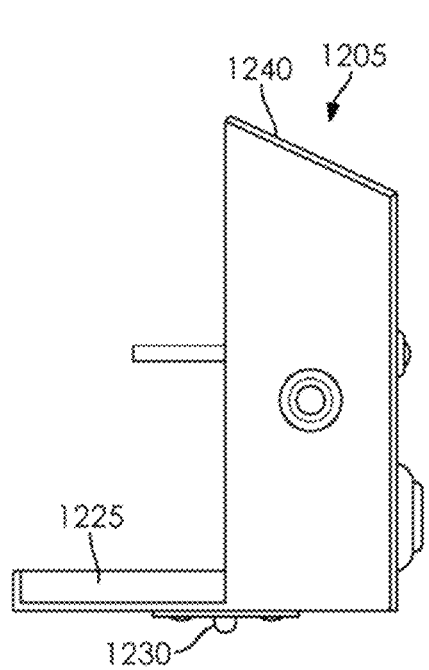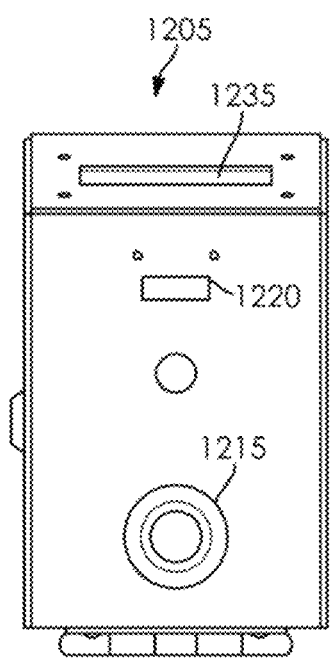
FIG. 23A    FIG. 23B
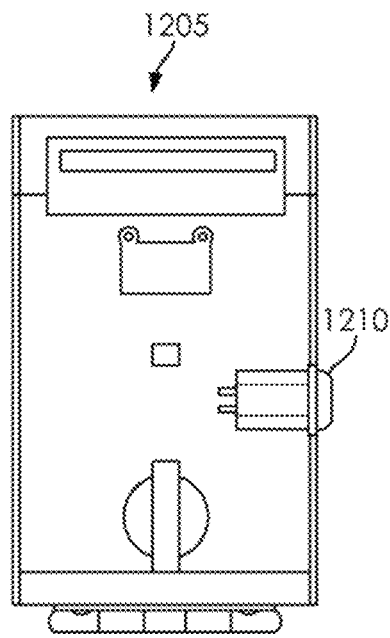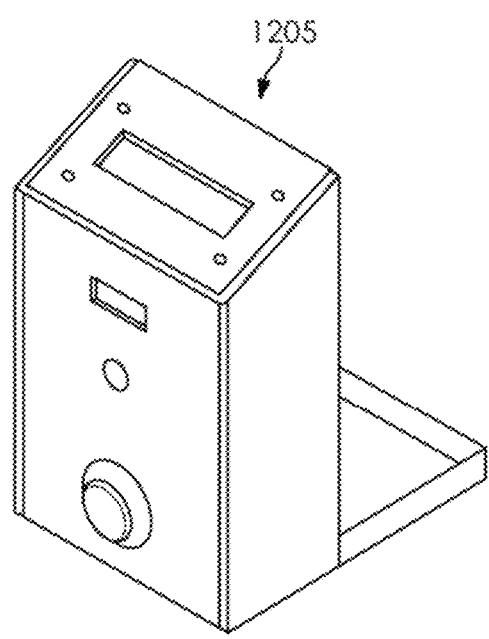
FIG. 23C    FIG. 23D

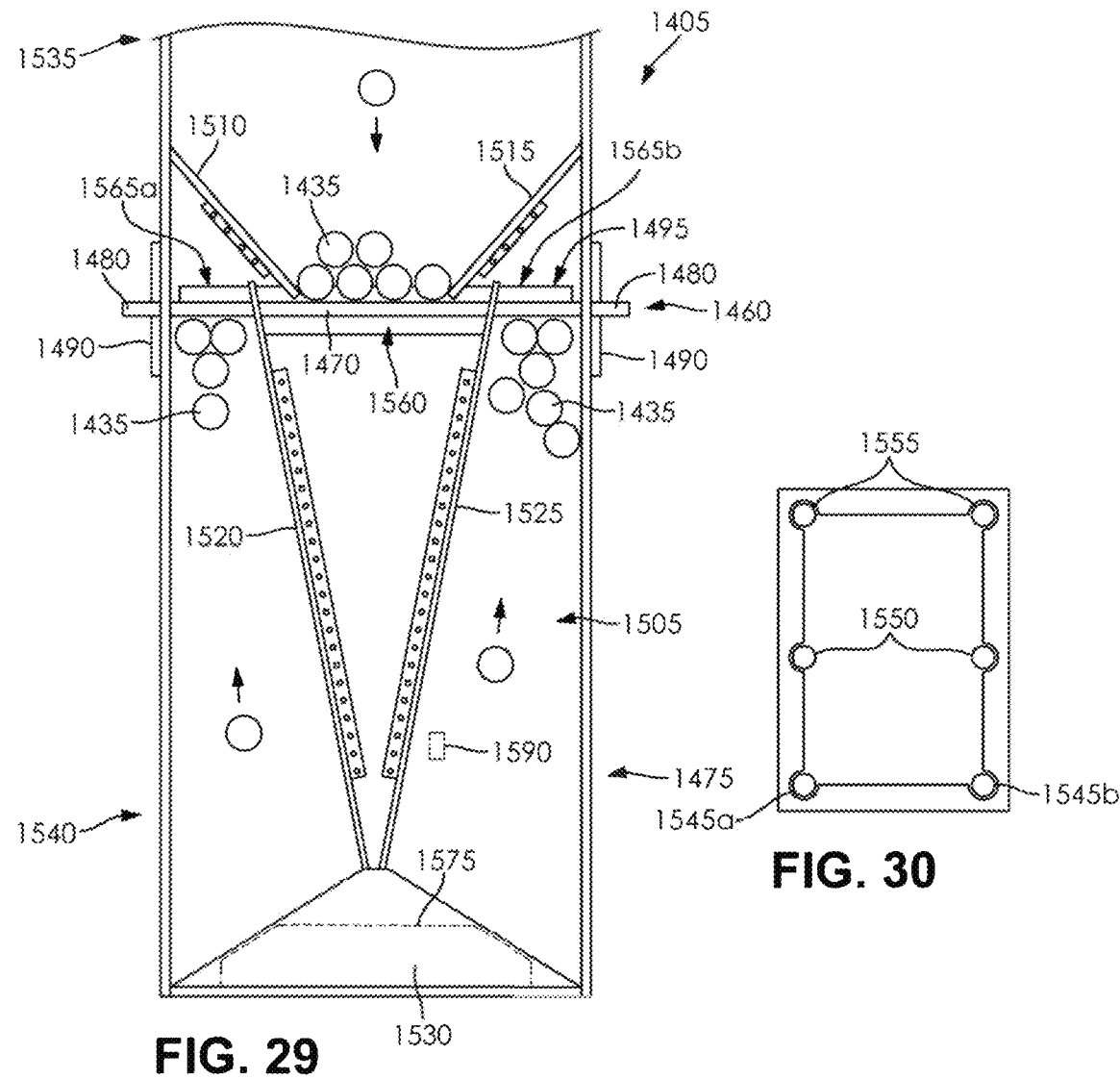
FIG. 29
FIG. 30
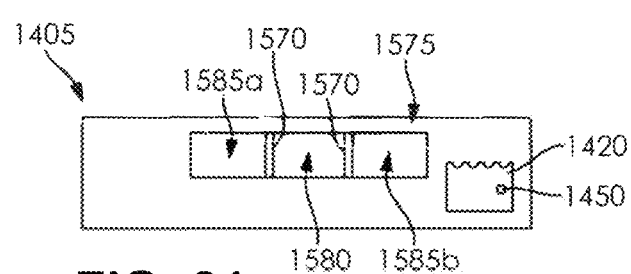
FIG. 31

SYSTEM, METHOD, AND APPARATUS FOR TRACKING MACHINE USE

CROSS-REFERENCE TO RELATED APPLICATIONS

This application claims the benefit of U.S. Nonprovisional patent application Ser. No. 17/179,811 filed on Feb. 19, 2021, which claims priority to U.S. Nonprovisional patent application Ser. No. 17/101,125 filed on Nov. 23, 2020, which claims priority to U.S. Nonprovisional patent application Ser. No. 16/662,708 filed on Oct. 24, 2019 (now U.S. Pat. No. 10,960,291, issued on Mar. 30, 2021), which claims priority to U.S. Nonprovisional patent application Ser. No. 16/587,278 filed on Sep. 30, 2019 (now U.S. Pat. No. 10,891,832, issued on Jan. 12, 2021), which claims priority to provisional application 62/830,761 filed Apr. 8, 2019, the entire disclosure of each of which is incorporated herein by reference.

TECHNICAL FIELD

The present disclosure is directed to a system, method, and apparatus for tracking, and more particularly, to a system, method, and apparatus for tracking machine use.

BACKGROUND OF THE DISCLOSURE

Conventional pool tables such as Diamond pool tables typically include a switch for free play (e.g., payment features are disabled such as during league play) that operates based on initiation via a key. When a pool table switches to free play mode, though, there is no efficient way to track how many games have been played or if the key has been operated to turn off free play at an appropriate time (e.g., when free play is designated to end such as after a pool league time period for pay is over). Also, there is no efficient way to audit the time and/or cash or other payment that goes into the pool table (e.g., whether the play was pay play or free play).

Some conventional pool tables such as Valley, Dynamo, Great American, and other pool table manufactures include side doors where a complete set of pool balls is visible in the table to a user before that user puts his or her money into the table (e.g., to vend) and to drop the pool balls to start a pool game. During periods of designated free play (e.g., when a pool league night occurs), an operator (e.g., a bar owner) typically uses 2 keys to take the side door off each table designated for free play so that pool league players play for free (e.g., or at least do not provide payment to the table). If the door that is removed is not replaced again and locked, then anyone can play for free on the table (until the door is placed back on and locked in place). Accordingly, an amount of free play typically occurs before and after designated free play times such as designated league play times, as the door is typically removed some time before free play is to begin and is typically replaced some time after free play ends. As a result, vendors lose payments that might have been received based on the extended free play times involved with removing and replacing the doors.

Conventional pool tables and techniques also involve additional costs incurred based on typical free play (e.g., league play) operation. Operators may have to cover pool tables (e.g., repair or replace covers) and maintain (e.g., repair and replace) rubber cushions of conventional tables based on excessive game play and use of tables that occurs during free play such as league play. For example, additional repair, maintenance, and part replacement is caused based on significant amounts of table use that occurs during free play such as league play. Although operators such as bar owners may make up the increased cost of repair and maintenance by selling food and drinks to league customers, the additional costs reduce profits made by operators.

Some conventional pool tables such as tables manufactured by Valley and Dynamo attempt to control free play such as by pool leagues. These tables included a motor with a small electronic board and a bill verifier. This type of table is programmed to open the window described above for free play such as during pool league play. However, because pool league times constantly change and players often demand practice time, the windows are typically not opened at desired times. As a result, free play may not occur at or may exceed the designated times using the conventional tables. Also, once the pool table opens for free play, there is still no efficient way to track how many games are played using conventional pool tables and techniques. Also, the bill verifier installed on the conventional table uses a significant amount of battery power and typically runs out of power before it can be recharged. When the battery lacks sufficient power or charge, the window described above may open or fall off of free play and not provide free play as programmed. Alternatively, to keep the battery charged, a power cord is typically run across a floor, which presents an undesirable obstruction or tripping hazard to players.

Accordingly, conventional pool tables and techniques do not efficiently and effectively track pool league play and do not control a period of time of free play (when and how long). Also, conventional pool tables and techniques do not control how many games of pool are actually played during free play such as league play.

Also in the area of automated teller machines (ATMs), machines have flaws that create variabilities for employee theft and removal of ATMs from locations (e.g., employee unauthorized vault access). Locations at which ATMs are installed also pose a risk of theft when a loss of power or electricity occurs at the location. For example, when an ATM company sends an employee to fill an ATM, conventional systems do not provide a way to track (e.g., exactly track) when that employee arrived or left the location.

The exemplary disclosed system, method, and apparatus of the present disclosure is directed to overcoming one or more of the shortcomings set forth above and/or other deficiencies in existing technology.

SUMMARY OF THE DISCLOSURE

In one exemplary aspect, the present disclosure is directed to an operation assembly for a game assembly. The operation assembly includes an actuating assembly, an electric relay that is electrically connected to the actuating assembly, a tracking device that is electrically connected to the electric relay, and a display assembly that is selectively electrically connected to the electric relay. The display assembly is configured to transfer an electrical pulse from the display assembly to the tracking device via the electric relay. The actuating assembly performs an operation when the electrical pulse is transferred to the tracking device. The operation includes activating one or more actuators of the actuating assembly to move a structural member of the actuating assembly. The structural member is disposed at an elongated slot of the game assembly.

In another exemplary aspect, the present disclosure is directed to a method. The method includes providing a tracking device at a gaming table, providing an actuating assembly at a structural frame within the gaming table, the structural frame configured to guide a movement of a first and second plurality of gaming objects within the gaming table, selectively blocking the first and second plurality of gaming objects from falling into an elongated slot of the structural frame and selectively allowing the first and second plurality of gaming objects to fall into the elongated slot based on actuating the actuating assembly based on an electrical signal received by the tracking device, providing a first separate portion and a second separate portion in the elongated slot, guiding the first plurality of gaming objects to a first separate user-accessible cavity portion via the first separate portion, and guiding the second plurality of gaming objects to a second separate user-accessible cavity portion via the second separate portion.

In another exemplary aspect, the present disclosure is directed to a tracking apparatus for a machine having an operation assembly. The tracking apparatus includes an electric relay configured to be connected to the operation assembly, a tracking device that is connected to the electric relay, and a display assembly that is selectively connected to the electric relay. The display assembly is configured to transfer an electrical pulse from the display assembly to the tracking device via the electric relay. The operation assembly performs an operation when the electrical pulse is transferred to the tracking device. The operation includes activating one or more actuators to move the operation assembly that is a structural member.

In another exemplary aspect, the present disclosure is directed to a method. The method includes providing an operation assembly of a game machine, connecting an electric relay to the operation assembly, connecting a tracking device to the electric relay, and selectively connecting a display assembly to the electric relay. The method also includes transferring an electrical pulse from the display assembly to the tracking device via the electric relay, actuating the operation assembly that is a structural member by actuating one or more solenoids when the electrical pulse is received by the tracking device, and counting the electrical pulse with the tracking device.

In another exemplary aspect, the present disclosure is directed to a tracking apparatus for a machine having an operation assembly. The tracking apparatus includes an electric relay configured to be connected to the operation assembly, a tracking device that is connected to the electric relay, and a display assembly that is selectively connected to the electric relay. The display assembly is configured to transfer an electrical pulse from the display assembly to the tracking device via the electric relay. The operation assembly performs an operation when the electrical pulse is transferred to the tracking device. The tracking device counts the electrical pulse.

In another exemplary aspect, the present disclosure is directed to a method. The method includes providing an operation assembly of a game machine, connecting an electric relay to the operation assembly, connecting a tracking device to the electric relay, selectively connecting a display assembly to the electric relay, transferring an electrical pulse from the display assembly to the tracking device via the electric relay, actuating the operation assembly when the electrical pulse is received by the tracking device, counting the electrical pulse with the tracking device, and activating an indicator of the display assembly when the electrical pulse is received by the tracking device.

In another exemplary aspect, the present disclosure is directed to a tracking apparatus for a machine having an operation assembly. The tracking apparatus includes an electric relay configured to be connected to the operation assembly, a tracking device that is connected to the electric relay, and an electronic payment device that is connected to the electric relay. The electric relay is configured to transfer a first electrical pulse from the operation assembly to the tracking device. The electric relay is configured to transfer a second electrical pulse from either the electronic payment device or the operation assembly to the tracking device. The relay transfers the first electrical pulse or the second electrical pulse when the operation assembly performs an operation.

In another exemplary aspect, the present disclosure is directed to a method. The method includes providing an operation assembly of a game machine, connecting an electric relay to the operation assembly, connecting a tracking device to the electric relay, and connecting an electronic payment device to the electric relay. The method also includes transferring a first electrical pulse from the operation assembly to the tracking device via the electric relay, transferring a second electrical pulse from either the electronic payment device or the operation assembly to the tracking device via the electric relay, and transferring the first electrical pulse or the second electrical pulse when the operation assembly releases at least one playing object of the game machine.

In another exemplary aspect, the present disclosure is directed to an electro-mechanical device. The electro-mechanical device includes an electrical switch and a mechanical meter operably connected to the electrical switch. The mechanical meter includes at least one aperture. The mechanical meter includes at least one movable member having at least one of a plurality of barcodes or a plurality of characters. The at least one of the plurality of barcodes or the plurality of characters is selectively visible through the at least one aperture.

In another exemplary aspect, the present disclosure is directed to a method. The method includes providing an electrical switch, providing a mechanical meter including at least one aperture and at least one movable member having a plurality of barcodes, selectively displaying the plurality of barcodes through the at least one aperture based on moving the at least one movable member, and actuating the electrical switch based on moving the at least one movable member.

BRIEF DESCRIPTION OF THE DRAWINGS

Accompanying this written specification is a collection of drawings of exemplary embodiments of the present disclosure. One of ordinary skill in the art would appreciate that these are merely exemplary embodiments, and additional and alternative embodiments may exist and still within the spirit of the disclosure as described herein.

FIG. 11 is a chart illustration of an exemplary embodiment of the present disclosure;

FIG. 12 is a chart illustration of an exemplary embodiment of the present disclosure;

FIG. 21A is a front illustration of an exemplary embodiment of the present disclosure;

FIG. 21B is a side illustration of an exemplary embodiment of the present disclosure;

FIG. 21C is a rear illustration of an exemplary embodiment of the present disclosure;

FIG. 21D is a perspective illustration of an exemplary embodiment of the present disclosure;

FIG. 21E is a bottom illustration of an exemplary embodiment of the present disclosure;

FIG. 22A is a chart illustration of an exemplary embodiment of the present disclosure;

FIG. 22B is a chart illustration of an exemplary embodiment of the present disclosure;

FIG. 22C is a chart illustration of an exemplary embodiment of the present disclosure;

FIG. 23A is a side illustration of an exemplary embodiment of the present disclosure;

FIG. 23B is a front illustration of an exemplary embodiment of the present disclosure;

FIG. 23C is a rear illustration of an exemplary embodiment of the present disclosure;

FIG. 23D is a perspective illustration of an exemplary embodiment of the present disclosure;

FIG. 29 is a top view of an exemplary embodiment of the present disclosure;

FIG. 30 is a schematic illustration of an exemplary embodiment of the present disclosure;

FIG. 31 is a front view of an exemplary embodiment of the present disclosure;

DETAILED DESCRIPTION AND INDUSTRIAL APPLICABILITY

The exemplary disclosed system, method, and apparatus may include a component and/or application (e.g., app such as a Pay Range app) that may be operably connected (e.g., hooked up) to any pay pool table such as a coin-operated pool table (e.g., coin-operated Diamond pool table or other suitable mechanical pool table). In at least some exemplary embodiments, the component and/or application may be any suitable payment network component and/or application for coin-operated machines. For example, the exemplary component and/or application may be a Pay Range Blue Key Plus component and relay board. Also for example, the exemplary disclosed system, method, and apparatus may include a universal board (e.g., a BarZcash Universal Board) for connecting any suitable component (e.g., a beacon, a debit/credit card readers, or a Near Field Communication receivers) to any suitable machine.

Figure 1:
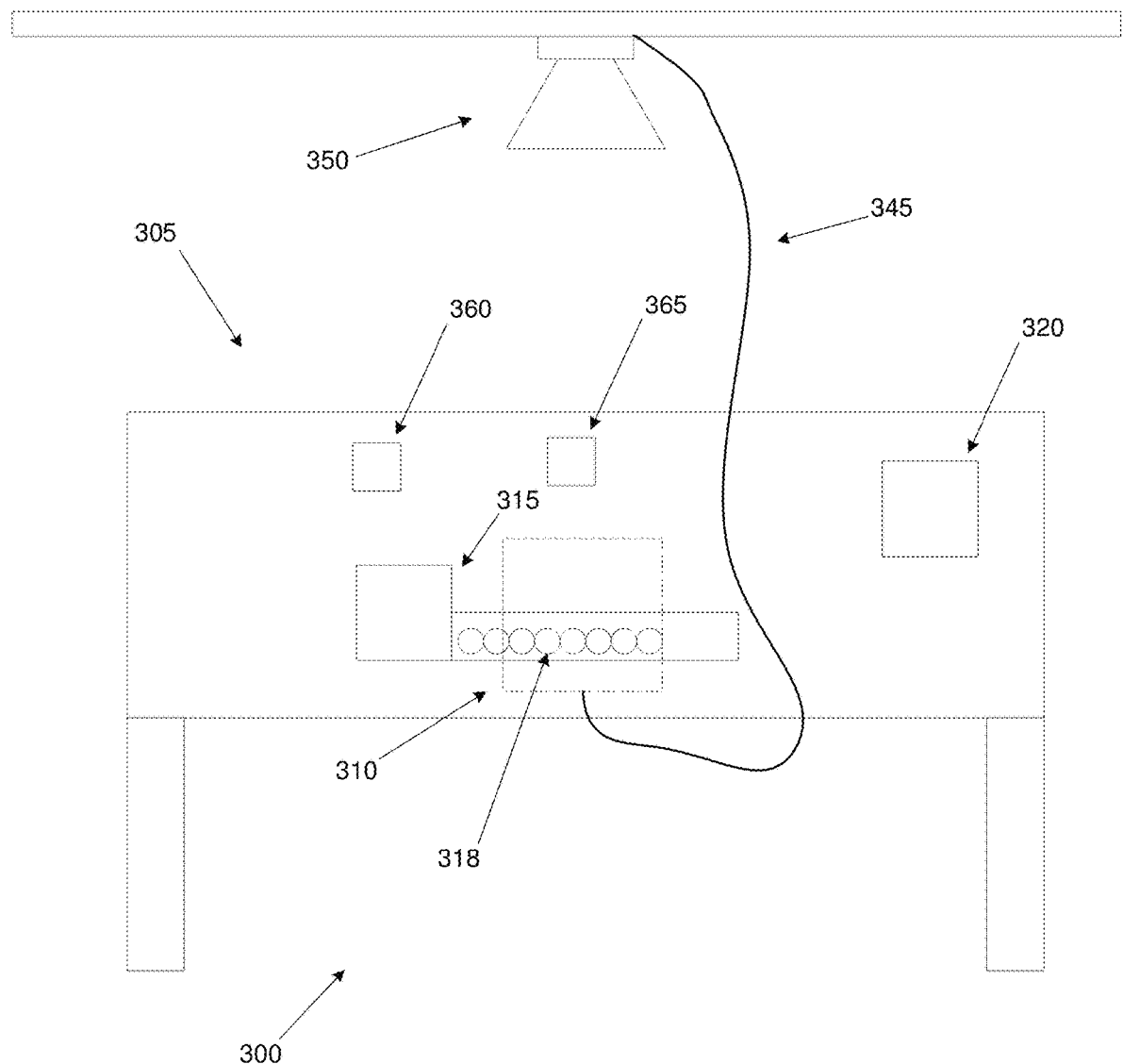
FIG. 1 is a schematic illustration of an exemplary embodiment of the present disclosure.

In at least some exemplary embodiments and as illustrated in FIG. 1, an exemplary system 300 may include a machine 305 and a tracking system 310. Tracking system 310 may track a use (e.g., machine use) of machine 305. For example, tracking system 310 may track a number of times and/or a length of time machine 305 is used, an amount of money paid to machine 305 (e.g., by coin, currency, or electronic payment as described for example herein), an amount of material or goods dispensed by machine 305, and/or any other suitable measure of an operation of machine 305. Tracking system 310 may be disposed within and/or on machine 305. In at least some exemplary embodiments, tracking system 310 may be disposed partially or substantially entirely within machine 305.

In at least some exemplary embodiments, the exemplary disclosed machine (e.g., machine 305) may be a coin-operated and/or bill-operated device such as a pool or billiards table, an arcade or game center device (e.g., air hockey or any other desired machine), a machine for shaping and stamping coins (e.g., souvenir penny), a laundry machine, gambling machine such as a slot machine, and/or any other desired machine that may operate based on inserting coins, bills, or other forms of payment (e.g., electronic payment). The exemplary disclosed machine may also be a machine used for efficient parking at stadiums, arenas, parking garages, designated municipal parking, and/or other suitable locations for parking vehicles. For example, a parking gate may be raised once the exemplary disclosed system or machine receives data that a fee was paid to park. The exemplary disclosed machine may also be an automated teller machine (ATM).

Machine 305 may include an operation assembly 315. Operation assembly 315 may be any suitable assembly that performs an operation of machine 305 such as, for example, an assembly that drops or provides a play ball or balls, dispenses a material, good, or product, provides an interaction with a user, allows a user to utilize or play machine 305, and/or any other suitable operation. Operation assembly 315 may release one or more objects 318 (e.g., from a cavity of machine 305). Object 318 may be any suitable object such as a ball (e.g., a pool ball) or any other suitable playing object, a product (e.g., such as a vending machine snack, candy, or an electronic device), material, fluid such as a brewed beverage, currency or money, or any other desired object. For example, operation assembly 315 may be a switch of a pool table that releases or drops objects 318 that may be pool balls from a cavity of machine 305 for playing a game of pool or billiards when machine 305 may be a pool table. Operation assembly 315 may be configured to receive cash (e.g., coins and/or currency such as bills). For example, operation assembly 315 may include a mechanical coin slot and/or bill receiver assembly that may be actuatable by a user. For example, a user may insert coins into operation assembly 315 and push a component in or out to insert the coins into machine 305, which may cause operation assembly 315 to operate (e.g., drop pool balls, provide a material, product, or good, allow a user to operate machine 305, and/or any other suitable operation). In at least some exemplary embodiments, operation assembly 315 may be a mechanical push slot into which a user may insert money to cause machine 305 that may be a pool (table) machine to drop pool balls for use by players.

Figure 2:
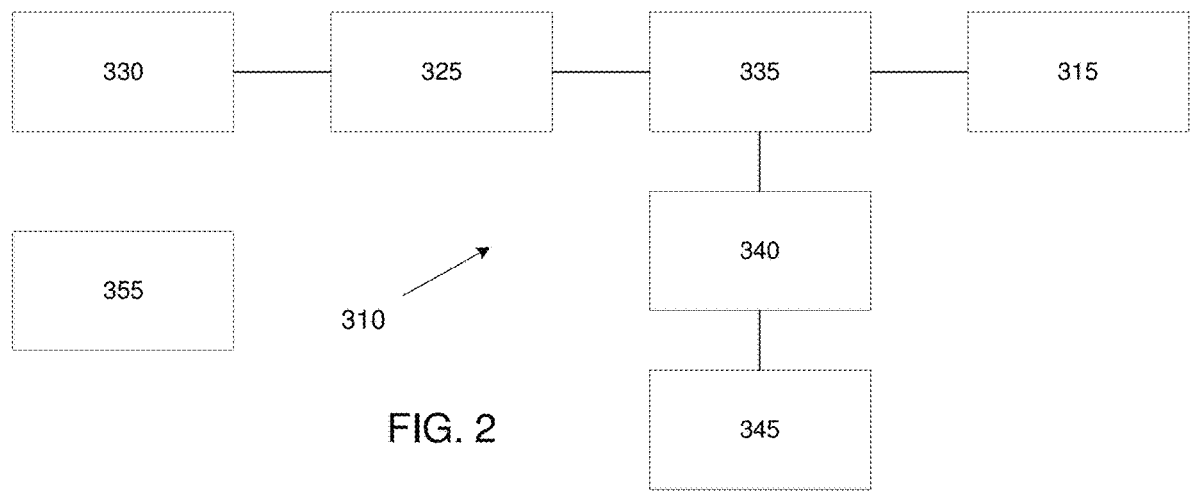
FIG. 2 is a schematic illustration of an exemplary embodiment of the present disclosure.
Figure 3:
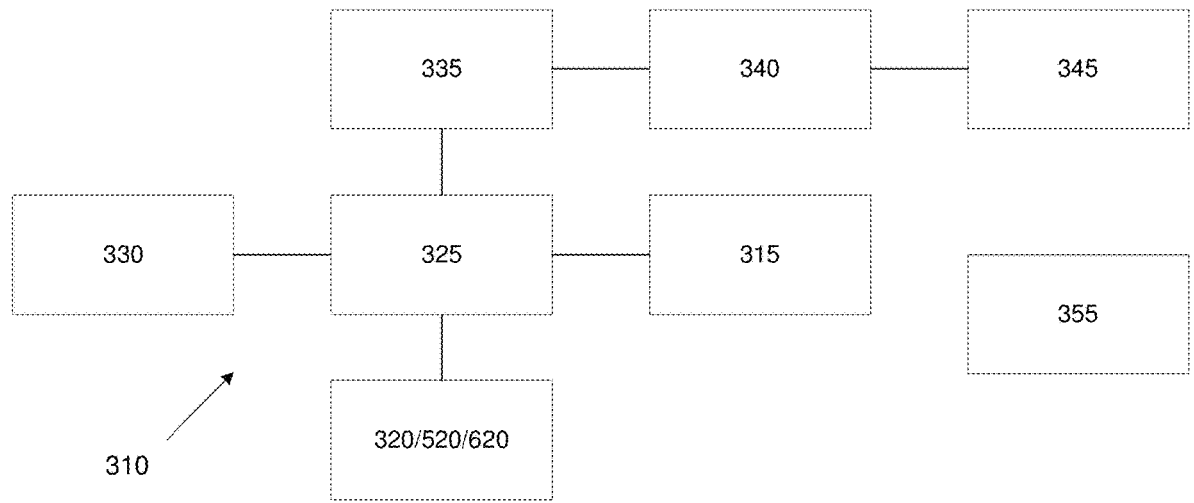
FIG. 3 is a schematic illustration of an exemplary embodiment of the present disclosure.

As illustrated in FIGS. 1-3, tracking system 310 may include a display assembly 320, a relay 325, a payment device 330, a tracking device 335, and a power storage 340. Display assembly 320, relay 325, payment device 330, and tracking device 335 may be electrically connected and/or communicate data between each other, and may be powered by power storage 340. Components of tracking system 310 may also be electrically connected and/or communicate data with components of machine 305 such as, for example, operation assembly 315. In at least some exemplary embodiments, some or all components of tracking system 310 may comprise a board (e.g., a universal board).

Relay 325 may be any suitable relay or switching device that may be selectively controlled to control an operation of tracking system 310. Relay 325 may be an electric relay. Relay 325 may be any suitable electric switching device. For example, relay 325 may be an electromagnetic relay. Relay 325 may be a solid state relay, an electro-mechanical relay, a hybrid relay, a reed relay, or a thermal relay. In at least some exemplary embodiments, relay 325 may be a relay assembly having any desired number of poles and throws. For example, relay 325 may include e.g., one or more single pole single throw (SPST) relays, single pole double throw (SPDT) relays, double pole single throw (DPST) relays, and/or double pole double throw (DPDT) relays. For example, relay 325 may be a double pole double throw (DPDT) relay. Relay 325 may be a relay of any desired voltage such as 5 volt, 12 volt, 24 volt, or any other desired voltage (e.g., between 9 volts DC and 24 volts DC). In at least some exemplary embodiments, relay 325 may be a DPDT 12 volt relay. Relay 325 may be a 5 volts to 24 volts DC switchable connector (e.g., that may close any suitable type of voltage to initiate an operation of machine 305). For example, relay 325 may be a universal board having coin switch inputs for machine 305 (e.g., that may be a coin switch crediting device such as a video game, pool table, or any other suitable game machine). In at least some exemplary embodiments, some or all components of tracking system 310 may comprise a board (e.g., a universal board) that may include inputs to start or credit machine 305 having an output that may close a relay. In at least some exemplary embodiments, machine 305 may have an output connection that may be connected with payment device 330 (e.g., that has a plurality of inputs such as three coin sensing inputs for a bill validator and/or coins).

Payment device 330 may be any suitable device for accepting and processing wireless payments such as, for example, payments made via a smart device (e.g., smartphone). Payment device 330 may be an electronic payment device. Payment device 330 may run software for processing electronic payments via wireless networks for facilitating payment to automated machines (e.g., machine 305). For example, payment device 330 may include a transceiver for wirelessly communicating (e.g., via Bluetooth, Wi-Fi, cellular, Near Field communication, and/or any other suitable method) with mobile devices such as smartphones or smart tablets to make payments. Payment device 330 may be electrically connected to (e.g., installed in) machine 305 to allow users to make credit card payments to utilize machine 305. Payment device 330 may include a relay board and any other suitable components for facilitating wireless payments. For example, a user may use a smartphone to make a payment (e.g., credit card or other e-banking payment) wirelessly using a smartphone or other device to machine 305 via payment device 330. In at least some exemplary embodiments, payment device 330 may be a PayRange device (e.g., a PayRange Blue Key Pulse) or similar device. Components of system 300 may be operated by a user utilizing a Pay Range application (e.g., app) running on a smart device such as a smartphone or other suitable device. Payment device 330 may be a Beacon app, a debit/credit card reader, an NFC (Near field Communication) receiver, a Pay Range device (e.g., Pay Range Blue Key device), an advanced metering infrastructure device, an automatic meter reading device, or any other suitable device that may be connected to components of tracking system 310.

Tracking device 335 may be any suitable device for counting or measuring an operation of operation assembly 315, payment device 330, and/or any other desired component of system 300. Tracking device 335 may be a pool table tracking device, an automated teller machine (ATM) tracking device, or a tracking device for any other desired type of machine. Tracking device 335 may be a mechanical and/or electro-mechanical counter. For example, tracking device 335 may be any suitable DC (direct current) coin counter. In at least some exemplary embodiments, tracking device 335 may be a 12 volt DC coin counter or a counter of any other desired voltage (e.g., a 5 volt DC counter). Tracking device 335 may receive and/or emit electrical pulses to or from other suitable components of tracking system 310 and/or machine 305. For example, tracking device 335 may receive and/or emit DC electrical pulses (e.g., 5 volt, 12 volt, 24 volt, or any other desired voltage). Tracking device 335 may count or measure an operation of operation assembly 315, payment device 330, and/or any other desired component of system 300 based on receiving and/or emitting pulses, and thereby track or measure an operation of one or more machines 305. For example, tracking device 335 may track and measure league play and/or cash play of machines 305 that are pool tables (e.g., or any other use of machine 305 that is any suitable type of machine). Tracking device 335 may include a storage medium for storing data of measurements or counts of an operation of components of system 300 such as described herein (e.g., or may transfer data to another component of system 300 such as the exemplary disclosed controller described below or any other suitable component of system 300).

Power storage 340 may be any suitable device or assembly for storing power or energy such as a battery. For example, power storage 340 may be any suitable type of battery for powering components of tracking system 310. For example, power storage 340 may include a primary cell battery and/or a secondary cell battery. For example, power storage 340 may include a lithium battery, an alkaline battery, a nickel-cadmium battery, a zinc-carbon battery, and/or any other suitable type of battery. In at least some exemplary embodiments, power storage 340 may be a deep cell battery. In at least some exemplary embodiments, power storage 340 may be a 12 volt DC battery.

In at least some exemplary embodiments and as illustrated in FIG. 1, power storage 340 may be selectively connected to a power source 350 via a power connector 345. For example, power storage 340 may be connected to power source 350 that may be an electrical outlet (e.g., or any other suitable power source such as an engine, motor, or generator) via power connector 345 that may be an electrical wire or cable (e.g., electrical cord). In at least some exemplary embodiments, power connector 345 may be a 12 volt (e.g., or any other desired voltage) DC cable that may be disposed at a bottom of machine 305 and may be electrically connected to power storage 340 disposed in or on machine 305. Power source 350 may be a 12 volt (e.g., or any other desired voltage) DC trickle charger that may be disposed on top of a light (e.g., a pool table lamp) where for example 110 volts (e.g., or 220 volts) may already be provided for an operation of the light. Power connector 345 that may be a charging cord may be dropped down from power source 350 that may be integrated with the lamp and plugged into power storage 340 (e.g., or another component of machine 305). In at least some exemplary disclosed embodiments, this exemplary configuration may keep substantially all tripping hazards associated with system 300 off of a floor (e.g., so that custodial staff such as cleaning personnel at the end of a night after use of machine 305, e.g., game play, may avoid tripping over obstructions such as power connector 345).

FIGS. 2 and 3 illustrate exemplary embodiments of how the exemplary disclosed components of tracking system 310 may be configured and electrically connected to each other. Exemplary disclosed electrical pulses may be emitted and/or received by adjacent exemplary components and/or via other components as described for example herein. Relay 325 may electrically connect operation assembly 315, payment device 330, and/or tracking device 335. Tracking device 335 may emit and/or receive electrical pulses and/or communicate with operation assembly 315 and/or payment device 330 (e.g., and/or display assembly 320) via relay 325. Tracking device 335 may thereby count, track, and/or measure an operation of any desired component of system 300 (e.g., operation assembly 315 and payment device 330).

Display assembly 320 may be any suitable assembly or device for displaying information to users of system 300 (e.g., game players when machine 305 is a game, users when machine 305 dispenses goods, material, or currency, or any other suitable user). For example, display assembly 320 may be a light-emitting diode (LED) or liquid crystal display (LCD). Display assembly 320 may include a plurality of LED and/or LCD lighting elements that may display information to users. In at least some exemplary embodiments, display assembly 320 may include a plurality of LED lights (e.g., any desired number such as 8, 10, 12, or other desired number).

Tracking system 310 may include electronic control systems and/or control boards. For example as illustrated in FIGS. 2 and 3, tracking system 310 may include a controller 355. Controller 355 may include for example a processor (e.g., micro-processing logic control device) or board components. Controller 355 may include input/output arrangements that allow it to be connected (e.g., via wireless and/or electrical connection such as wires or electrical lines) to other components of system 300. For example, controller 355 may control an operation of system 300 (e.g., including machine 305 and/or tracking system 310) based on user input received from one or more user interfaces (e.g., interfaces of machine 305), computer modules (e.g., in wireless and/or direct connection to machine 305 and/or tracking system 310), and/or user devices (e.g., such as smartphones have applications for operating system 300). Controller 355 may be a separate controller or may be integrated into one or more components of tracking system 310 (e.g., tracking device 335).

In at least some exemplary embodiments, some or all components of tracking system 310 may be isolated from a power source and/or wiring of machine 305 to protect against potential damage that may be caused to electronics in machine 305. For example, relay 325 may isolate voltage powering components of tracking system 310 from voltage of machine 305 to substantially prevent a short circuit or other unsuitable operation of machine 305.

In at least some exemplary embodiments, the exemplary disclosed system may include a tracking apparatus for a machine having an operation assembly. The tracking apparatus may include an electric relay (e.g., relay 325) configured to be connected to the operation assembly (e.g., operation assembly 315), a tracking device (e.g., tracking device 335) that may be connected to the electric relay, and an electronic payment device (e.g., payment device 330) that may be connected to the electric relay. The electric relay may be configured to transfer a first electrical pulse from the operation assembly to the tracking device. The electric relay may be configured to transfer a second electrical pulse from either the electronic payment device or the operation assembly to the tracking device. The relay may transfer the first electrical pulse or the second electrical pulse when the operation assembly performs an operation. The first and second electrical pulses may be 12 volt DC electrical pulses. The electric relay may be a 12 volt electric relay. The electric relay may be a double pole double throw relay. The electronic payment device may be selected from the group consisting of a PayRange Blue Key Plus device, a Pay Range Blue Key Smart device, a Touch Tunes device, and an AMI device. The electronic payment device may be connected to the electric relay via a wire being connected from a position on a relay board of the PayRange Blue Key Plus device to the electric relay. The relay board may be a Pay Range Relay Board part #8856046 and the position on the relay board may be a K1 position. The exemplary disclosed apparatus may further include a deep cell battery that may be electrically connected to the tracking device. The deep cell battery may be a 12 volt DC battery. The exemplary disclosed apparatus may also include a display board configured to be disposed on the machine, the display board including a plurality of light-emitting diodes. The tracking device may be a 12 volt DC coin counter. The tracking device may be a pool table tracking device or an automated teller machine tracking device.

In at least some exemplary embodiments, the exemplary disclosed system may include a pool ball release switch (e.g., operation assembly 315), an electric relay (e.g., relay 325) that may be connected to the pool ball release switch, a tracking device (tracking device 335) that may be connected to the electric relay, and an electronic payment device (e.g., payment device 330) that may be connected to the electric relay. The electric relay may be configured to transfer a first electrical pulse from the pool ball release switch to the tracking device. The electric relay may be configured to transfer a second electrical pulse from either the electronic payment device or the pool ball release switch to the tracking device. The relay may transfer the first electrical pulse or the second electrical pulse when the pool ball release switch releases a plurality of pool balls from a cavity of the pool table machine. The electric relay may be a 12 volt double pole double throw relay. The electronic payment device may be a PayRange Blue Key Plus device, a Pay Range Blue Key Smart device, a Touch Tunes device, or an AMI device that may be connected to the electric relay via a wire being connected from a position on a relay board of the electronic payment device (e.g., a PayRange Blue Key Plus device, a Pay Range Blue Key Smart device, a Touch Tunes device, or an AMI device) to the electric relay. The relay board may be a Pay Range Relay Board part #8856046 and the position on the relay board may be a K1 position.

The exemplary disclosed system, method, and apparatus may be used in any suitable application involving coin-operated and/or bill-operated machines. For example, the exemplary disclosed system, method, and apparatus may be used in any suitable application such as a pool table, an arcade or game center device (e.g., air hockey or any other desired machine), a machine for shaping and stamping coins (e.g., souvenir penny), a laundry machine, a gambling machine such as a slot machine, and/or any other desired machine that may operate based on inserting coins, bills, or other forms of payment. The exemplary disclosed system, method, and apparatus may also be used for efficient parking at stadiums, arenas, parking garages, designated municipal parking, and/or other suitable locations for parking vehicles.

Figure 4:
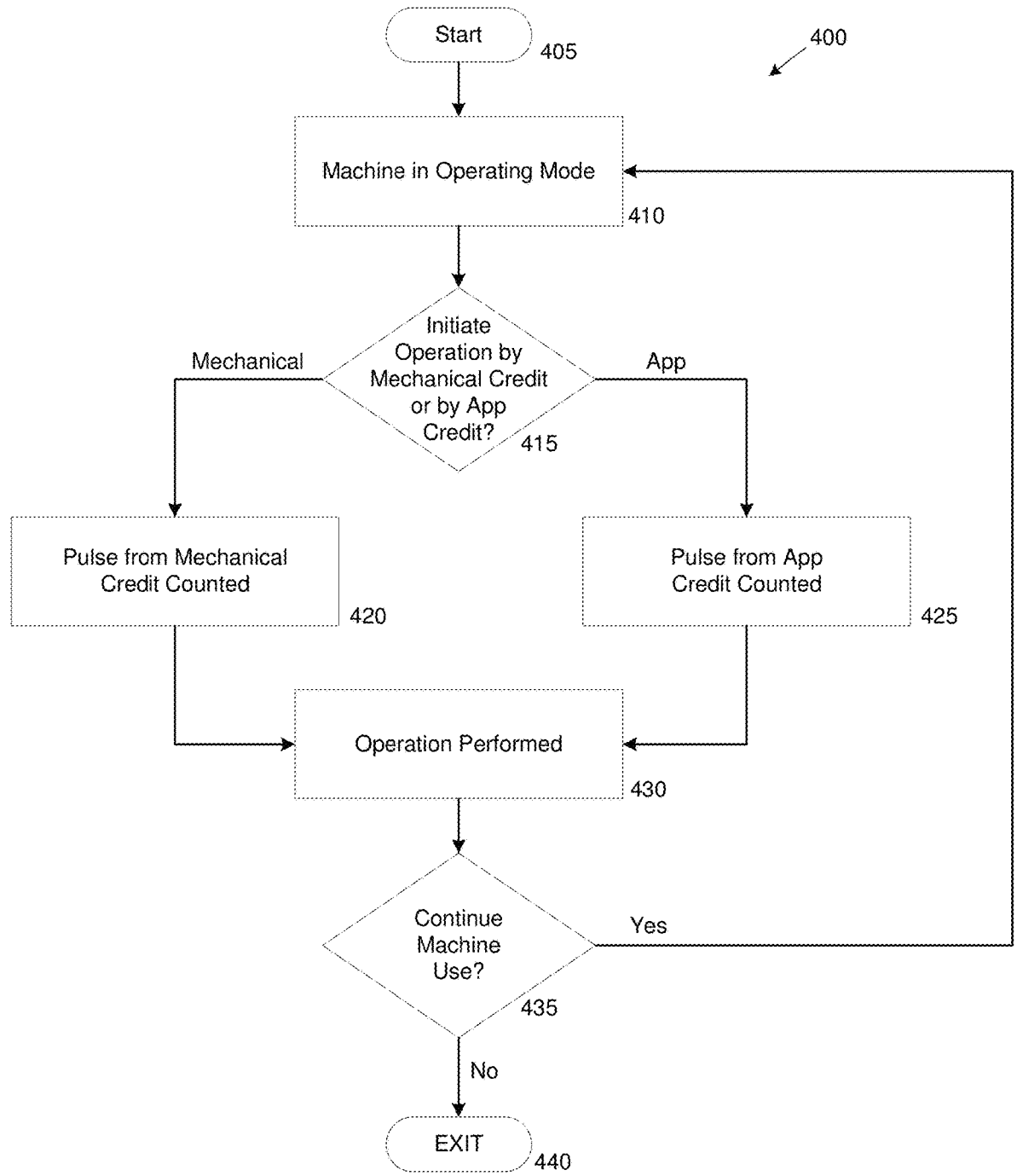
FIG. 4 illustrates an exemplary process of at least some exemplary embodiments of the present disclosure.

FIG. 4 illustrates an exemplary operation of the exemplary disclosed system 300. Process 400 begins at step 405. At step 410, system 300 may be in an operating mode. Both machine 305 and tracking system 310 may be powered on and available to receive input or interaction from users.

At step 415, an operation of machine 305 (e.g., an operation of operation assembly 315 such as dropping pool balls or an ATM operation) may be initiated. At step 415, system 300 may determine whether the operation has been initiated by a mechanical credit or an App credit (e.g., initiated using an application such as a smartphone app that may be processed via payment device 330). System 300 may determine how the operation has been initiated based on an operation of relay 325, tracking device 335, and/or controller 355, which may emit and/or receive pulses and/or pulse data from each other or other components of tracking system 310 and/or machine 305 (e.g., operation assembly 315) for example as described below. Step 415 may occur simultaneously with and/or be integrated with step 420 and/or step 425.

If system 300 determines that the operation (e.g., of operation assembly 315) has been initiated by mechanical credit, process 400 may proceed to step 420. At step 420, tracking device 335 may receive a pulse from operation assembly 315. For example when a user inserts coins or currency into operation assembly 315 and actuates operation assembly 315, operation assembly 315 may perform a desired operation (e.g., dropping pool balls) and emit an electrical pulse as described for example above (e.g., to tracking device 335 either directly or via relay 325). Tracking device 335 may measure (e.g., "count") and record data regarding the operation of operation assembly 315 (e.g., regarding any desired attribute such as the exemplary attributes described above). Process 400 may then proceed to step 430, at which the desired operation (e.g., operation of operation assembly 315) may be performed.

If system 300 determines that the operation (e.g., of operation assembly 315) has been initiated by App credit, process 400 may proceed to step 425. At step 425, tracking device 335 may receive a pulse from payment device 330 (e.g., and/or operation assembly 315). For example when a user initiates the operation for example as described above (e.g., via wireless commands provided to a smartphone or similar device), payment device 330 may emit an electrical pulse to operation assembly 315 to perform a desired operation (e.g., dropping pool balls), which may also be received by tracking device 335 either directly or via relay 325 (e.g., and/or operation assembly 315). Tracking device 335 may measure (e.g., "count") and record data regarding the operation of operation assembly 315 (e.g., regarding any desired attribute such as the exemplary attributes described above) and/or payment device 330. Process 400 may then proceed to step 430, at which the desired operation (e.g., operation of operation assembly 315) may be performed.

At step 430, the desired operation such as dropping of pool balls, a game ball being provided, a material or good being dispensed, or any other desired operation based on a purpose of machine 305 may be performed. In at least some exemplary embodiments, users may perform an activity (e.g., play a game) based on the operation. For example, pool players may shoot the balls that were dropped or released at step 430 into pockets of machine 305 that may be a pool table. For example objects 318 (e.g., pool balls) may be returned to the exemplary disclosed cavity of machine 305 described above.

System 300 may then proceed to step 435, at which system 300 may determine whether use of machine 305 will continue and whether machine 305 will remain in an operating mode based for example on user input, input from an owner and/or operator of machine 305 or property on which machine 305 is located, an algorithm or predetermined criteria provided to or by controller 355, machine 305 and/or tracking system 310 being physically powered off, and/or any other suitable input, criteria, conditions, or action. If system 300 determines that machine 305 will remain in use, process 400 may return to step 410. If system 300 determines that machine 305 will not remain in use, process 400 may proceed to step 440, at which process 400 ends.

Process 400 may involve any desired number of tracking systems 310 and/or machines 305. In at least some exemplary embodiments, a single tracking system 310 may track or monitor a single machine 305 or a plurality of machines 305. Also for example, a plurality of tracking systems 310 may track or monitor a single machine 305 or a plurality of machines 305. Data measured and stored by any desired number of tracking systems 310 regarding any desired number of machines 305 may be combined, analyzed, and/or processed by system 300 as desired. For example, data from one or more tracking systems 310 may be processed by system 300 to provide analysis results for one or more machines 305 such as number of operations, time of machine use, revenue, and/or other data by machine 305, location, and/or any other desired parameter. For example, system 300 may provide data and analysis regarding how machine 305 is utilized during free play or league play when machine 305 is a pool table. System 300 may utilize artificial intelligence or machine learning techniques (e.g., as described below) in analyzing the data recorded and/or processed by tracking system 310 (e.g., by tracking device 335).

In at least some exemplary embodiments, operation assembly 315 may pulse tracking device 335 and/or payment device 330. The pulsing may be used for audits using tracking device 335 (e.g., secondary) located in the machine (e.g., machine 305 such as a pool table). A component of machine 305 such as operation assembly 315 (e.g., a pool table harness of a Diamond pool table or other desired machine) may be re-wired to relay 325 (e.g. a Double Pole Double Throw 12 volt relay), which may trip tracking device 335 to cause operation assembly 315 to operate (e.g., to drop pool balls or take any other desired action). Any desired pulse (e.g., voltage amount such as 12 volts) may pull relay 325 by either a mechanical credit (e.g., as described above regarding step 420) or an App credit (e.g., as described above regarding step 425).

Tracking system 310 may be installed on and/or within machine 305 using new wiring and adding power storage 340 and relay 325. For example, one or more components of machine 305 may be modified. In at least some exemplary embodiments, payment device 330 (e.g., including a part such as a Pay Range Relay Board part #8856046) may be modified to operate with relay 325 (e.g., a 12 volt relay). For example, a relay of payment device 330 (e.g., a relay disposed at a Pay Range relay board location K1) may be removed. The installation may include jumping a 12 volt DC to pulse wires of payment device 330 (e.g., on a PayRange relay board) to relay 325. In at least some exemplary embodiments, a board (e.g., pulse board such as a Blue Key pulse board) may be modified to take 12 volts off of the K1 location to send to a plurality of relays (e.g., via relay 325 to three different relays) to initiate an operation of operation assembly 315 of machine 305 while maintaining an isolation of voltages (e.g., isolating a voltage of tracking system 310 from a voltage of machine 305).

In at least some exemplary embodiments, by being able to control some or all free play games and/or paid play games using the exemplary disclosed system, method, and apparatus, operators of the system may track game play and charge fees for events such as pool league night. Also with the capability of tracking device 335 (e.g., counter such as a 12 volt coin meter), system 300 may track and record data each time a game is initiated (e.g., every time the pool balls drop for a pool game).

In at least some exemplary embodiments, a given machine 305 may collect money, which may include ACH operators sharing from a bank account associated with a given location of machine 305. System 300 may also track the amount of free games that are being played.

In at least some exemplary embodiments, the exemplary disclosed method may include providing an operation assembly (e.g., operation assembly 315) of a game machine, connecting an electric relay (e.g., relay 325) to the operation assembly, connecting a tracking device (e.g., tracking device 335) to the electric relay, connecting an electronic payment device (e.g., payment device 330) to the electric relay, transferring a first electrical pulse from the operation assembly to the tracking device via the electric relay, transferring a second electrical pulse from either the electronic payment device or the operation assembly to the tracking device via the electric relay, and transferring the first electrical pulse or the second electrical pulse when the operation assembly releases at least one playing object of the game machine. The operation assembly may include a pool table switch that releases at least one playing object that may be a plurality of pool balls of the game machine that is a pool table. The operation assembly may include a mechanical push slot of the game machine that is a pool table. The exemplary disclosed method may further include connecting a battery to the tracking device, and selectively connecting the battery to an electrical outlet via an electrical wire.

In at least some exemplary embodiments, the exemplary disclosed system, method, and apparatus may operate with any suitable machine 305 (e.g., a Diamond pool table or any other suitable mechanical commercial pool table). Paid advertisements (e.g., ads) may be sold based on an operation of system 300 (e.g., via a network that interfaces with users such as the Internet). The exemplary disclosed system may also set a relatively cheaper game rate for pool league players to start games during league play (e.g., or have a sponsor that puts an ad on the app when they start the game to pay a portion of the fee). For example, pool league players may also pay a weekly fee that may give the players a certain number of free games per week using system 300. An operator of the exemplary disclosed system, method, and apparatus may also share some of the fees with an owner of a facility in which machines 305 are located (e.g., a bar room owner). The exemplary disclosed system, method, and apparatus may control the percentage of all fees via input provided by an operator and/or a predetermined operation (e.g., including machine learning operations as described below). For example, machines 305 (e.g., pool tables) at pool league locations (e.g., bars) may provide league players with practice time during slow business hours for free (e.g., hours during which a given location is typically slow or not crowded).

In at least some exemplary embodiments, the exemplary disclosed system, method, and apparatus (e.g., including Pay Range) may work with machines 305 such as pool tables, with a push message being selectively sent to an operator of the exemplary disclosed system and a location owner (e.g., location where one or more machines 305 are located) to plug in machine 305 (e.g., a pool table) so that power storage 340 powering tracking device 335 may not run out of power (e.g., will not run down).

In at least some exemplary embodiments, the exemplary disclosed system, method, and apparatus may track, audit, manage, and control league play. Operation assembly 315 that may switch an operation of machine 305 (e.g., a pool table) between free play and paid play may be disconnected and side door pool table keys may not be given out to control an opening and closing of a window to machine 305 (e.g., window to access pool balls). Accordingly, machine 305 may not be physically switched to a free play mode in some cases. Also for example if operation assembly 315 (e.g., a coin mechanism) breaks or jams, machine 305 (e.g., a pool table) may still be started using the exemplary disclosed component or application (e.g., including a PayRange app). This may save an immediate service call from being requested, and machine 305 (e.g., pool table) may remain in operation.

In at least some exemplary embodiments, the exemplary disclosed system, method, and apparatus may provide output and receive input from a system operator, a location owner of machine 305 (e.g., bar owner), and/or players via any suitable user interface as described for example herein. For example, users may access the system using a smartphone app. In at least some exemplary embodiments, the exemplary component or application (e.g., Pay Range) may use an internet connection via a mobile phone to operate (e.g., and/or any other suitable network connection as described for example below). For example, the exemplary disclosed system, method, and apparatus may operate using computing devices and networks similar to the exemplary devices and networks described below regarding FIGS. 15-17.

In at least some exemplary embodiments, the exemplary disclosed system, method, and apparatus may include using relay 325 that may be 12 volts DC and may be used on any suitable mechanical machine such as a game machine (e.g., pool table, arcade game, or other suitable game).

In at least some exemplary embodiments, the exemplary disclosed system, method, and apparatus may charge pool league players a fee each week so that the players may start their pool league games and practice when desired (e.g., at predetermined and/or flexible times) each week. Also for example, the exemplary disclosed system, method, and apparatus may set how many games each league player may initiate (e.g., start) each week by charging a fee when desired (e.g., a small fee each week).

In at least some exemplary embodiments, the exemplary disclosed system, method, and apparatus may include a waiting list feature. For example, an exemplary application (e.g., app) utilized by users may allow for a plurality of people (e.g., five people or any other desired number of people) to wait to play pool on an exemplary machine (e.g., machine 305). For example, a user may pay to play on machine 305, and the system may place them on a waiting list. The exemplary system may alert a user that machine 305 is available to play pool via the app (e.g., via an exemplary user interface as described for example herein that may run the app). For example, a user may initiate play on machine 305 via an exemplary user interface (e.g., via an app of a smartphone).

In at least some exemplary embodiments, the exemplary disclosed system, method, and apparatus may be used for pool tables or laundry machines. If a first user is using an exemplary machine (e.g., machine 305 such as a pool table or a laundry machine), a second user would not be able to utilize the system to initiate an operation of the machine.

For example, a user who wants to play machine 305 next or reserve a turn in-line on an exemplary machine (e.g., pool table or laundry machine) may use a user interface (e.g. running an app) to choose the exemplary waiting list feature. The user may use the app to swipe up on the waiting list, which may result in a code being sent back by the system to their user interface (e.g., smartphone). The exemplary code may work once a prior code (e.g., code of a prior user) has been used. If no other user is in front of the waiting user (e.g., on the waiting list) and other users are utilizing a machine, then the exemplary code may be able to be used as soon as the users in front of the waiting user(s) are finished using the machine. For example, some or all other codes may be inactive until the code in front of the waiting user is used. The exemplary system may allow users to fairly and correctly maintain an order of use of the exemplary machine (e.g., machine 305).

In at least some exemplary embodiments, the exemplary disclosed system may include an imaging device such as a monitor (e.g., similar to display assembly 320). The monitor may for example display a user who is next (e.g., users in a location such as a bar or laundromat may look at the monitor to see who is next). For example, a wiring of the exemplary disclosed system used to start the exemplary machine (e.g., machine 305) may be disconnected (e.g., Blue Key voltage may be disconnected using the exemplary disclosed wiring of an exemplary relay until a user pushes a start button). The exemplary machine could include instructions located by a light switch indicating to press "end game" to start the exemplary app described for example herein. Users may for example self-police use of the exemplary system described above. For example, users located near the exemplary machine may notice a light on the exemplary machine that may light up (e.g., light up brightly and/or flash), thereby indicating to nearby users to push the button to start the exemplary app to start the next game (e.g., or next use of the exemplary machine). The app may for example indicate that the exemplary machine is unavailable until the end game button is pressed by a user. The exemplary machine may also include instructions (e.g., located in the app) to check that the end game button was pushed. Once the Blue Key voltage is reconnected (e.g., back online) the next play in the exemplary waiting list may be accepted to swipe the app to start. The exemplary machines (e.g., machine 305) may also use a laser to detect a cue ball when machine 305 is a pool table. The exemplary system may include a second laser to detect an 8 ball and trip the Blue Key voltage back on if appropriate based on game play. The exemplary disclosed system may for example use latching relays to complete these transactions.

In at least some exemplary embodiments, the exemplary disclosed system, method, and apparatus may include display assembly 320 that may be a challenger control board and challenger player unit. Display assembly 320 that may be a challenge board may be mounted to an outside of machine 305 (e.g., a pool table exterior) in a metal housing. Display assembly 320 may have eight LED lights numbered from one to eight (e.g., single LED for 8, 9, and 10 ball forgiveness, and two low battery LEDs for D cell and main battery). Display assembly 320 that may be a challenge board player unit may also be used on other types of machines such as Fosse ball tables, Shuffle Board tables, dart boards, and dart machines to keep an order of players or similar games that involve maintaining a player order. Display assembly 320 that may be a Challenger Player unit may also be installed on any mechanical pool table such as Diamond, Valley, Dynamo, Brunswick, and Global pool tables.

In at least some exemplary embodiments, display assembly 320 that may be a challenge board may provide a Straight Pool Setting. For example, when a player inserts quarters or uses an app to pay as described for example above, vending Challenger LED 1 may light up solid. If no time play is set up on machine 305 that may be a pool table, then the LED will remain solid until someone puts money back in. When a first player ends his or her game, the next player may insert money or app credits. The Player 1 LED may then turn off (e.g., go out) and the player 2 LED may light up. There may be a 20 minute reset time (or other desired time). After 20 minutes, the LED for player 2 may go out. This may prevent power storage 340 (e.g., a battery) from being drained.

In at least some exemplary embodiments, display assembly 320 that may be a challenge board may provide timed pool settings. These settings involving timed play may make the LED Challenger LED lights operate differently. Money or an app may cause operation assembly 315 to activate to cause pool balls to drop. The Challenger LED 1 light may light up solid. When a time that may be set on the board by the owner of machine 305 has expired, the Challenger LED 1 may flash and a ball gate of machine 305 may close. The ball gate may not open up until cash or an App (e.g., via payment device 330) has been applied. Also the Challenger 2 LED may not light up solid until challenger 2 pays and then the challenger 1 LED may stop flashing. For example, once the challenger 1 LED stops flashing and the Challenger 2 LED lights up solid, then users know that Challenger 2 has paid. If no other user starts a game within a predetermined time period (e.g., within 20 minutes or any other desired time period), then the Challenger 2 LED may turn off until cash is added or an app is used to start a new game, which may reduce battery usage.

In at least some exemplary embodiments, the exemplary disclosed system, apparatus, and method may include any suitable battery power preservation features. For example, when a component (e.g., a push slot) of operation assembly 315 is manipulated, the exemplary disclosed controller may control components of system 300 based on the manipulation. For example, operation assembly 315 may include a push slot that may be pushed in by a user to a predetermined position when money such as coins is not inserted into operation assembly 315. When such a component is pushed in without the insertion of money, a switch of system 300 disposed (e.g., inside of machine 305) next to the exemplary push slot may be actuated or activated. The switch may transfer data and/or an electrical pulse to tracking system 310 for example as described above, which may cause tracking system 310 to turn on (e.g., switch from a passive or sleep mode that may preserve battery power of tracking system 310 to an active or ready mode). When such a component is not pushed and system 300 is not in use by users for more than a predetermined time period, system 300 may remain in a passive or sleep mode in which battery power may not be used or battery usage may be negligible. This exemplary operation may result in power storage (e.g., power storage 340 of system 300) not being used when system 300 is not in use, which may result in power storage 340 being charged less often. In at least some exemplary embodiments, when operation assembly 315 may include a drop coin assembly, system 300 may include a component (e.g., micro switch) disposed at or near (e.g., next to) a coin return lever that may be disposed inside machine 305. For example if a user pushes a coin return of operation assembly 315, the coin return may turn on power to tracking system 310 (e.g., turn on power to payment device 330 and/or send a notification via an app to a user device). Machine 305 may include instructions for activating the above described exemplary methods.

In at least some exemplary embodiments, display assembly 320 that may be a challenge board may include an eight ball forgiveness LED that may light up once money or an app credit is vended. Eight ball forgiveness may light up solid on either settings (e.g., straight pool or timed play) if the owner of the table has selected for it to be turned on. Next to (e.g., vertically next to) the eight ball LED may be a place for a sticker to let challengers know that the table has eight ball forgiveness available and active.

In at least some exemplary embodiments, display assembly 320 that may be a challenge board may include low battery level LEDs for power storage 340, which may provide notification to system operators to connect (e.g., plug in) power connector 345 to power source 350. The exemplary disclosed system may also include app monitoring of power storage 340 (e.g., battery levels), which may provide an owner or operator of machine 305 with real time alerts to charge or change power storage 340 and/or batteries of machine 305. By using the flashing LEDs as an indication for when a battery is low, a patron could also make the location aware that a table should be plugged in (e.g., as illustrated in FIG. 1). The LEDs lighting up when power storage 340 may be nearing unrecoverable battery levels may save the operator from expensive battery replacement costs. Display assembly 320 may also include audio alarms to notify users of low batteries. If a main battery of display assembly 320 or tracking system 310 drops to a low level, the board may disconnect the battery from a circuit and flip over to another power storage (e.g., cue ball laser battery) until the main battery is charged or replaced. Also for example, machine 305 may be plugged into a power source and no batteries may be involved.

In at least some exemplary embodiments, display assembly 320 that may be a challenge board may provide for Free Game Challenge (FGC) Rules. Silk screened numbers 1 to 8 may be printed vertically in order on a chalk board or lit eraser marker board. Any other suitable printing technique may also be used. Players may put their name next to each number to correspond to the numbers on the FGC. Instructions and rules of the FGC may also be silk screened on the chalk board. By combining the LED challenger lights described above and the FGC, an order of play may be tracked and organized. The LED may give the next challenger the option to start the Pool table (e.g., initiate operation as described for example at step 415) with an app or coins (e.g., quarters) or currency. The FGC may also be used to create the order of challengers and to continue the order of play. For example, during a busy night of pool table play, customers may put their names on the chalk board next to the corresponding number on the FGC. Then customers may also place one quarter on their number on the FGC game board on display assembly 320 that may be the Challenger player unit. When some or all of the numbers are taken, the first player on the table that already has the table may be challenged by Challenger 1. If Challenger 1 wins then he or she may leave a marker (e.g., quarter) on Number 1. Then Challenger 2 may challenge Challenger 1. If Challenger 1 loses then he or she may take his or her quarter from the Challenger 1 slot and put it on the free game slot. If Challenger 2 wins again against Challenger 3, then Challenger 2 may leave his or her marker (e.g., quarter) on 2 again. Challenger 3 may then place his or her quarter on the Free Game slot. For example, if Challenger 2 wins all of his or her games, all eight markers (e.g., quarters) may be theirs for a free game or he or she may take the quarters if there are no more challengers.

In at least some exemplary embodiments, display assembly 320 that may be a challenge board may provide for Tournament Play. On a side (e.g., the left side) of a Challenger Player Unit there may be a key switch that may connect to display assembly 320 that may be the Challenger board. Below that key switch may be another coin meter. If machines 305 that may be pool tables are placed in a tournament, a tournament feature may be turned on with the key switch (e.g., as described further below regarding FIGS. 8-10), which may allow the pool balls to drop without any app or cash vend. The player may push an "8, 9, and 10 ball forgiveness" button to drop the pool balls to start a next game. The balls may then be locked in the pool table until the button is pushed again. Tracking device 335 that may be a coin meter disposed under operation assembly 315 that may be a switch may count every time the balls are dropped. If there is an app connected to display assembly 320 that may be a board then the app may record (e.g., capture) every time the balls dropped also. A predetermined fee may be agreed on to charge a person or entity running a Tournament, so the owner of machines 305 (e.g., the pool tables) may generate revenue. This feature may work with greens fee tournaments also. In at least some exemplary embodiments, a first operator may own machine 305 and a second operator (e.g., or the same operator) may own tracking system 310 that may be installed on machine 305.

The tournament feature may also be used with pool league night instead of using an app. A location hosting machines 305 may be charged (e.g., half price) every time an operation of operation assembly 315 is initiated (e.g., the balls drop). By using tracking device 335 (e.g., the meter on the player unit) the vendor may charge the location for league play. The Tournament feature may also be used in pool halls so a customer may be charged per game without any money or app fee being paid directly. For example, a pool hall may still charge a fee per player or charge a fee per every time operation assembly 315 is initiated (e.g., the balls are dropped).

A combination of some or all of the exemplary disclosed functions (e.g., on a "BarZcash" system) in the use of the exemplary disclosed app, including using display assembly 320 (e.g., LEDs on the Challenger board) and the FGC to control pool play and player order. The exemplary disclosed system, method, and apparatus may provide a technique for tracking and monetizing league pool play.

In at least some exemplary embodiments, the exemplary disclosed system, method, and apparatus may also provide a ball forgiveness feature for a commercial pool table for example by using a push button switch. Once players know that one of the three balls go in (e.g., 8, 9 or 10) they may push the forgiveness button and activate operation assembly 315 (e.g., drop the balls) again. If the game is set on straight pool, for example, the forgiveness button may be pushed a single time. There may be a 10 minute time period (e.g., or any other desired time period), so if a forgiveness LED (e.g., on display assembly 320) goes out then time has run out and the forgiveness button will not work anymore. The three balls may be used in three different games (e.g., classic eight ball, nine ball and ten ball). For example, the exemplary disclosed system (e.g., including apps) may provide for adjustable play times and tracking every game on tracking device 335 (e.g., an electro-mechanical coin meter) so that an operator (e.g., of tracking system 310 and/or machine 305) may charge a fee per a game to a location owner. Also, league players may be charged at a reduced price instead of not paying anything.

In at least some exemplary embodiments, the exemplary disclosed system, method, and apparatus may also include display assembly 320 that may be a Universal board having many settings. Users can enter input to system 300 to have a pool table sense the 8, 9, and 10 ball or use a manual push button switch. This may give a player another game free of charge. This option may be designed so that the pool table price can be raised to cost more money than traditional pricing. Also for example, if a pool game is set up on a 5 minute game (or any other desired time) and an 8 ball goes in after 5 minutes expires, then the balls will not release. A tournament setting may also be combined with a forgiveness setting so that every time an 8, 9, or 10 ball goes in a pocket, depending on the selected game, the balls will drop and the customer may push the button once the 8, 9, 10 ball are sunk in the game. After the balls drop, the ball gate may go down again until the button is pushed again. For accounting and collecting revenue, tracking device 335 may keep track of each initiation of operation assembly 315 (e.g., every time the balls drop). By having tracking device 335 count games, a pre-determined fee for the location owner to pay could be agreed upon (e.g., based on tracking device 335 that may be a coin meter, for example when a tournament is set up for green fees instead of putting money in the table). Every time the ball gate goes up may be tracked on the exemplary disclosed app. The tournament feature may also be used in pool halls, which may charge by the hour. The customer may also choose to pay a minimum fee and be charged per each time operation assembly 315 operates (e.g., every time the ball gate drops the balls). This may be controlled by the app, so if the customer chooses a minimum fee then it would start the table with the app.

In at least some exemplary embodiments, the exemplary disclosed system, method, and apparatus may provide for PayRange, Touch Tunes, and/or AMI application Integration with a BarZcash Universal Board and Retro Kit System. With the production of the BarZcash Universal board for the PayRange app, Touch Tunes app, and/or AMI juke box app, a wide array of opportunities may be taken advantage of on Pool Tables, Amusement machines, and other machines. The universal board may be to create a way to channel pool league players to use PayRange, Touch Tunes and/or AMI applications to start pool tables and track the pool table plays. With the exemplary disclosed universal board, league players may be charged at a reduced price and the operator of machines 305 may recover some payment for the maintenance of the pool tables. For example, every vended app, cash, free game and tournament play may be counted by tracking device 335 that may be an electro-mechanical coin meter. In doing so, the operator may charge for an app connection fee and keep track of some or every vending event. For example, an operator may pay BarZcash a monthly fee or a percentage of each vend (e.g., app fees may be taken out of the app vends automatically). If no app is connected to machine 305 (e.g., a pool table), tracking device 335 (e.g., a challenger coin meter) may be used to charge a pool table location or tournament manager at a predetermined fee per drop of the balls by the Challenger player ball drop button. Also for example, the 8, 9, and 10 ball forgiveness option may be turned on as described for example above to generate additional revenue per pool game.

In at least some exemplary embodiments, an operator of system 300 may set up apps for sharing between Touch Tunes, PayRange, and/or AMI. The operator may set up incentives for other machines co-located with machine 305 (e.g., pool tables, arcade games, jukeboxes, and any other suitable device located in a given location) such as buying 5 songs on a juke box to get a free game of pool or discounted game of pool (e.g., or any other offer or benefit).

In at least some exemplary embodiments, if power storage 340 that may be a battery (e.g., for a board of tracking device 335) is disconnected, batteries (e.g., "D" Cell batteries) that power a laser eye (e.g., cue ball laser eye) may automatically switch to power the board. Also for example, a 12 volt wall charger may be plugged into power storage 340. Also, a 12 volt charger may be plugged into the board (e.g., to bypass or avoid use of batteries).

In at least some exemplary embodiments and as illustrated in FIG. 1, a sensor 360 (e.g., a motion sensor or any other suitable sensor such as a light sensor) may turn on power to a PayRange, Touch Tunes, and/or AMI app unit via tracking device 335 and/or relay 325. Motion sensor 360 may be disposed on a Challenger board of machine 305. If no motion is detected for 30 minutes after any app credit or money is inserted or provided, system 300 (e.g., including apps) may power off to conserve power of power storage 340 (e.g., battery life). The motion sensor may be controlled by controller 355 and/or tracking device 335.

In at least some exemplary embodiments and as illustrated in FIG. 1, system 300 may include a solar battery charging system. For example, one or more solar panels 365 may be placed on an angle on the sides of machine 305 (e.g. a pool table) under the skit of the rail so as to not get in way of players. Solar panels may also be located in rails for charging power source 340 (e.g., or other batteries of machine 305).

In at least some exemplary embodiments, display assembly 320 may include a challenger phone charging erasable chalk board (e.g., with app). The Challenger phone charging chalk board may have similar features as the exemplary disclosed Challenger Player unit described above, and may include a quarter rack with the one through eight quarter slots so that it may also be used with other gaming machines like Fosse ball, Shuffle Board and darts. The exemplary disclosed phone charging chalk board may maintain a player order and have a chalk board attached to it where one to eight players may write their names to maintain order of play. The exemplary disclosed phone charging chalk board may include an app on board that may power USB charger ports so players may charge their phones. A wireless charging spot may also be on the unit. The chargers may activate (e.g., power or turn on) via an app and have a timed limit before payment (e.g., another payment) would be made. This may also be sponsored by a company that would like to advertise and not charge the players for charging. For example, advertisers, may have the players go to a website to get the charger to turn on for free or offer a discounted price. There also may be an added shelf to the Challenger Player Unit so that two or three phones may rest on the shelf to get charged. The exemplary disclosed unit may plug in (e.g., into A/C or AC power) and also be adjustable to a size of the chalk board that may fit on it.

In at least some exemplary embodiments, the exemplary disclosed system, method, and apparatus may include a tracker (e.g., a BarZcash Universal Board Vaultracker) for automated teller machines (ATM). The exemplary disclosed system, method, and apparatus may include a universal board (e.g., similar to a board of tracking device 335 as described for example herein) that may track employee arrival and leaving times from ATM locations and track ATMs that have been stolen. The exemplary disclosed system, method, and apparatus may include a battery backup that may be activated once an ATM is disconnected from power (e.g., from AC electricity or power). When AC power is on, a relay (e.g., similar to relay 325) to the battery backup may be open. A relay coil may be pulled to maintain power being provided to the board (e.g., similar to a board of tracking device 335 as described for example herein). Once AC to the ATM turns off, the coil relaxes and puts a DC source (e.g., between 9 volts DC and 24 volts DC) to the app and the universal board. After this occurs, an app of the exemplary disclosed system may be activated to record what happens before or while the ATM is not powered (e.g., unplugged from AC power). Any opening of the Vault door (e.g., main door for paper) and/or other electronic accessibility normally accessed by service technicians will be measured and counted by the app of the exemplary disclosed system (e.g., a time of opening and a time of closing of the door or other access point). There may also be an interlock switch mounted to a fastener (e.g., stud) that may secure the ATM to the ground. If the ATM is removed from its location (e.g., the fastener connection is broken or removed), the exemplary disclosed system may measure and record on when it happened and any other desired information.

In at least some exemplary embodiments, an ATM employee may arrive at a location. When the employee open the vault door, the exemplary disclosed system may record that time. When the employee closes the door, the exemplary disclosed system may record that time. If the employee opens a top door to load paper at that time, the exemplary disclosed system may record data of that activity. When the employee is done servicing the ATM, the employee may perform a transaction (e.g., on the app) to activate the universal board (e.g., similar to a component of tracking device 335). All of the times and data that were recorded may be processed by the exemplary disclosed system (e.g., may be sent to system apps online so a manager may check the progress of the employee). For example, the exemplary disclosed system may accordingly detect an activity in which a person knows a combination of the ATM and unplugs the ATM before the person opens the vault door (e.g., the exemplary disclosed system may track the unauthorized vault opening). Based on data provided by the exemplary disclosed system, the manager may request certain timed footage of security system at that location at the time provided by the exemplary disclosed system. The manager may then determine who had opened the ATM in an unauthorized manner. The unauthorized person may also not be aware that the unauthorized access was detected.

Figure 5:
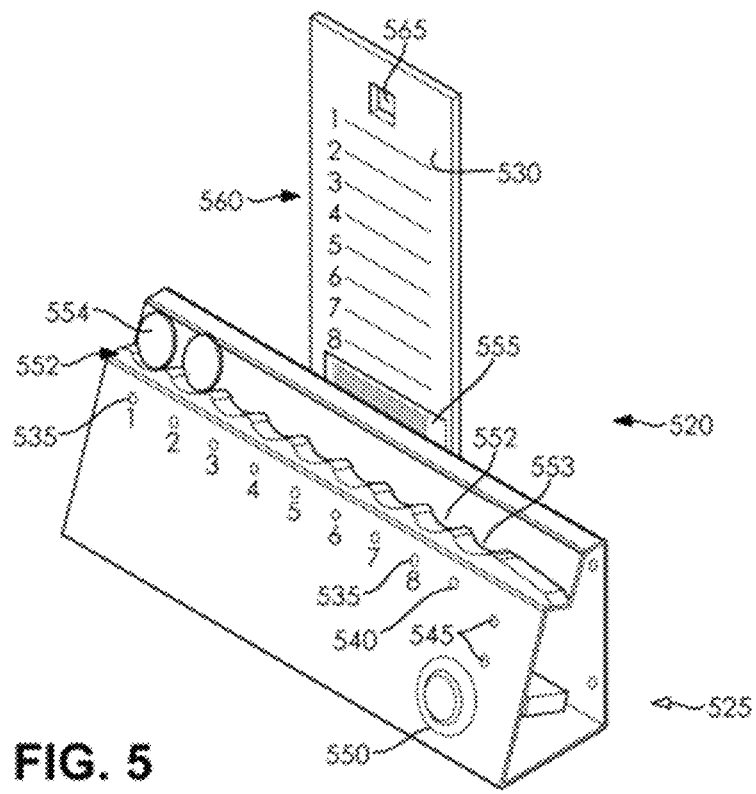
FIG. 5 is a perspective illustration of an exemplary embodiment of the present disclosure.
Figure 6:
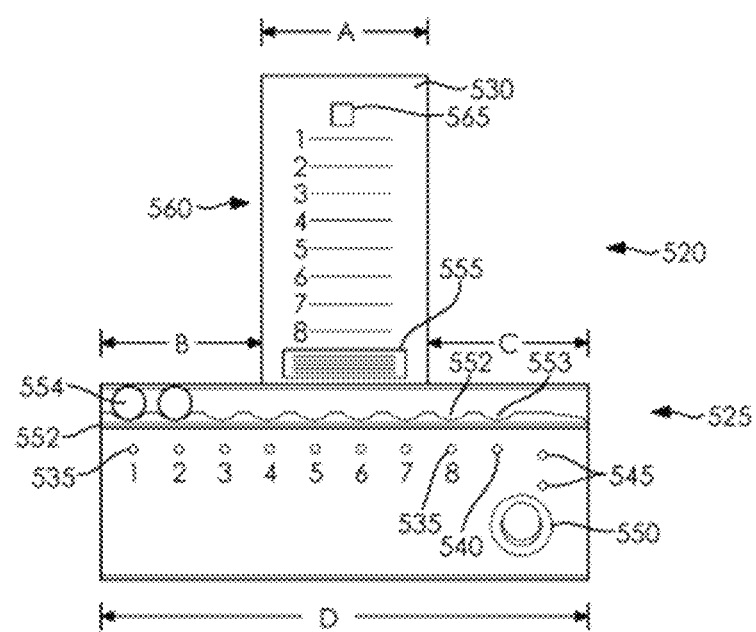
FIG. 6 is a front illustration of an exemplary embodiment of the present disclosure.
Figure 7:
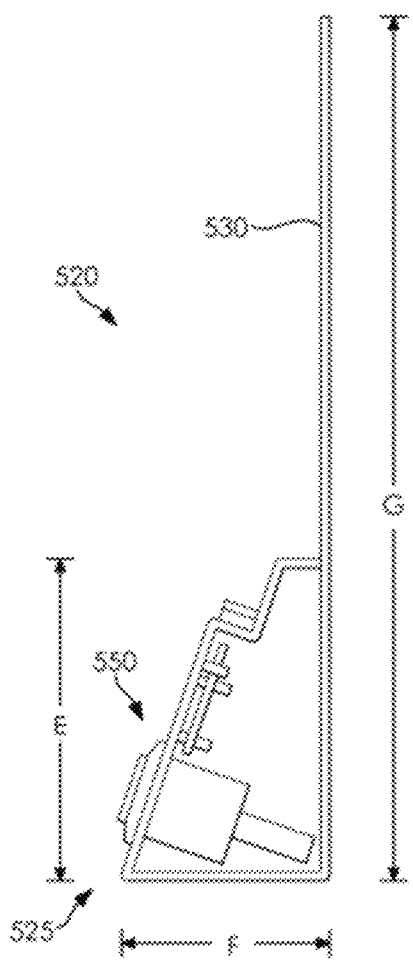
FIG. 7 is a side illustration of an exemplary embodiment of the present disclosure.

FIGS. 5-7 illustrate another exemplary embodiment of the exemplary disclosed system, method, and apparatus. Display assembly 520 may operate with system 300 in a manner similar to as described above regarding display assembly 320. For example, display assembly 520 may operate generally similarly to display assembly 320 (e.g., with other components of system 300) for example as described herein. Display assembly 520 may include an indicator assembly 525 and a display member 530. Display member 530 may be fixedly or removably attached to indicator assembly 525. Display member 530 may also be integrally formed with indicator assembly 525.

Display assembly 520 may be used to indicate an order of use of machine 305 by a plurality of users. For example when machine 305 is a game, display assembly 520 may be used to indicate to users an order of play to be followed by users of machine 305. For example, display assembly 520 may be used on machine 305 that may be a pool table (e.g., mechanical pool table such as Diamond, Valley, Dynamo, Brunswick, and Global pool tables), Fosse ball table, Shuffle Board table, dart board, dart machine, or other type of game machine to maintain an order of players.

Display assembly 520 may be made from any suitable materials for providing an interactive display for users such as, for example, plastic material, metallic material, composite material, wood, and/or any other suitable structural material. For example, display assembly 520 may be formed from polymer materials and plastic materials, e.g., thermoplastic and thermosetting polymers, resins and elastomers, polyethylene, polystyrene, polypropylene, epoxy resins, phenolic resins, hard plastic material, and/or any other suitable material having desired strength for forming structural components.

Display assembly 520 may have any suitable dimensions and/or configuration for being mounted on, at, or near a machine such as machine 305. For example as illustrated in FIGS. 5-7, display member may have dimensions "A" (e.g., between about 3" and about 4", e.g. about 3.5"), "B" (e.g., between about 3" and about 4", e.g. about 3.64"), "C" (e.g., between about 3" and about 4", e.g. about 3.61"), "D" (e.g., between about 10" and about 12", e.g. about 10.75"), "E" (e.g., between about 3" and about 5", e.g. about 4.03"), "F" (e.g., between about 2" and about 3", e.g. about 2.53"), and "G" (e.g., between about 10" and about 12", e.g. about 11.04").

Display assembly 520 may be mounted to an exterior of machine 305, partially within machine 305, or at a position near machine 305 (e.g., on a wall or stand). As illustrated in FIG. 3, display assembly 520 (e.g., or display assembly 320) may be in communication with one or more components of system 300. In at least some exemplary embodiments, display assembly 520 may be contained in a plastic or metal housing that may be attached to an exterior of machine 305 (e.g., a pool table exterior).

Indicator assembly 525 may include a controller similar to controller 355 that may control an operation of display assembly 520, and/or a power connector and a power source similar to power connector 345 and power storage 340 that may provide power to display assembly 520. Also for example, display assembly 520 may be selectively connected to (e.g., communicate with) tracking system 310 and/or machine 305 and controlled by controller 355 and powered by power source 350 and/or power storage 340.

Indicator assembly 525 may include a plurality of indicators 535. Indicators 535 may be any suitable component or device for providing an indication to a user such as a light, an audio component, and/or any other suitable devices for providing an indication to users. For example, indicator 535 may be a light-emitting diode (LED), an incandescent light component, or any other suitable lighting element. In at least some exemplary embodiments, indicator assembly 525 may include a plurality of indicators 535 (e.g., any desired number such as between two and twelve indicators 535, e.g., eight indicators 535). For example, indicator assembly 525 may include eight indicators 535, which may be numbered as illustrated in FIGS. 5 and 6 (e.g., numbered from "1" to "8" by markings such as etching, decals, or any other suitable marking disposed on or in a surface of indicator assembly 525).

Indicator assembly 525 may also include one or more indicators 540 and one or more indicators 545. Indicators 540 and 545 may be similar to indicator 535. Indicator 540 may be a game function indicator. For example, indicator 540 may be an "8, 9, and 10 ball forgiveness" indicator when display assembly 520 is used on machine 305 that may be a pool table. Indicator 545 may be a battery indicator (e.g., low battery indicator). For example, indicator assembly 525 may include a plurality of indicators 545 (e.g., two indicators 545) that may indicate a low battery status of a plurality of batteries of system 300 (e.g., power storage 340 for example as described herein, a D cell battery, a main battery, and/or any other suitable battery). In at least some exemplary embodiments, indicators 545 may be a plurality of low-battery-warning light-emitting diodes.

Indicator assembly 525 may also include an actuator 550. Actuator 550 may be any suitable actuator or other device for being actuated by a user of display assembly 520. For example, actuator 550 may be a button, a switch, a dial, or any other suitable mechanical device, electro-mechanical device, electrical device, or other suitable device that may be actuated by a user. A user may actuate actuator 550 to cause any desired action associated with machine 305 and/or tracking system 310. For example, actuator 550 may cause an operation of operation assembly 315 for example as described above to be performed. In at least some exemplary embodiments (e.g., when machine 305 is a pool table), actuator 550 may be a button such as a push-button that when actuated causes operation assembly 315 that may be a pool ball assembly to release a plurality of pool balls. Actuator 550 may be an "8, 9 and 10 ball forgiveness" button that may be pushed during a game of pool when machine 305 is a pool table to release a plurality of balls to a user (e.g., restart a game of pool).

Indicator assembly 525 may also include a plurality of recesses 552 that may be configured to receive one or more objects 554 (e.g. markers, coins, chips, or other suitable objects for use with a game or activity of machine 305). For example, indicator assembly 525 may include a plurality of recesses 552 that may be aligned with (e.g., and correspond to) indicators 535 and may be configured to receive objects 554 that may be quarters or other coins. Indicator assembly 525 may also include a recess 553 that may be similar to recess 552 and may be a free game spot for example as described below.

Display member 530 may be attached to indicator assembly 525 and may display any desired information to users of display assembly 520. For example, display member 530 may include marking 555 that may be printed characters, etched characters, silk screened characters, a decal or sticker including characters, or any other desired text or characters. Marking 555 may be game rules or use instructions for playing a desired game or engaging in a desired use of machine 305 (e.g., instructions on how to play a variant of pool or billiards, how to play a type of dart game, how to play air hockey, or any other game associated with a given machine 305).

Display member 530 may also include a plurality of markings 560. Markings 560 may be text or characters having numbers corresponding to indicators 535 (e.g., numbered indicators 535 as illustrated in FIGS. 5 and 6). For example, markings 560 may be printed characters, etched characters, silk screened characters, or any other type of characters (e.g., stickers or decals) that may be numbers or other characters corresponding to a numbering of indicators 535. Display member 530 may be a chalk board, a lit eraser marker or dry erase board, a smart board, an LED or LCD display, or any other suitable display board. Markings 560 may be silk screened numbers (e.g., 1 to 8) that may be printed (e.g., printed vertically) in sequential order on display member 530. Players using machine 305 may write or type their name (e.g., using chalk, dry erase markers, or typing using an electronic user interface) next to their respective number on display member 530 that may correspond to the numbers or characters on indicator assembly 525. Display member 530 may thereby help users or players to recognize and interpret indicators 535, 540, and 545 during an operation of display assembly 520, machine 305, and/or tracking system 310. In at least some exemplary embodiments, display member 530 may include an aperture 565 that may for example be used to mount or hang display assembly 520.

Figure 8:
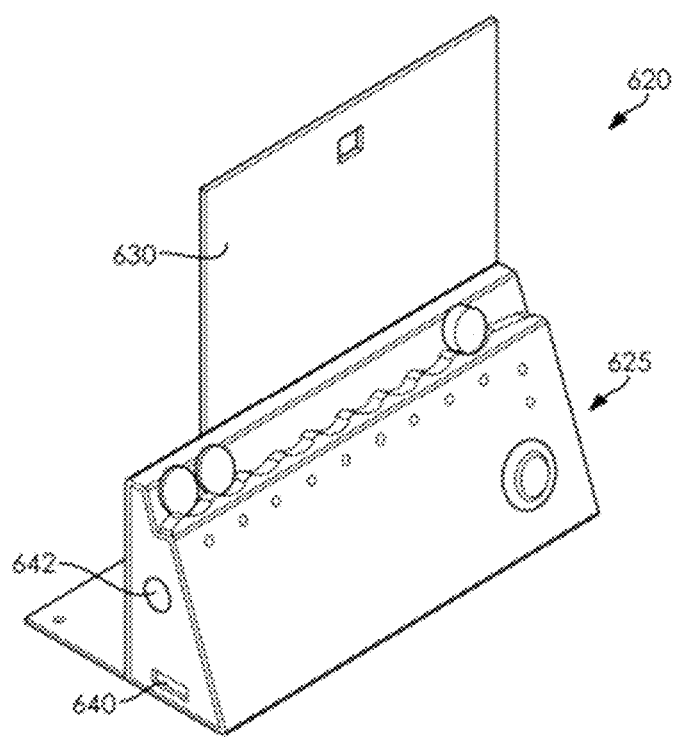
FIG. 8 is a perspective illustration of an exemplary embodiment of the present disclosure.
Figure 9:
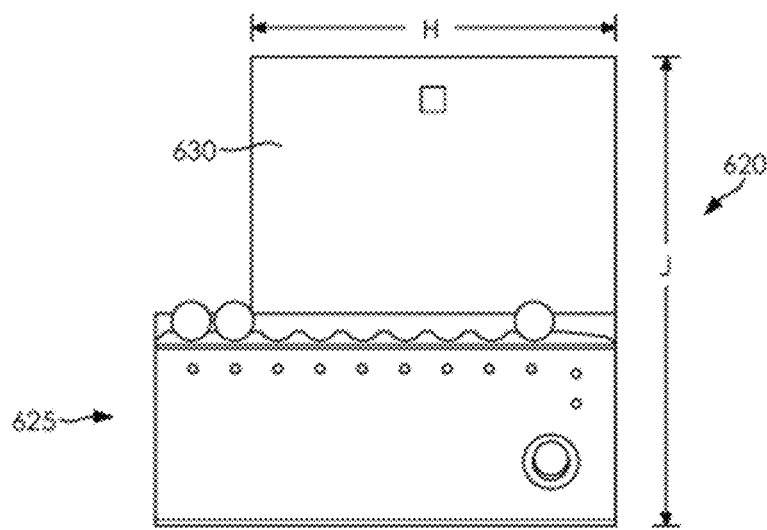
FIG. 9 is a front illustration of an exemplary embodiment of the present disclosure.
Figure 10:
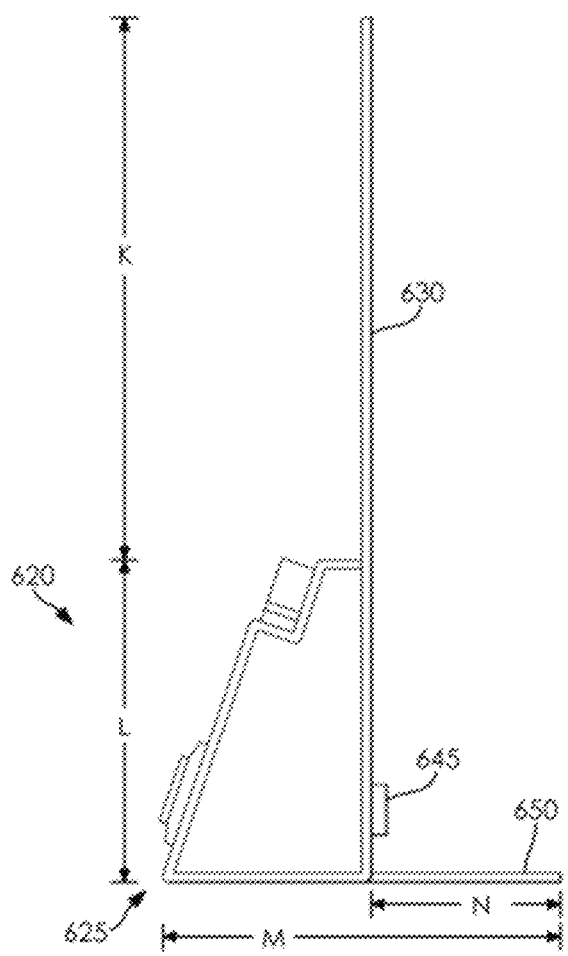
FIG. 10 is a side illustration of an exemplary embodiment of the present disclosure.

FIGS. 8-10 illustrate another exemplary embodiment of the exemplary disclosed system, method, and apparatus. Display assembly 620 may include an indicator assembly 625 and a display member 630 that may be generally similar to and include similar components (e.g., similar to indicators 535, 540, and 545, actuator 550, recess 552 configured to receive object 554, markings 555 and 560, and aperture 565) as indicator assembly 525 and display member 530 for example as described above.

Indicator assembly 625 may include a communication component 640. Communication component 640 may be disposed at any desired portion of indicator assembly 625 (e.g., any desired surface). For example as illustrated in FIG. 8, communication component 640 may be disposed at a side portion of indicator assembly 625. Communication component 640 may connect to components of tracking system 310 via any suitable wireless or wire communication (e.g., similar to for example as described herein). In at least some exemplary embodiments, communication component 640 may include a key switch that may connect to tracking system 310 (e.g., may allow the exemplary disclosed display assembly to communicate with components of tracking system 310). Communication component 640 may also include a tracking device that may be similar to tracking device 335. An operator of display assembly 620 may selectively activate communication component 640. For example during tournament play using one or more machines 305, an operator of display assembly 620 may activate (e.g., turn on via a key switch) communication component 640 to communicate with tracking system 310. In at least some exemplary embodiments, communication component 640 may be a tournament meter that may be controlled by a key switch 642 (e.g., DPDT key switch) that may be mounted above communication component 640 that may be the tournament meter. Communication component 640 that may be the tournament meter may count when key switch 642 is turned on. A main counter disposed inside machine 305 may count substantially all (e.g., every) drop of the pool balls. A key of key switch 642 may be taken out in a plurality of positions (e.g., on and off). Tracking system 310 may track how many times communication component 640 that may be the tournament counter counts the ball drops so that this exemplary count may also be tracked from the exemplary disclosed app. Key switch 642 (e.g., the Tournament key switch) may operate with or without the app hooked up.

As illustrated in FIG. 10, indicator assembly 625 may also include one or more electrical components 645. Electrical component 645 may be any suitable component for providing electrical power (e.g., to a device) such as a charger port for an electronic device. For example, electrical component 645 may be a USB charging port, a wireless charging device, or any other suitable device for charging a device (e.g., such as a smartphone). Display assembly 620 may include a member 650 that may be attached to indicator assembly 625 and/or display member 630. Member 650 may be a plate or shelf for supporting one or more devices (e.g., a user device such as a phone, smartphone, or tablet) for example when the one or more devices are being charged by one or more electrical components 645. For example, a plurality of user devices (e.g., two, three, or more phones) may rest on member 650 as they are charged.

Display assembly 620 may have any suitable dimensions and/or configuration for being mounted on, at, or near a machine such as machine 305. For example as illustrated in FIGS. 8-10, display member may have dimensions "H" (e.g., between about 7" and about 11", e.g. about 8.5"), "I" (e.g., between about 9" and about 12", e.g. about 10.75"), "J" (e.g., between about 9" and about 13", e.g. about 11.95"), "K" (e.g., between about 5" and about 7", e.g. about 6.05"), "L" (e.g., between about 4" and about 6", e.g. about 5.00"), "M" (e.g., between about 4" and about 7", e.g. about 5.73"), and "N" (e.g., between about 2" and about 4", e.g. about 2.95").

Display assembly 520 may include components similar to communication component 640, electrical component 645, and member 650. For example, components similar to communication component 640 and electrical component 645 may be disposed at desired surfaces of indicator assembly 525, and a member similar to member 650 may be attached to indicator assembly 525 and/or display member 530.

An exemplary operation of the exemplary disclosed display assembly will now be described. Although the exemplary operation is described using display assembly 520, display assembly 620 may also exhibit similar features during operation.

Display assembly 520 (e.g., or display assembly 620) may operate in a straight pool mode or setting. A user (e.g., a player) may insert bills or coins (e.g., quarters) or use an app to pay and to drop pool balls to play (e.g., via an operation of operation assembly 315). A first indicator 535 (e.g., marked "1" in FIGS. 5 and 6 such as a "Challenger LED 1") may make a first indication (e.g., light up solid) for example when the balls drop. If time play has not been set up on machine 305 that may be a pool table, then LED 1 may remain solid until another user pays to use machine 305. When the first player (or set of players or users) ends the game, a next player may insert money or put up app credits to activate operation assembly 315 to drop balls. The first indicator 535 (e.g., marked "1" in FIGS. 5 and 6 such as a "Challenger LED 1") may go out and a second indicator 535 (e.g., marked "2" in FIGS. 5 and 6 such as a "Challenger LED 2") may light up. Display assembly 520 may operate based on a predetermined reset time (e.g., 20 minutes). For example, after 20 minutes the second indicator 535 (e.g., marked "2" in FIGS. 5 and 6 such as a "Challenger LED 2") may go out. For example, if machine 305 is not being used for a period longer than the reset time, indicators 535 may go out, which may prevent the exemplary disclosed batteries powering display assembly 520 from being drained.

Display assembly 520 (e.g., or display assembly 620) may operate in a timed pool mode or setting. A user (e.g., a player) may insert bills or coins (e.g., quarters) or use an app to pay and to drop pool balls to play (e.g., via an operation of operation assembly 315). A first indicator 535 (e.g., marked "1" in FIGS. 5 and 6 such as a "Challenger LED 1") may make a first indication (e.g., light up solid). Display assembly 520 may operate based on a predetermined reset time (e.g., 20 minutes for example as set by an owner of system 300). When the predetermined reset time (e.g., 20 minutes) has expired, first indicator 535 (e.g., marked "1" in FIGS. 5 and 6 such as a "Challenger LED 1") may flash or make any other suitable predetermined action to notify users, and operation assembly 315 may no longer operate (e.g., operation assembly 315 that may be a ball gate may close). Operation assembly 315 may not operate (e.g., operation assembly 315 that may be a ball gate may not open up until cash or app money has been vended). Also for example, a second indicator 535 (e.g., marked "2" in FIGS. 5 and 6 such as a "Challenger LED 2") may not light up solid until a second user (e.g., "challenger two") pays, which may cause the first indicator 535 (e.g., marked "1" in FIGS. 5 and 6 such as a "Challenger LED 1") to stop flashing. Accordingly, once the first indicator 535 (e.g., marked "1" in FIGS. 5 and 6 such as a "Challenger LED 1") stops flashing and the second indicator 535 (e.g., marked "2" in FIGS. 5 and 6 such as a "Challenger LED 2") lights up solid then users may be notified that the second user (e.g., "challenger two") has paid.

In at least some exemplary embodiments, indicator 540 that may be an "8, 9, and 10 ball forgiveness" indicator may light up once money or an app is vended as described for example herein. For example, indicator 540 (e.g., eight ball forgiveness) may activate (e.g., light up solid) on the straight pool mode or setting and/or the timed pool mode or setting if an operator of system 300 has selected indicator 540 to be turned on (e.g., based on providing input to the exemplary disclosed controller and/or indicator assembly 525). In at least some exemplary embodiments, an indicator such as a sticker or other suitable marking may be placed near indicator 540 (e.g., next to indicator 540, for example vertically) to notify users (e.g., let challengers know) that machine 305 has eight ball forgiveness and that eight ball forgiveness has been activated.

In at least some exemplary embodiments, indicator 545 that may be a low battery indicator that may flash and/or make any other suitable warning to notify users (e.g., players and/or an owner of machine 305) that a battery of system 300 is low and that power connector 345 should be plugged into power source 350 (e.g., or batteries should be serviced or recharged before reaching unrecoverable battery levels). An app of system 300 may also warn users (e.g., via a user device such as a smartphone) of low battery levels.

In at least some exemplary embodiments, system 300 may operate in a free game challenge (FGC) mode or setting. The free game challenge mode or setting may utilize display assembly 520 (e.g., and tracking system 310) to keep track of player order of users of machine 305. A user (e.g., a player) may insert bills or coins (e.g., quarters) or use an app to pay and to drop pool balls to play (e.g., via an operation of operation assembly 315). Actuator 550 may also be pressed to start the game for example as described herein. Users may write or enter their names at markings 560 for example as described above. Users may also place a respective object 554 at recess 552 corresponding to their name at respective marking 560 (e.g., "challenger two" who writes his or her name at marking 560 labeled "2" may put his or her object 554 at recess 552 labeled "2"). When some or all markings 560 are taken, a user already playing on machine 305 may be challenged by "Challenger 1" (e.g., who may have written his or her name at marking 560 labeled "1" and may have put his or her object 554 at recess 552 labeled "1" at which that indicator 535 may be lit) and play a game using machine 305.

If "Challenger 1" wins the game, he or she may leave his or her object 554 (e.g., a coin such as a quarter) on recess 552 labeled "1." Then, "Challenger 2" (e.g., who may have written his or her name at marking 560 labeled "2" and may have put his or her object 554 at recess 552 labeled "2") may challenge "Challenger 1." A user (e.g., "Challenger 2") may insert bills or coins (e.g., quarters) or use an app to pay and to drop pool balls to play (e.g., via an operation of operation assembly 315). Actuator 550 may also be pressed to start the game for example as described herein. If "Challenger 1" loses the game with the first user, then he or she may remove his or her object 554 from recess 552 labeled "1" and place it on recess 553 (e.g., the free game spot). "Challenger 2" may leave his or her object 554 in recess 552 labeled "2" at which indicator 535 may be lit. After winning against "Challenger 1," "Challenger 2" may play "Challenger 3" (e.g., who may have written his or her name at marking 560 labeled "3" and may have put his or her object 554 at recess 552 labeled "3" at which indicator 535 may be lit). A user (e.g., "Challenger 3") may insert bills or coins (e.g., quarters) or use an app to pay and to drop pool balls to play (e.g., via an operation of operation assembly 315). Actuator 550 may also be pressed to start the game for example as described herein. If "Challenger 2" wins against "Challenger 3," "Challenger 2" may again leave his or her object 554 in recess 552 labeled "2." "Challenger 3" may remove his or her object 554 from recess 552 labeled "3" and place it on recess 553 (e.g., the free game spot for example on top of object 554 placed by "Challenger 1").

Gameplay may continue similarly to as described above. Indicator 535 corresponding to the current challenging player (e.g., according to the numbering for example illustrated at FIGS. 5 and 6) may be lit during the game in which that challenger is challenging the winner of the previous game (e.g., indicator 535 numbered "5" may be lit while "Challenger 5" is challenging the winner of the previous game). After each game, the player who wins may leave his or her object 554 in recess 552 marked with his or her number at his or her recess 552, and the player who loses may move his or her object 554 to recess 553 (e.g., the free game spot). Eventually, objects 554 (e.g., quarters) of all but one player may be moved to recess 553 (e.g., the free game spot). For example continuing the example above regarding "Challenger 2," it "Challenger 2" wins the remaining games against "Challenger 4" through "Challenger 8" (e.g., or any desired number of challengers), objects 554 of all of the other players other than "Challenger 2" may be placed in recess 553 (e.g., the free game spot). "Challenger 2" may then take objects 554 (e.g., may retain the value of objects 554 that may be markers, chips, or coins, or play a free game on machine 305 by inserting objects 554 into operation assembly 315).

In at least some exemplary embodiments, system 300 may operate in a tournament play mode or setting. Users may activate communication component 640 for example as described above to connect the exemplary disclosed display assembly (e.g., display assembly 320, display assembly 520, or display assembly 620) to components of tracking system 310. For example, the exemplary disclosed display assembly (e.g., display assembly 320, display assembly 520, or display assembly 620) may communicate with relay 325 (e.g., and/or tracking device 335). In the tournament play mode or setting, operation assembly 315 may be operated each time a user pushes actuator 550 (e.g., an "8, 9 and 10 ball forgiveness" button). For example as users play on machine 305 in the tournament play mode or setting, users may operate operation assembly 315 to drop pool balls and continue play by pushing actuator 550. Each time a user actuates actuator 550, the exemplary disclosed display assembly (e.g., display assembly 320, display assembly 520, or display assembly 620) may communicate with tracking system 310 (e.g., via relay 325) to operate operation assembly 315 (e.g., via relay 325, controller 355, and/or tracking device 335 as described above). For example, the exemplary disclosed display assembly (e.g., display assembly 320, display assembly 520, or display assembly 620) may emit an electrical pulse (e.g., based on an actuation of actuator 550), which may be similar to the exemplary electrical pulses described above (e.g., an electrical pulse of between 5 volts and 24 volts such as a 12 volt DC electrical pulse), to tracking device 335 via relay 325. The level and/or amount of electrical pulses emitted may determine a type of game selection for machine 305, an amount of game time (e.g., 30 minutes) purchased for machine 305, and/or any other desired parameter for use of machine 305. The exemplary disclosed system, method, and apparatus may also operate using serial protocol (e.g., using serial communications interface). For example, the exemplary disclosed electrical pulses may include and/or encompass serial protocol. Tracking device 335 and/or the tracking device of the exemplary disclosed display assembly (e.g., display assembly 320, display assembly 520, or display assembly 620) may track or count each time actuator 550 is actuated to operate operation assembly 315 (e.g., to drop balls). Similar to as described for example herein, a predetermined fee could be agreed on to charge a user running a tournament (e.g., so that an owner of machine 305 may generate and track revenue from tournament play, including greens fee tournaments or any other suitable type of tournament). Accordingly, the tournament play mode or setting may allow for users or event organizers to be charged per game (e.g., each time actuator 550 is pressed or actuated) without money being paid via coins, currency, or via app payment. That is for example, the tournament play mode or setting may allow for users or event organizers to be charged each time actuator 550 is pressed to cause operation assembly 315 to operate (e.g., drop pool balls).

In at least some exemplary embodiments, the exemplary disclosed display assembly (e.g., display assembly 320, display assembly 520, or display assembly 620) may allow for charging of device such as smart phones for free when a game is being played (e.g., via electrical component 645). Also for example, the phone charging service may be purchased by users via an app of system 300 (e.g., a timer circuit may turn off electrical component 645 once paid time has expired). Also for example, a company may provide power charging for free for example in exchange for advertising.

FIGS. 11 and 12 graphically illustrate features of an algorithm that may be used to control available features of system 300 as a function of payment made to system 300. For example as illustrated in FIGS. 11 and 12, controller 355 may control system 300 to provide predetermined play times or periods to users of machine 305 based on payment provide by users to system 300.

Figure 13:
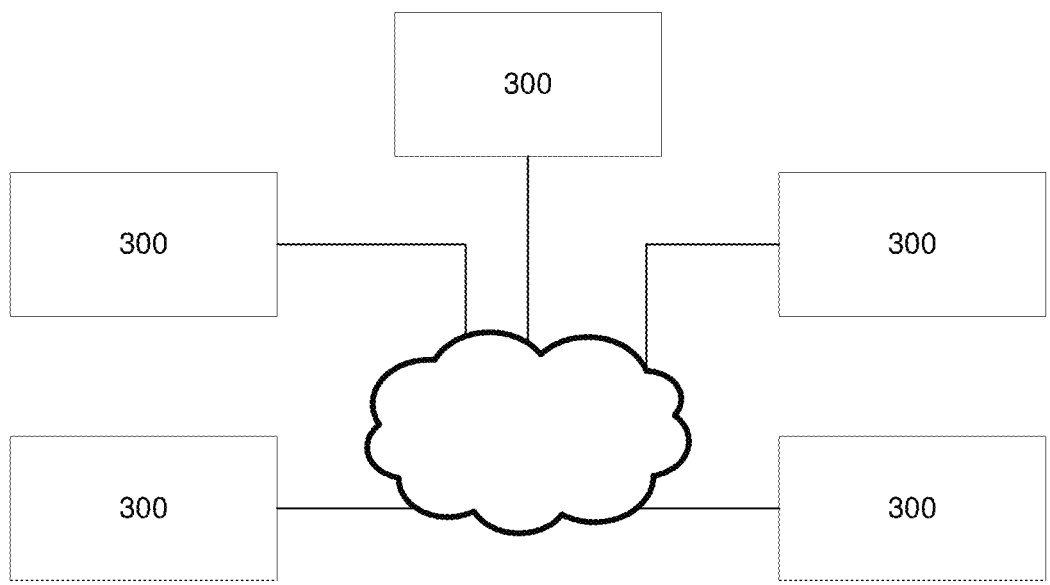
FIG. 13 is a schematic illustration of an exemplary embodiment of the present disclosure.

FIG. 13 schematically illustrates a system including a plurality of systems 300. Each system 300 may communicate with some or all of the other systems 300 via network communication, direct wire or wireless communication, or any other suitable communication technique as described for example herein. Data collected by all systems 300 (e.g., by an operation of respective tracking devices 335 and/or controllers 355) may be aggregated together and processed. For example, tournament play involving any desired number of systems 300 disposed in any desired locations may be facilitated by the exemplary disclosed system, method, and apparatus. For example, the exemplary disclosed system and method may determine a total number of times the exemplary disclosed operation assemblies 315 of a plurality of exemplary disclosed game machines 305 were actuated.

Figure 14A:
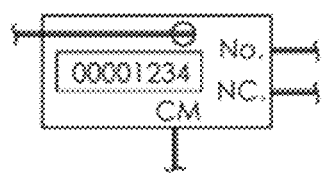
FIG. 14A is a schematic illustration of an exemplary embodiment of the present disclosure.
Figure 14B:
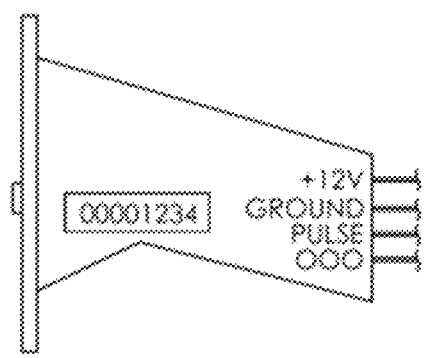
FIG. 14B is a schematic illustration of an exemplary embodiment of the present disclosure.
Figure 14C:
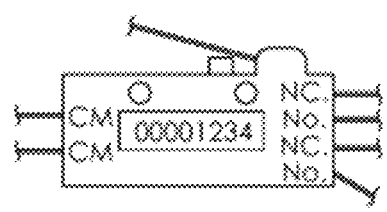
FIG. 14C is a schematic illustration of an exemplary embodiment of the present disclosure.

FIGS. 14A, 14B, and 14C schematically illustrate exemplary embodiments of exemplary disclosed coin switches and relays for example as described above. For example, FIG. 14A illustrates an exemplary switch (e.g., coin switch) having an un-resettable coin meter. FIG. 14B illustrates an exemplary switch (e.g., coin acceptor) having an un-resettable coin meter. FIG. 14C illustrates an exemplary switch (e.g., DPDT switch) having an un-resettable coin meter. Coin switches and/or coin meters that may be included in operation assembly 315 (e.g., to initiate a start of a pool game by dropping pool balls) may include electro-mechanical coin meters in exemplary disclosed switch of operation assembly 315. For example, by having a coin switch (e.g., as illustrated in FIGS. 14A-14C, such as a DPDT switch) having built-in meters that may work mechanically or electronically, a double-check may be provided on a primary or main meter that may be installed in machine 305 (e.g., in operation assembly 315). In at least some exemplary embodiments, a coin meter that may be installed in machine 305 may be disconnected (e.g., by a hired collector of a vending company, for example, unsuitably disconnected). By having a switch (e.g., coin meter such as illustrated in FIGS. 14A to 14C) built into a switch of operation assembly 315, there may be substantially no way to cheat on how many coins or vends may occur on machine 305.

Figure 15:
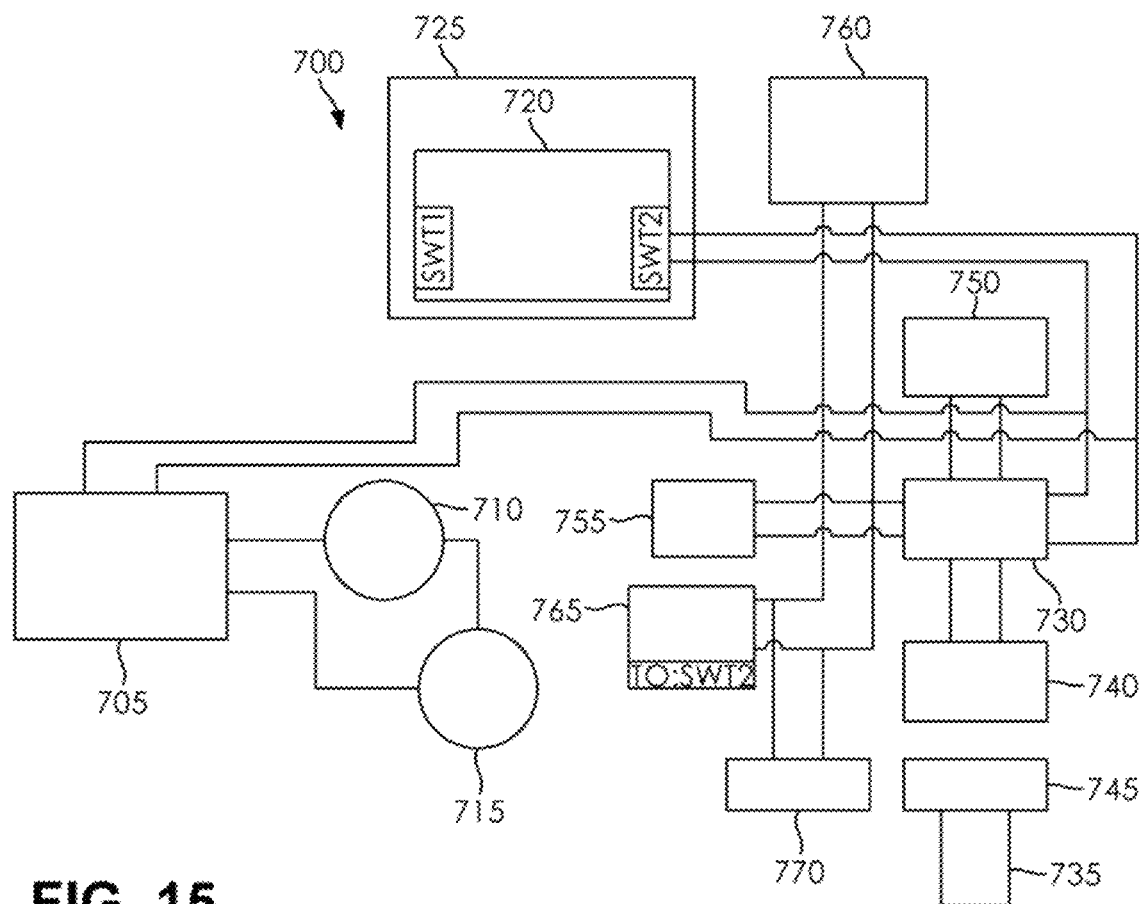
FIG. 15 is a schematic illustration of an exemplary embodiment of the present disclosure.

FIG. 15 illustrates another exemplary embodiment of the exemplary disclosed system, method, and apparatus. System 700 may be used in generally similar applications as system 300. System 700 may include an electro-mechanical coin meter and/or a contactless payment system for example as described herein. In at least some exemplary embodiments, system 700 may include a contactless pool table coin chute with electro-mechanical coin meter and pay range payment for some or substantially all commercially-available game machines such as pool tables.

System 700 may include a meter assembly 705 that may include components similar to display assembly 320, display assembly 520, and/or display assembly 620. In at least some exemplary embodiments, meter assembly 705 may be a free play and league meter similar to the exemplary disclosed components described herein. Meter assembly 705 may include (e.g., be electrically connected to) an actuator 710 that may be similar to actuator 550 and also a key switch 715 that may be similar to key switch 642.

Meter assembly 705 may be electrically connected to a circuit board 720 of a machine 725 that may be similar to machine 305. For example, system 700 may operate similarly relative to machine 725 as the exemplary operation described above of system 300 relative to machine 305. In at least some exemplary embodiments, circuit board 720 may be a smart electronic circuit board such as, for example, a smart pool table electronic circuit board (e.g., a Diamond smart pool table electronic circuit board). Circuit board 720 may include components similar to components of controller 355. Meter assembly 705 may also be electrically connected to a relay 730. Relay 730 may include components that may be similar to relay 325. In at least some exemplary embodiments, relay 730 may be a DPDT relay such as a 12V DPDT relay. Relay 730 may be for example a coin chute relay.

Figure 16:
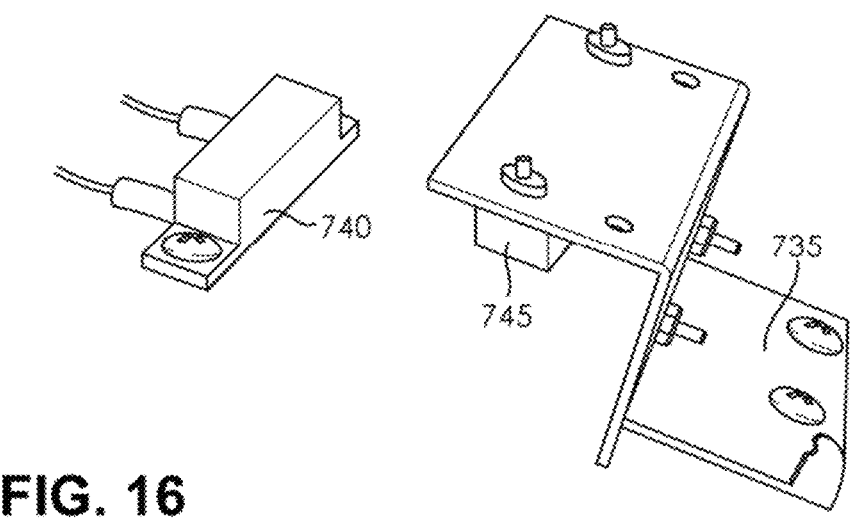
FIG. 16 is a perspective illustration of an exemplary embodiment of the present disclosure.

For example as illustrated in FIGS. 15 and 16, relay 730 may be selectively connected with a payment mechanism 735 via a switch 740 and a magnet 745. Payment mechanism 735 may include any suitable mechanical components for forming a movable assembly such as structural members (e.g., angles and/or channels), fasteners (e.g., bolts and other suitable fasteners), springs, and/or any other suitable components. In at least some exemplary embodiments, payment mechanism 735 may be a coin chute mechanism or any other suitable mechanism configured to receive coin and/or currency payment. Payment mechanism 735 may be a coin push chute that may be configured to push a switch (e.g., a large DPDT micro switch) to actuate machine 725 (e.g., drop pool balls), though in the present embodiment payment mechanism 735 may move magnet 745 to actuate switch 740 as described below. Payment mechanism 735 may allow for cash (e.g., coin) payment for use of machine 725.

Switch 740 may be any suitable electrical switch for operating with magnet 745. For example, switch 740 may be a reed switch (e.g., a switch including ferromagnetic members that may be moved together when close to magnet 745). Switch 740 may be a normally open reed switch. As illustrated in FIG. 16, magnet 745 may be attached to a movable component (e.g., a movable assembly of structural components forming a coin chute that may be pushed inward toward a pool table by a user and urged back outward by attachment to a spring) of payment mechanism 735. As magnet 745 is moved toward and near (e.g., over or above) switch 740, switch 740 may be operated. For example, magnet 745 being disposed at or close to switch 740 may cause ferromagnetic members of switch 740 that are disposed apart in a normally open position to move together to cause switch 740 to move to a closed position. Magnet 745 being moved near switch 740 may cause switch 740 to close a circuit with relay 730. Switch 740 may close a 12 vdc relay circuit to activate circuit board connector SWT2 of circuit board 720 to activate (e.g., to pull) a solenoid of machine 725 (e.g., to actuate machine 725, for example to drop pool balls for example as described herein). For example, machine 725 may include a solenoid (e.g., for controlling a ball drop of a machine 725 when it may be a pool table) that is activated based on an operation of switch 740. The solenoid may be similar to the exemplary disclosed solenoid described below regarding FIGS. 18, 19, and 20A through 20C.

System 700 may also include a tracking device 750 that may be similar to tracking device 335. In at least some exemplary embodiments, tracking device 750 may be a 12 VDC coin meter. Tracking device 750 may be electrically connected to relay 730. A converter 755 may be electrically connected to relay 730. Converter 755 may be a 12 VDC converter. For example, converter 755 may be a wall outlet converter.

System 700 may include a power storage 760 that may be similar to power storage 340. In at least some exemplary embodiments, power storage 760 may be a 12 VDC battery. Power storage 760 may be electrically connected to a payment device 765 that may be similar to payment device 330. In at least some exemplary embodiments, payment device 765 may be a Pay Range Blue Key payment device. Payment device 765 may be electrically connected to connector SWT2 of circuit board 720 as illustrated in FIG. 15. Payment device 765 may also be electrically connected to a relay 770 that may be similar to relay 325. In at least some exemplary embodiments, relay 770 may be a 12 VDC DPDT solid state relay.

In at least some exemplary embodiments, system 700 may be used with any suitable (e.g., substantially all) commercial pool tables. For example, system 700 may operate with Diamond pool tables based on using a DPDT 12 vdc relay. Magnet 745 may be attached to an end portion of payment mechanism 735. Magnet 745 may trip a normally open switch 740 to provide for contactless operation of switch 740 for example as described above.

In at least some exemplary embodiments, switch 740 may selectively close relay 730 based on the exemplary movement of magnet 745 described above to activate connector SWT2 of circuit board 720 to activate (e.g., to pull) a solenoid of machine 725 (e.g., to actuate machine 725, for example to drop pool balls for example as described herein). At the same time, an electrical pulse (e.g., a 12 vdc pulse) may be transferred to tracking device 750 for counting for example as described herein. For example, a number (e.g., one or more numbers) may be put up on tracking device 750 to hack cash plays. Payment device 765 may be electrically connected to (e.g., may be in line with) relay 770 to electrically connect to circuit board 720 to complete a vending transaction of machine 725. For example, relay 770 may be electrically connected to connector SWT2 on circuit board 720 (e.g., may provide for one vending transaction or "vend" at a time).

Figure 17:
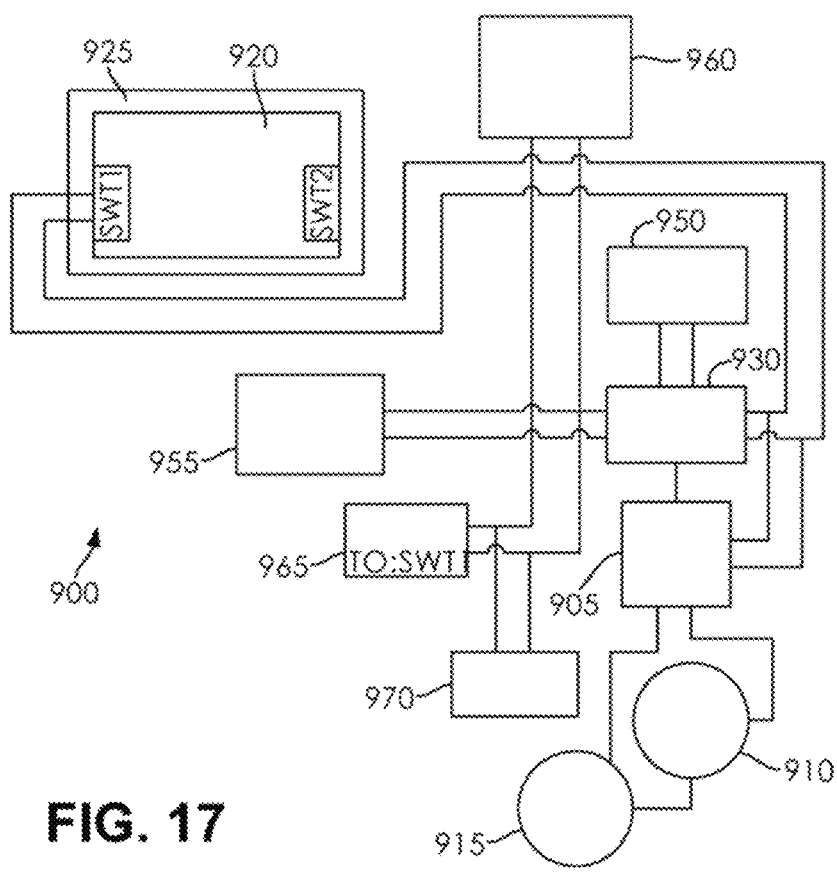
FIG. 17 is a schematic illustration of an exemplary embodiment of the present disclosure.

FIG. 17 illustrates another exemplary embodiment of exemplary disclosed system, method, and apparatus. System 900 may include a meter assembly 905 that may be similar to meter assembly 705, an actuator 910 that may be similar to actuator 710, and a key switch 915 that may be similar to key switch 715. System 900 may also include a circuit board 920 that may be similar to circuit board 720, and a machine 925 that may be similar to machine 725. System 900 may further include a relay 930 that may be similar to relay 730, and a tracking device 950 that may be similar to tracking device 750. System 900 may also include a converter 955 that may be similar to converter 755, a power storage 960 that may be similar to power storage 760, a payment device 965 that may be similar to payment device 765, and a relay 970 that may be similar to relay 770.

As illustrated in FIG. 17, system 900 may provide a timing circuit for a use of machine 925. System 900 may provide any desired time period of the timing circuit such as, for example, between about 5 minutes and about an hour (e.g., about 30 minutes), several hours, or any other desired time period. Circuit board 920 may include a connector SWT1 (e.g., and a connector SWT2). A user may activate the system based on using a mobile device (e.g., mobile application) or other suitable device to activate payment device 965 for example as described herein. For example, the user may use a mobile device to provide payment to payment device 965 to activate the timing circuit of system 900 (e.g., as illustrated in FIG. 17) without involving or using mechanical payment (e.g., coin or cash payment). For example, payment device 965, the exemplary disclosed relays, and circuit board 920 (e.g., via connector SWT1) may be electrically connected to activate machine 925 for use (e.g., to activate one or more solenoids of machine 925 is drop pool balls). Also for example (e.g., based on electrical connection to SWT1 and SWT2), key switch 915, actuator 910, and meter assembly 905 may be electrically connected to circuit board 920 to selectively actuate drop pool balls) of machine 925. The exemplary disclosed meter may thereby be electrically connected (e.g., be in line) to track actuations of machine 925 (e.g., the one or more solenoids dropping pool balls and/or any other desired actuation for any desired use) to track some or substantially all ball drops (e.g., from league play and/or free play options).

Figure 18:
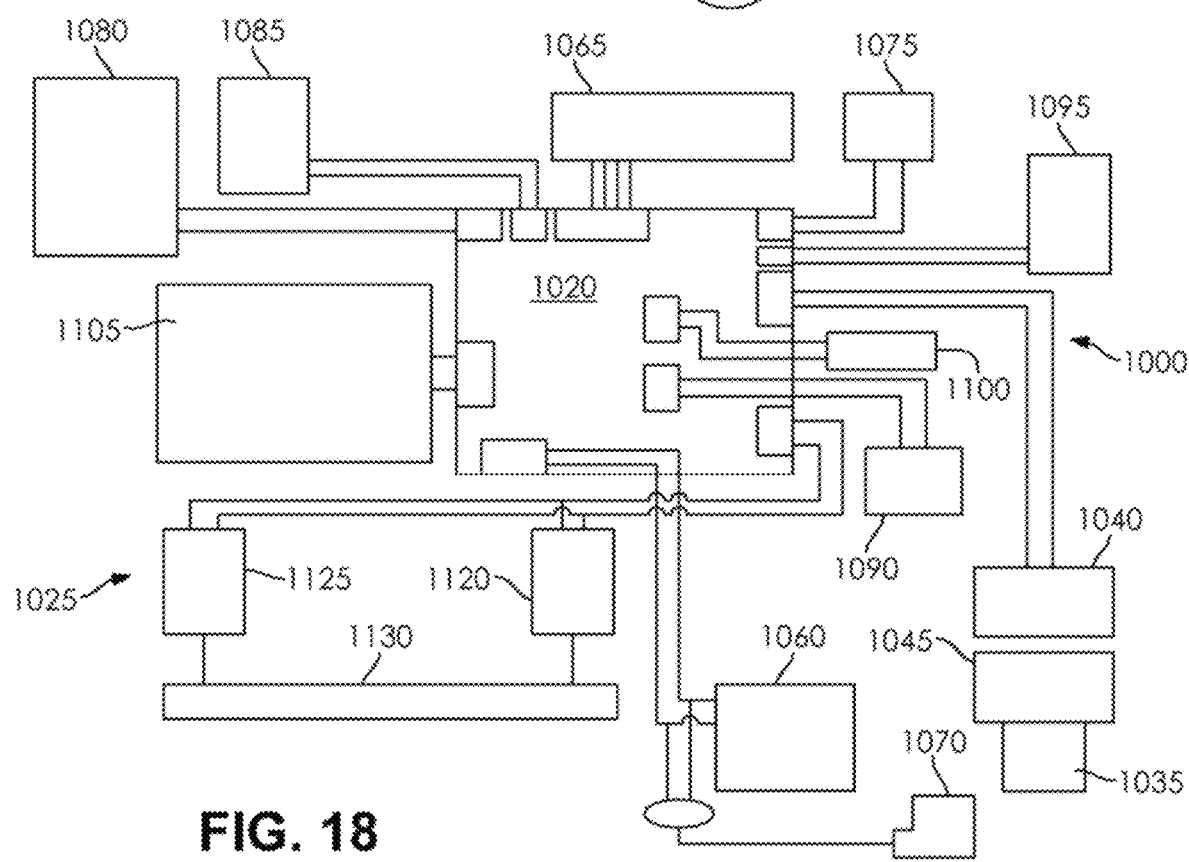
FIG. 18 is a schematic illustration of an exemplary embodiment of the present disclosure.
Figure 19:
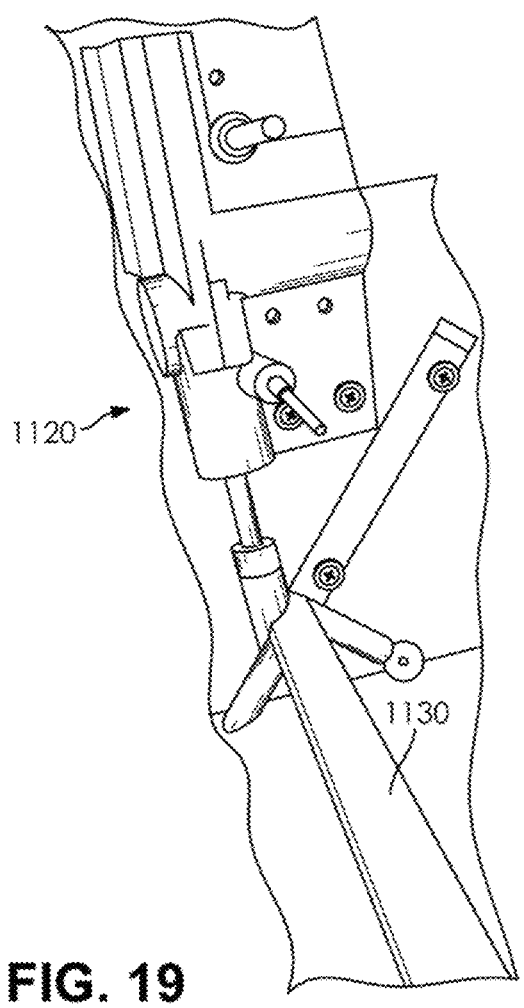
FIG. 19 is a perspective illustration of an exemplary embodiment of the present disclosure.

FIG. 18 illustrates another exemplary embodiment of exemplary disclosed system, method, and apparatus. System 1000 may include a circuit board 1020 that may be similar to circuit board 720. Circuit board 1020 may integrated into and may control a machine 1025 that may be similar to machine 725 (e.g., and including components for example as described below). System 1000 may include a payment mechanism 1035 that may be similar to payment mechanism 735, a switch 1040 that may be similar to switch 740, and a magnet 1045 that may be similar to magnet 745. Switch 1040 may be electrically connected to circuit board 1020 and may selectively control an actuation of machine 1025 for example as described herein.

Any suitable components may be electrically connected to and/or controlled by circuit board 1020. A power storage 1060 that may be similar to power storage 340 may be electrically connected to circuit board 1020. Power storage 1060 may be for example a main 12 VDC battery. A payment device 1065 that may be similar to payment device 765 may also be electrically connected to circuit board 1020. A power connector 1070 that may be similar to power connector 345 may electrically connect circuit board 1020 and machine 1025 to a power source such as a wall outlet. Power connector 1070 may be for example a wall outlet 12 VDC converter.

Also as illustrated in FIG. 18, a sensor 1075 that may be a cue ball sensor or other suitable sensor may be electrically connected to circuit board 1020 and/or machine 1025. A vending component 1080 that may provide for any suitable vending transactions (e.g., coin, currency, mobile application, free play and league play for example similar to meter assembly 705, and/or coin chute mechanical devices) may be electrically connected to circuit board 1020 and/or machine 1025. An acceptor component 1085 that may be a DBA (dollar bill acceptor such as a 110 VAC DBA) may be electrically connected to circuit board 1020 and/or machine 1025. An acceptor component 1090 that may be a DBA (dollar bill acceptor such as a 110 VDC DBA) may be electrically connected to circuit board 1020 and/or machine 1025. A power storage 1095 (e.g., D-Cell battery or batteries such as 12 VDC batteries) and a switch 1100 (e.g., a coin switch) may be electrically connected to circuit board 1020 and/or machine 1025.

Also as illustrated in FIG. 18, a display assembly 1105 that may be similar to display assembly 520 may be electrically connected to circuit board 1020 and/or machine 1025. In at least some exemplary embodiments and as illustrated in FIGS. 21A, 21B, 21C, 21D, and 21E, display assembly 1105 may be a universal board (e.g., a challenger unit) including an actuator 1110 (e.g., for a pool ball drop as illustrated in FIGS. 20A through 20C) that may be similar to actuator 550 and that may be a league and free play switch and counter, player order tracking, 8-ball forgiveness when machine 1025 is a pool table, and/or one or more indicators 1115 that may be low LED battery indicators.

Also as illustrated in FIGS. 18, 19, and 20A through 20C, an electrical actuator 1120 may be electrically connected to circuit board 1020 and/or machine 1025 and may be electrically controlled by circuit board 1020 (e.g., based on an operation of any suitable exemplary disclosed components). Electrical actuator 1120 may be any suitable actuatable electrical component such as, for example, a linear solenoid, a rotary solenoid, or any other suitable electrical and/or magnetic component for actuating an assembly. For example, electrical actuator 1120 may be a 12 VDC push-pull solenoid. Electrical actuator 1120 may operate in conjunction with one or more additional electrical components 1125 such as, for example, additional solenoids or other suitable components (e.g., 12 VDC electrical components) for facilitating an operation of the exemplary components described below.

Figure 20A:
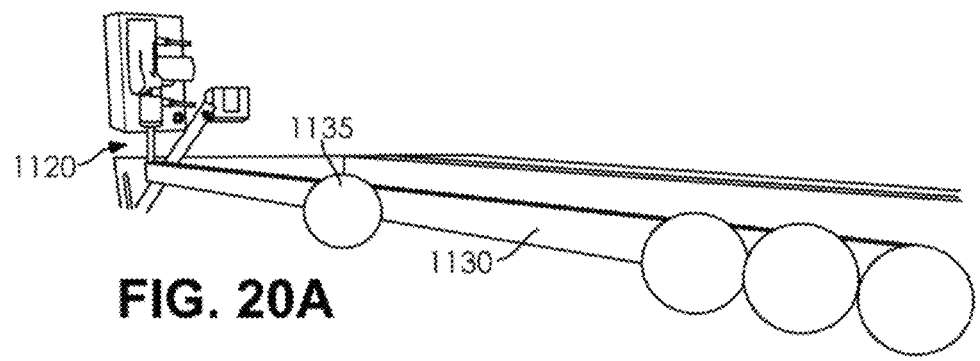
FIG. 20A is a perspective illustration of an exemplary embodiment of the present disclosure.
Figure 20B:
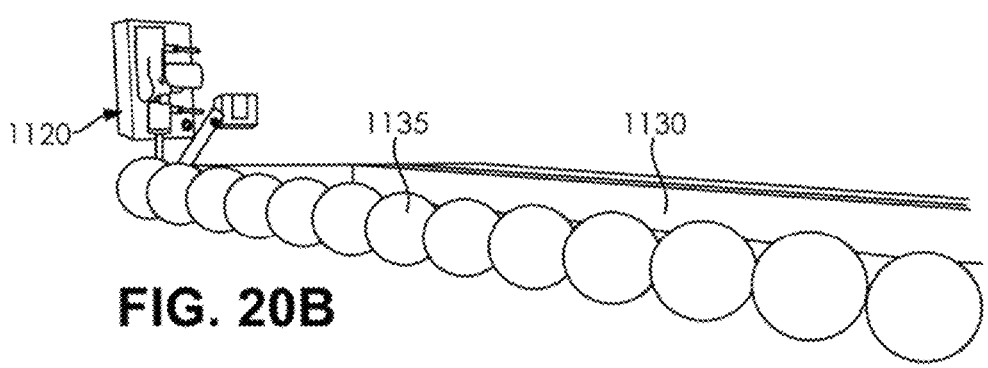
FIG. 20B is a perspective illustration of an exemplary embodiment of the present disclosure.
Figure 20C:
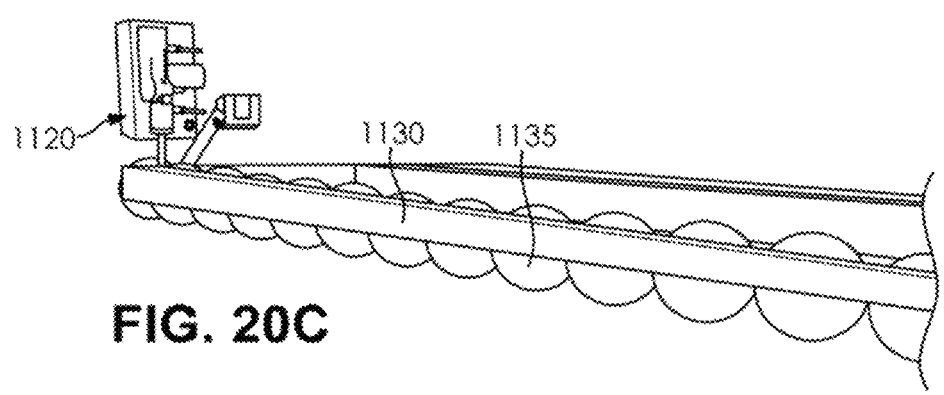
FIG. 20C is a perspective illustration of an exemplary embodiment of the present disclosure.

As illustrated in FIGS. 18, 19, and 20A through 20C, electrical actuator 1120 (e.g., and electrical component 1125) may operate to actuate (e.g., raise and lower) a structural member 1130. Structural member 1130 may be actuated by electrical actuator 1120 and electrical component 1125 to actuate a component of machine 1025 such as structural member 1130. Structural member 1130 may be for example a trap bar that selectively blocks and allows a drop of pool balls (e.g., or any other actuation for any suitable type of machine or activity for example as described herein). Structural member 1130 may hold or retain objects 1135 such as pool balls as shown in FIG. 20A. As illustrated in FIG. 20B, electrical actuator 1120 (e.g., and electrical component 1125) may be activated based on control by circuit board 1020 to move (e.g., actuate) structural member 1130 upward as illustrated in FIG. 20B. As illustrated in FIG. 20C, objects 1135 (e.g., pool balls) may be released (e.g., dropped) for use by users in activities (e.g., pool game) using machine 1025. Structural member 1130 may be an elongated member (e.g., a long metal bar) that may selectively drop pool balls and then either close until payment is made again, or remain open for any desired period of timed play. In at least some exemplary embodiments, the exemplary circuit of system 1000 illustrated in FIG. 18 may provide for a time delay (e.g., between about 2 seconds and about 20 seconds, about a 5 second delay, or any other suitable time delay) to move (e.g., pull upward or pull open) structural member 1130 to provide for some or all balls of system MOO (e.g., that may be a pool table) being dropped when vending occurs.

In at least some exemplary embodiments, system 1000 may include structural member 1130 (e.g., a I2 VDC solenoid-driven trap bar) used with app (e.g., mobile application) or cash payment, 110 AC DB A, 12 VDC DBA acceptors, and/or one or more coin switches. For example, payment mechanism 1035, switch 1040, and magnet 1045 (e.g., forming a contactless coin chute) may activate display assembly 1105 (e.g., a universal board) to have electrical actuator 1120 and electrical component 1125 (e.g., two 12 vdc solenoids) to pull up structural member 1130 such as a trap bar. System 1000 may operate using any suitable features for example as described herein (e.g., League Play, Free Play, Cash Play, player order tracking, 8-Ball forgiveness, App Payments, and/or tracking of some or substantially all league plays and cash plays).

In at least some exemplary embodiments, system 1000 may include a relay (e.g., a 12 VDC solid state relay) that may be similar to relay 770 and that may receive a pulse (e.g., an electrical pulse) from display assembly 1105. Power may then be provided (e.g., 12 vdc provided directly from power storage 1060 such as a battery and/or power connector 1070 such as a converter) to drive electrical actuator 1120 and electrical component 1125, which may be two solenoids.

In at least some exemplary embodiments, structural member 1130 of system 1000 may be added to substantially any coin-operated pool table and/or billiard parlor table to convert such table into an App-operated pool table (e.g., pool table operated by mobile application). When the exemplary system includes both an exemplary disclosed payment mechanism such as a coin chute and an exemplary disclosed payment system such as an app-payment system (e.g., for example as described herein system 1000 may track game plays started with coins and/or mobile app payment. For example, switch 1040 may provide an electrical pulse to circuit board 1020 and/or display assembly 1105 to activate electrical actuator 1120 and electrical component 1125 to actuate structural member 1130 (e.g., to drop the pool balls).

Display assembly 1105 (e.g., a challenger box) for example as illustrated in FIGS. 21A, 21B, 21C, 21D, and 21E may be added (e.g., attached) to such machines 1025 (e.g., pool tables). In at least some exemplary embodiments, such machines 1025 (e.g., operating with components of system 1000 as illustrated in FIG. 18) may utilize the exemplary disclosed 8-ball forgiveness feature, exemplary disclosed battery level displays (e.g., via LEDs mounted in display assembly 1105), and/or the exemplary disclosed league/free play key switch (e.g., similar to key switch 715) with counter to drop pool balls.

FIGS. 22A, 22B, and 22C graphically illustrate features of an algorithm that may be used to control available features of system 700, system 900, and/or system 1000, as a function of payment made to the exemplary disclosed system. For example as illustrated in FIGS. 22A, 22B, and 22C, the exemplary disclosed controller may control system 700, system 900, and/or system 1000 (e.g., and/or any other suitable exemplary disclosed system for example as described herein) to provide predetermined play times or periods to users of the exemplary disclosed machines based on payment provide by users to the exemplary disclosed systems.

FIGS. 23A, 23B, 23C, and 23D illustrate another exemplary embodiment of the exemplary disclosed display assembly. Display assembly 1205 may be generally similar to display assembly 1105 and may include similar components as the components of display assembly 1105 described above. Display assembly 1205 may include a key switch 1210 that may be similar to key switch 642. Display assembly 1205 may also include an actuator 1215 (e.g., a button to drop balls) that may be similar to actuator 550. Display assembly 1205 may also include a game counter 1220 that may display a number of games that have been played (e.g., for example a number of games that have been played during a predetermined time period such as free play or league play). Display assembly 1205 may be rotatably attached to a support member 1225, which may be attached to an exemplary disclosed machine, via a rotatable connector 1230 such as a hinge. Support member 1225 and rotatable connector 1230 may form a hinged mounting bracket that may allow for electrical connectors (e.g., cables or wires) of display assembly 1205 to be attached (e.g., run) to a bottom of the exemplary disclosed machine. Display assembly 1205 may thereby be selectively rotated about rotatable connector 1230 when desired (e.g., to make access to portions of display assembly 1205 and/or the exemplary disclosed machine easier). Display assembly 1205 may also have a display 1235 that may be a liquid crystal display (LCD), a light-emitting diode (LED), or any other suitable display for displaying data of the exemplary disclosed system to a user. An upper portion 1240 may include a surface that may be slanted or tilted (e.g., slanted or tilted downward) so that objects (e.g., a beverage container) may not be placed on the top surface of display assembly 1205.

Figure 24:
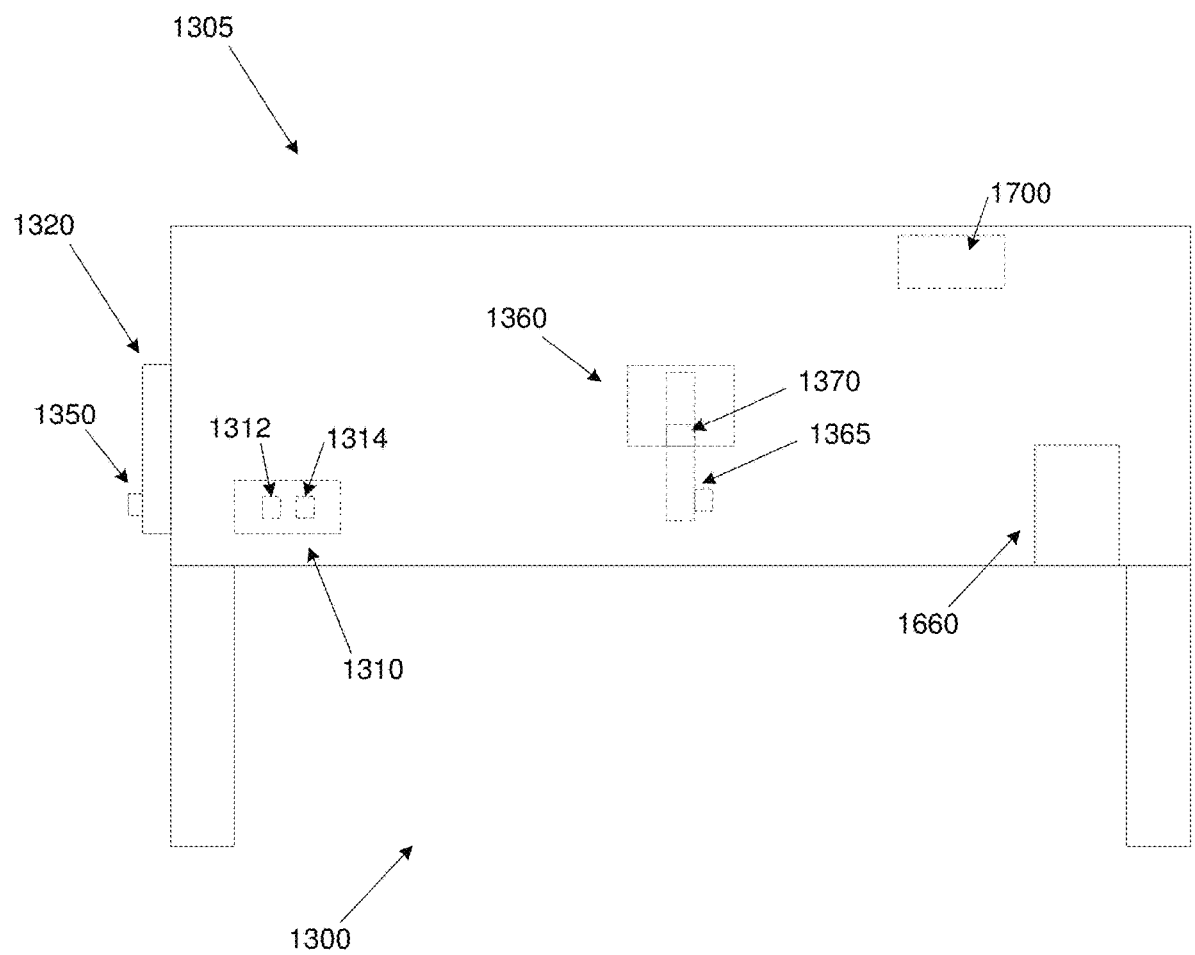
FIG. 24 is a schematic illustration of an exemplary embodiment of the present disclosure.

FIG. 24 illustrates another exemplary embodiment of the exemplary disclosed system, method, and apparatus. System 1300 may be used in generally similar applications as system 300. System 1300 may include an assembly 1305 that may be generally similar to machine 305. Assembly 1305 may be a game assembly. In at least some exemplary embodiments, assembly 1305 may be a game table such as a pool table, an air hockey table, a foosball table, a video game or pinball machine, a jukebox, a vending machine, or any other desired game table. In at least some exemplary embodiments, assembly 1305 may be a manual, non-automated game assembly such as a pool table that may be manufactured or retrofitted with the exemplary disposed components of system 1300 described below.

System 1300 may include a tracking system 1310 that may be similar to tracking system 310. Tracking system 1310 may be provided with a new assembly 1305 or retrofitted (e.g., attached to) an existing assembly 1305. System 1300 may also include a display assembly 1320 that may be similar to display assembly 320, display assembly 520, display assembly 620, display assembly 1105, and/or display assembly 1205. Display assembly 1320 may for example include a challenger control board and/or challenger player unit for example as described herein. Display assembly 1320 may include a key switch similar to key switch 642. Display assembly 1320 may include an actuator 1350 that may be similar to actuator 550.

System 1300 may also include an actuating assembly 1360. Actuating assembly 1360 may include one or more electrical actuators 1365, which may be similar to electrical actuator 1120, and a structural member 1370 that may be similar to structural member 1130. In at least some exemplary embodiments, actuating assembly 1360 may provide structural member 1370 as a vertical trap bar for example as described below.

As described for example herein, tracking system 1310 may include an electric relay 1312 that may be similar to electric relay 325 and that may be connected to actuating assembly 1360. Tracking system 1310 may also include a tracking device 1314 that may be similar to tracking device 335 and that may be connected to electric relay 1312 for example similar to a connection of electric relay 325 as illustrated in FIG. 2. Display assembly 1320 may be selectively connected to electric relay 1312 of tracking system 1310 for example as described herein.

Figure 25:
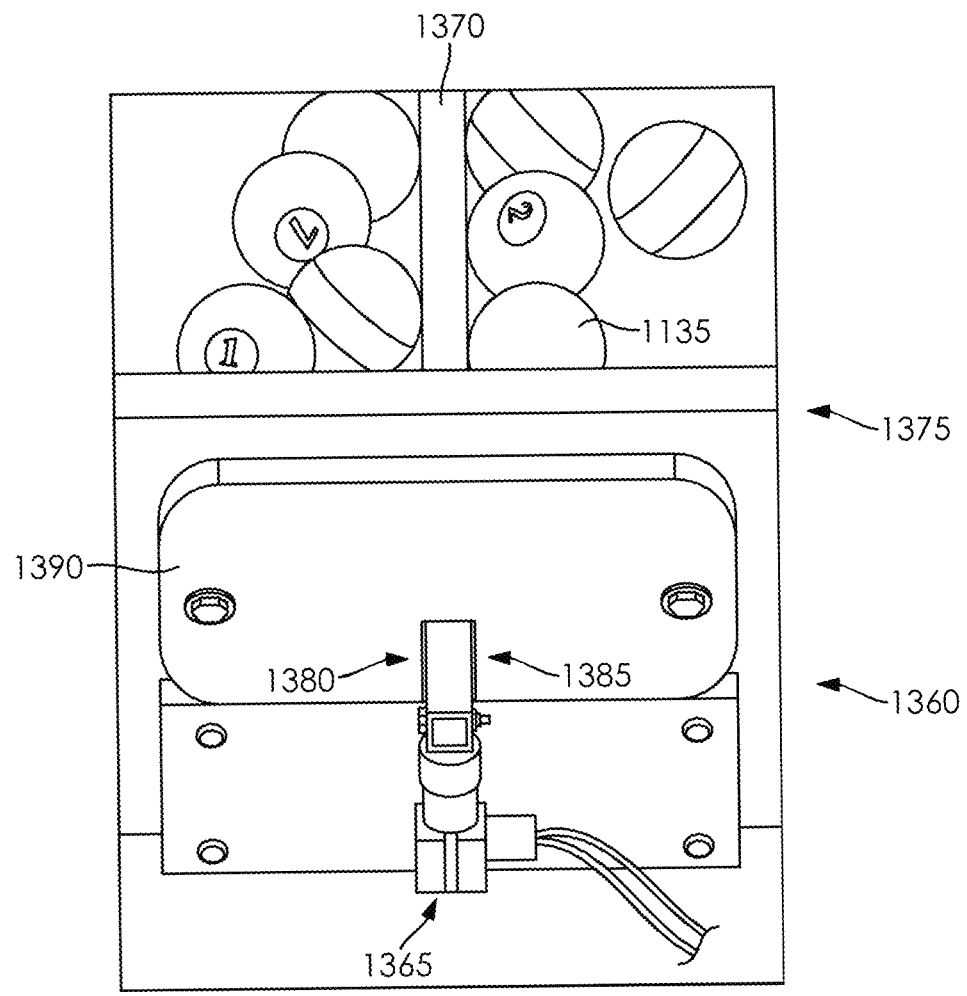
FIG. 25 is a perspective illustration of an exemplary embodiment of the present disclosure.

As illustrated in FIG. 25, actuating assembly 1360 may be attached to a structural frame 1375 disposed inside of assembly 1305. An end portion 1380 of structural member 1370 may be disposed through an aperture 1385 of a member 1390 disposed at each side of structural frame 1375. Member 1390 may be attached to structural frame 1375 via any suitable technique such as via fasteners (e.g., bolts, screws, or nails), adhesive, and/or any other suitable technique. Structural member 1370, structural frame 1375, and member 1390 may be formed from any suitable structural material such as wood, plastic, metal, composite material, and/or any other suitable structural material. Aperture 1385 may be an elongated aperture (e.g., a slot) that may be configured to receive end portion 1380. End portions 1380 at both sides of structural member 1370 may be received in aperture 1385 of each member 1390 disposed for example on opposite sides of structural frame 1375. Aperture 1385 may be aligned over existing apertures of structural frame 1375 and/or apertures corresponding in size may be formed (e.g., cut or removed by any other suitable technique) in structural frame 1375 to be aligned with apertures 1385. End portions 1380 of structural member 1370 may thereby extend through apertures 1385 and apertures of structural frame 1375 and be supported by electrical actuators 1365 disposed at both sides of structural frame 1375. For example as illustrated in FIG. 25, electrical actuators 1365 may be attached to both sides of structural frame 1375 via any suitable technique such as via fasteners (e.g., bolts, screws, or nails), adhesive, and/or any other suitable technique. Actuators 1350 may also be any other suitable type of actuators such as hydraulic or pneumatic devices. Electrical actuators 1365 may operate to move structural member 1370 up and down based on end portions 1380 being moved up and down along corresponding apertures 1385. Apertures 1385 may thereby guide a movement of structural member 1370 for example to guide a movement of structural member 1370 substantially vertically up and down as illustrated in FIGS. 26A-26D.

Figure 26A:
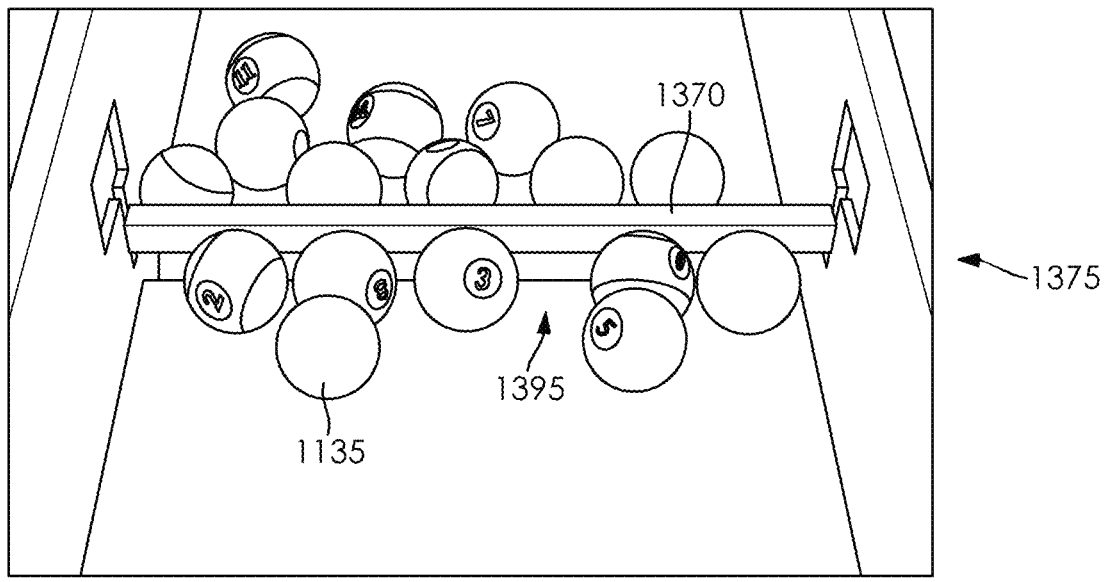
FIG. 26A is a perspective illustration of an exemplary embodiment of the present disclosure.
Figure 26B:
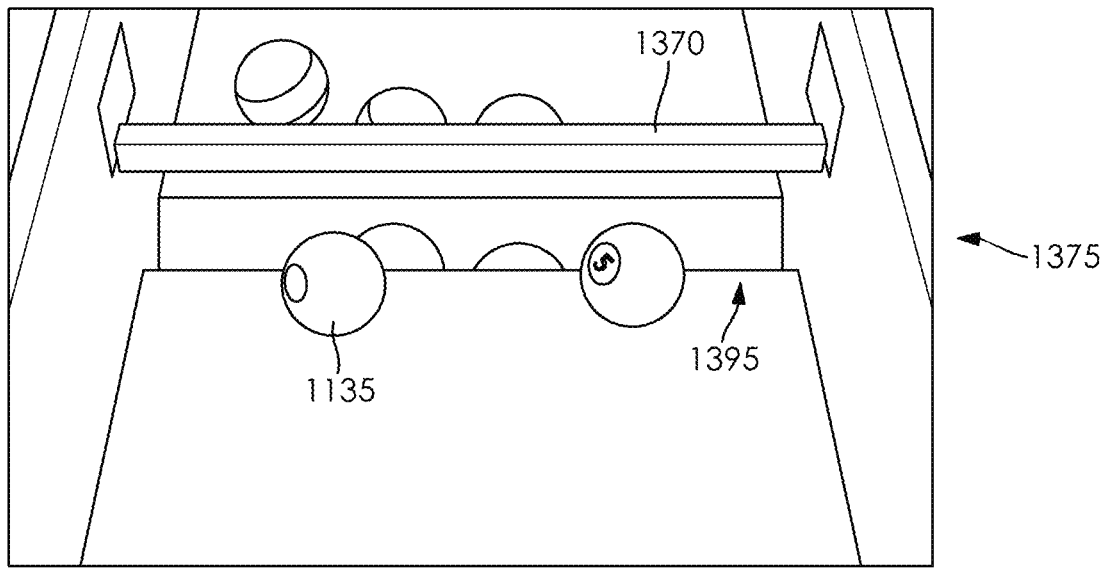
FIG. 26B is a perspective illustration of an exemplary embodiment of the present disclosure.
Figure 26C:
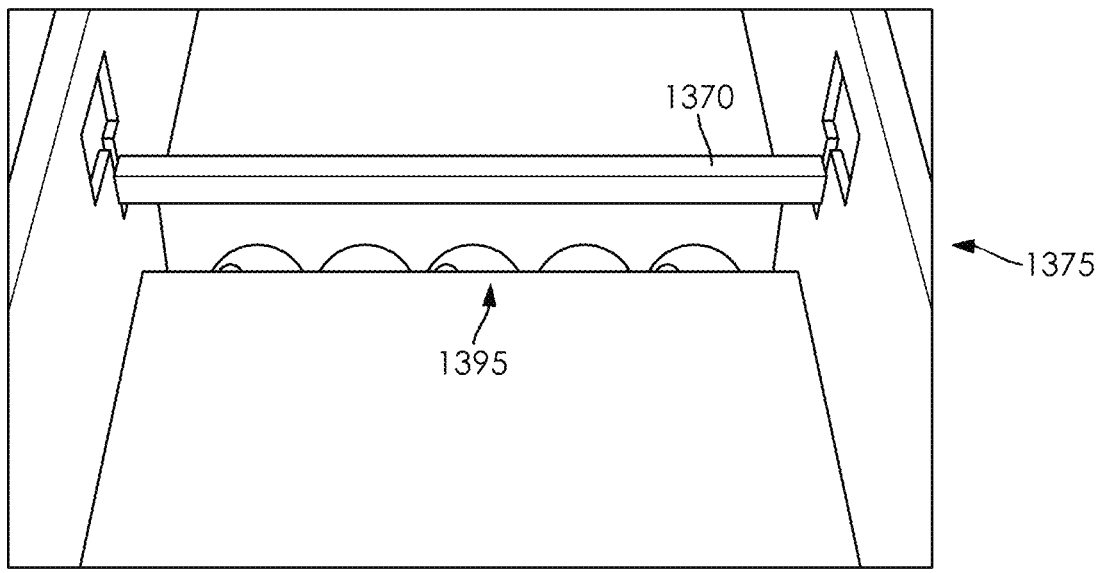
FIG. 26C is a perspective illustration of an exemplary embodiment of the present disclosure.
Figure 26D:
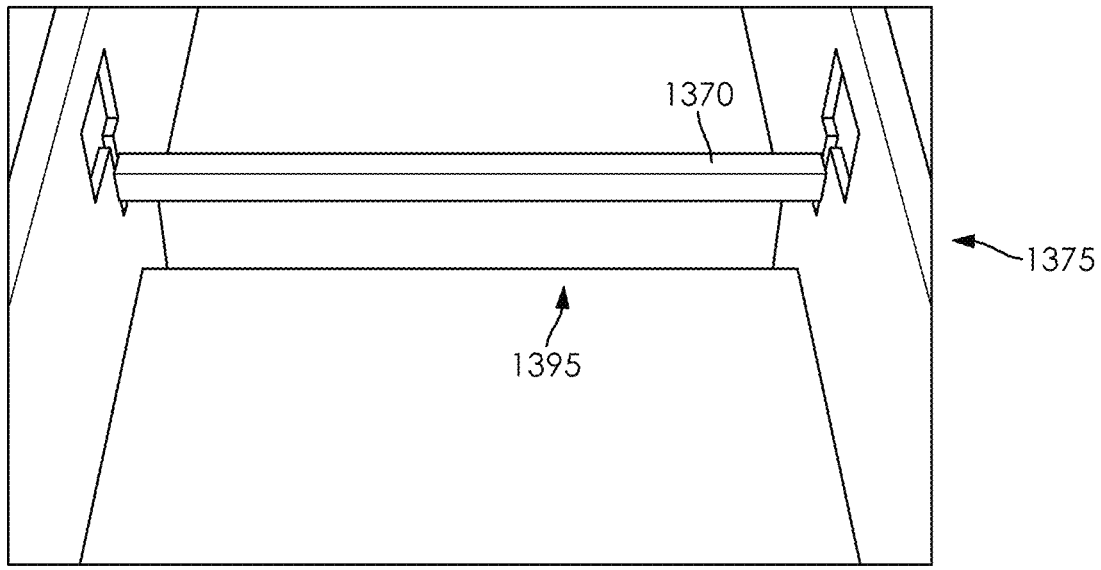
FIG. 26D is a perspective illustration of an exemplary embodiment of the present disclosure.

As illustrated in FIGS. 26A-26D, structural member 1370 may be disposed above an elongated slot 1395 of assembly 1305. Elongated slot 1395 may be for example a slot for allowing pool balls to return to a storage cavity of assembly 1305 for retrieval by users of assembly 1305 (e.g., a slot to allow pool balls to return to a container from which players may retrieve the pool balls for play). When structural member 1370 is in a lowered position for example as illustrated in FIG. 26A, structural member 1370 may retain objects 1135 (e.g., pool balls) and prevent them from falling through elongated slot 1395 and returning to users (e.g., to a ball-drop box). When structural member 1370 is in a raised position for example as illustrated in FIGS. 26B and 26C, structural member 1370 may allow objects 1135 (e.g., pool balls) to fall through elongated slot 1395 and return to users. Actuating assembly 1360 including structural member 1370 may thereby be provided in a new assembly 1305 or added to an existing assembly 1305 to selectively allow and block objects 1135 from returning to a user-accessible cavity of assembly 1305.

An exemplary operation of system 1300 will now be described. As users utilize assembly 1305, objects 1135 may move toward actuating assembly 1360 to be retained by structural member 1370 (e.g., objects 1135 such as pool balls may be dropped into pockets of assembly 1305 that may be a pool table and retained by structural member 1370). System 1300 may operate for example as described herein to allow players to cause actuating assembly 1360 to operate (e.g., for structural member 1370 to raise to drop balls through elongated slot 1395) based on payment being provided for a single play, tournament play, or any other payment scheme. For example when assembly 1305 is used in a league, users may buy time ahead of scheduled league play time via operation of display assembly 1320 and tracking system 1310 for example as described herein. When a user actuates actuator 1350 at an appropriate time, display assembly 1320 and tracking system 1310 may operate to control actuating assembly 1360 to operate similar to as the exemplary operation of the exemplary disclosed systems (e.g., system 300) described herein. Actuating assembly 1360 may operate to move (e.g., raise) structural member 1370 from the first or lowered position illustrated in FIG. 26A retaining objects 1135 to the second or raised position illustrated in FIGS. 26B and 26C, allowing objects 1135 to fall through elongated slot 1395. After a predetermined period of time (e.g., a few seconds, about three seconds, about five seconds, or any other suitable amount of time), actuating assembly 1360 may operate to move (e.g., lower) structural member 1370 from the second or raised position illustrated in FIGS. 26B and 26C back to the first or lowered position illustrated in FIG. 26D. System 1300 may operate to cause actuating assembly 1360 to move back to the second or raised position a second time for a predetermined period of time (e.g., similar to the exemplary disclosed predetermined time period above) to provide for any stuck objects 1135 to fall through elongated slot 1395. System 1300 may then operate to cause actuating assembly 1360 to move back to the first or lowered position to retain and stop further objects 1135 from falling through elongated slot 1395. The above exemplary operation may be repeated each time a user actuates actuator 1350. Also for example during tournament play, structural member 1370 may be maintained by an operation of system 1300 in the second or raised position to allow objects 1135 to be returned to users freely for a predetermined amount of time (e.g., 30 minutes, an hour, two hours, or any other desired amount of time).

Figure 27:
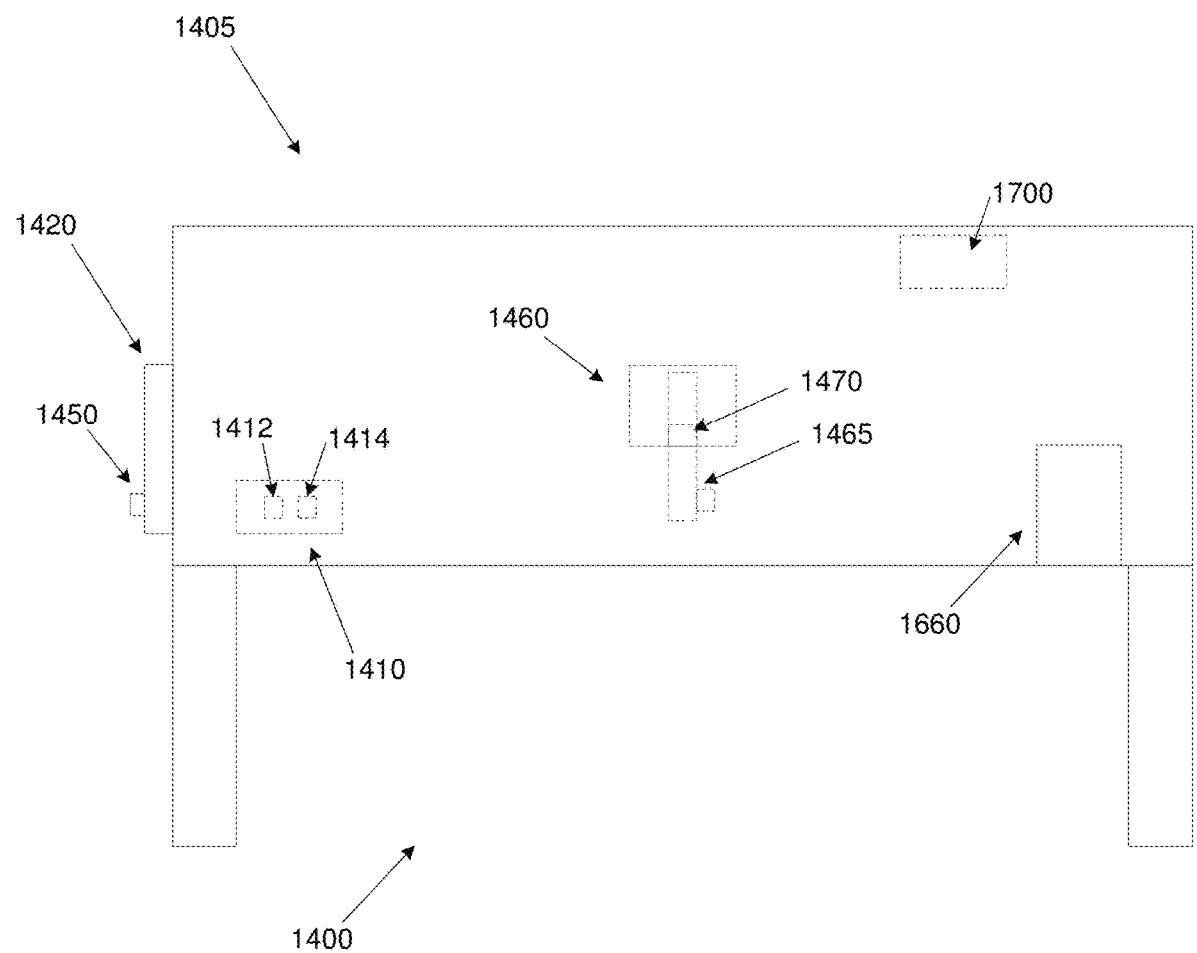
FIG. 27 is a schematic illustration of an exemplary embodiment of the present disclosure.

FIG. 27 illustrates another exemplary embodiment of the exemplary disclosed system, method, and apparatus. In at least some exemplary embodiments, system 1400 may provide a system for playing One Pocket Pool. System 1400 may include an assembly 1405 that may be similar to assembly 1305, a tracking system 1410 that may be similar to tracking system 1310, a display system 1420 that may be similar to display system 1320, an actuator 1450 that may be similar to actuator 1350, an actuating assembly 1460 including an electrical actuator 1465 and a structural member 1470 that may be similar to actuating assembly 1360 including electrical actuator 1365 and structural member 1370, and a structural frame 1475 that may be similar to structural frame 1375.

As described for example herein, tracking system 1410 may include an electric relay 1412 that may be similar to electric relay 325 and that may be connected to actuating assembly 1460. Tracking system 1410 may also include a tracking device 1414 that may be similar to tracking device 335 and that may be connected to electric relay 1412 for example similar to a connection of electric relay 325 as illustrated in FIG. 2. Display assembly 1420 may be selectively connected to electric relay 1412 of tracking system 1310 for example as described herein.

Figure 28:
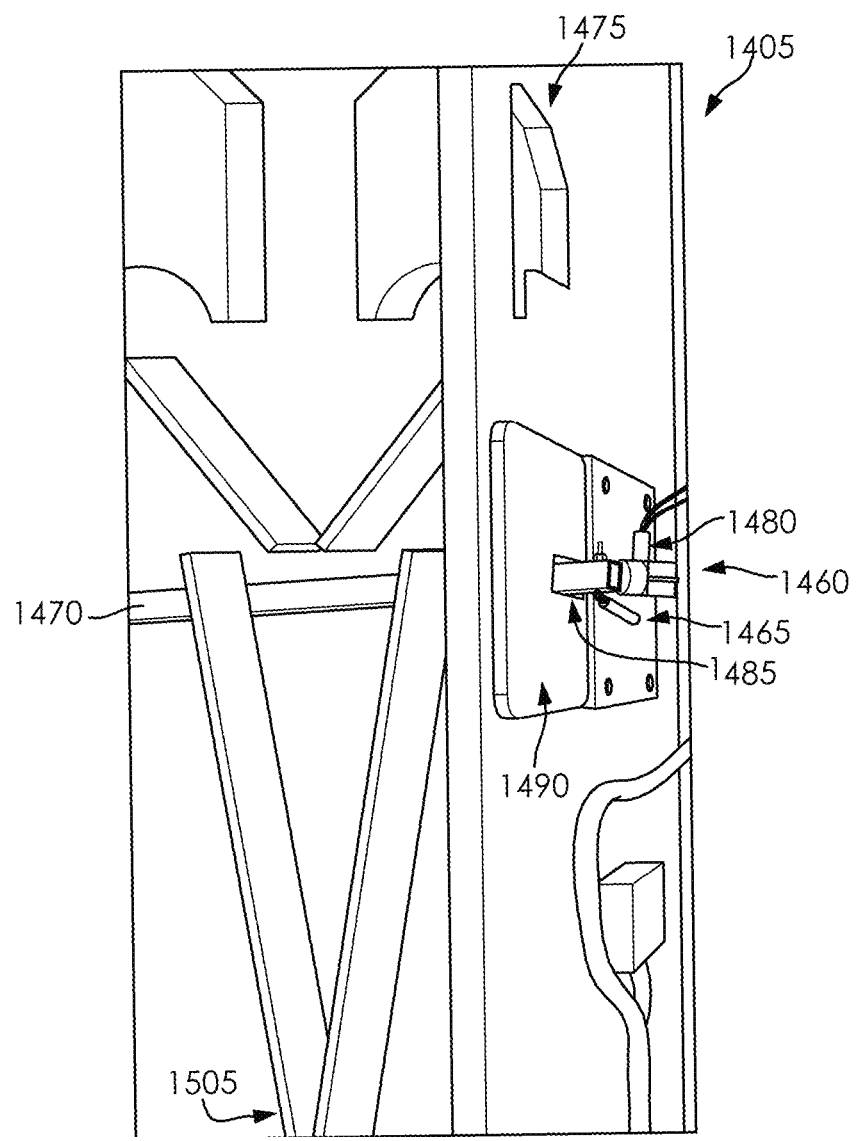
FIG. 28 is a perspective illustration of an exemplary embodiment of the present disclosure.

As illustrated for example in FIGS. 28 and 29, system 1400 may include members 1490 including apertures 1485, which may be similar to members 1390 including apertures 1385, and may be attached to structural frame 1475. End portions 1480 of structural member 1470 may be disposed through apertures 1485 similar to end portions 1380 being disposed through apertures 1385. For example as illustrated in FIG. 29, structural member 1470 may be disposed over an elongated slot 1495 that may be disposed in assembly 1405 and that may be similar to elongated slot 1395. Structural member 1470 may selectively block objects 1435, which may be similar to objects 1135, similar to how structural member 1370 may selectively block objects 1135 for example as described above.

As illustrated for example in FIGS. 28 and 29, system 1400 may include a frame structural assembly such as a structural assembly 1505. Structural assembly 1505 may be provided with a new assembly 1405 or provided in (e.g., retrofitted in) an existing assembly 1405. For example, structural assembly 1505 may be configured to be received in structural frame 1475 of assembly 1405. Structural assembly 1505 may include a frame such as an A-frame.

As illustrated for example in FIG. 29, structural assembly 1505 may include members 1510, 1515, 1520, and 1525. Members 1510, 1515, 1520, and 1525 may be formed from material similar to structural frame 1375. Members 1510, 1515, 1520, and 1525 may be any suitable members for guiding objects 1435 such as, for example, angles, channels, built-up members, or any other suitable members. Members 1510, 1515, 1520, and 1525 may be attached to structural frame 1475 via fasteners (e.g., bolts, screws, or nails), adhesive, and/or any other suitable attachment technique. Structural assembly 1505 may also include an end member 1530 that may be formed from materials similar to members 1510, 1515, 1520, and 1525 and attached to structural frame 1475 generally similarly to members 1510, 1515, 1520, and 1525.

As illustrated for example in FIG. 29, members 1510 and 1515 may disposed in or on structural frame 1475 at a first side 1535 of actuating assembly 1460, and members 1520 and 1525 and end member 1530 may be disposed in or on structural frame 1475 at a second side 1540 of actuating assembly 1460. In at least some exemplary embodiments when assembly 1405 is a pool table for example as illustrated in FIG. 30, second side 1540 may receive objects 1435 dropped in end pockets 1545*a* and 1545*b* of assembly 1405, and first side 1535 may receive objects 1435 dropped in the remaining four pockets (e.g., including two side pockets 1550 and the two opposite end pockets 1555) of assembly 1405. Member 1520 and end member 1530 may be configured to guide objects 1435 dropped from end pocket 1545*a* into structural frame 1475 toward a first enclosed area at an end portion 1565*a* of elongated slot 1495. Member 1525 and end member 1530 may be configured to guide objects 1435 dropped from end pocket 1545*b* into structural frame 1475 toward a second enclosed area at an end portion 1565*b* of elongated slot 1495. Members 1510 and 1515 may be configured to guide objects 1435 dropped from side pockets 1550 and end pockets 1555 into structural frame 1475 toward a third enclosed area at center portion 1560 of elongated slot 1495.

Structural assemblies 1570 (e.g., two structural assemblies 1570) may separate center portion 1560, end portion 1565*a*, and end portion 1565*b* from each other in elongated slot 1495. Elongated slot 1495 may extend from the opening illustrated in FIG. 29, and then under structural frame 1475, to a cavity 1575 disposed at an end of assembly 1405. For example, cavity 1575 may be a ball-drop box. Cavity 1575 may for example be disposed adjacent to display assembly 1420. Structural assemblies 1570 may separate center portion 1560, end portion 1565*a*, and 1565*b* from each other along a distance that objects 1435 travel from dropping into elongated slot 1495 when actuating assembly 1460 raises structural member 1470, to underneath structural frame 1475, and into cavity 1575 (e.g., objects 1435 move to cavity 1575). One or more structural assemblies 1570 disposed within elongated slot 1495 may guide objects 1435 dropped into end portion 1565*a* of elongated slot 1495 (e.g., from end pocket 1545*a*) into a first separate user-accessible cavity portion (e.g., an end portion 1585*a*) of cavity 1575. One or more structural assemblies 1570 disposed within elongated slot 1495 may guide objects 1435 dropped into end portion 1565*b* of elongated slot 1495 (e.g., from end pocket 1545*b*) into a second separate user-accessible cavity portion (e.g., an end portion 1585*b*) of cavity 1575. One or more structural assemblies 1570 disposed within elongated slot 1495 may guide objects 1435 dropped into central portion 1560 of elongated slot 1495 (e.g., from side pockets 1550 and end pockets 1555) into a third separate user-accessible cavity portion (e.g., a central portion 1580) of cavity 1575. Objects 1435 dropped into end pocket 1545*a*, objects 1435 dropped into end pocket 1545*b*, and objects 1435 dropped into side pockets 1550 and end pockets 1555 may thereby be kept separate from each other within assembly 1405 and may be selectively moved to separate locations of cavity 1575 when actuating assembly 1460 operates. Users of assembly 1405 (e.g., pool players) may thereby know which objects 1435 were dropped in end pocket 1545*a*, which objects 1435 were dropped in pocket 1545*b*, and which objects 1435 were dropped in side pockets 1550 or end pockets 1555 based on looking at cavity 1575 (e.g., objects 1435 disposed in end portion 1585*a* were dropped in end pocket 1545*a*, objects 1435 disposed in end portion 1585*b* were dropped in end pocket 1545*b*, and objects 1435 disposed in center portion 1580 were dropped in side pockets 1550 or end pockets 1555). In at least some exemplary embodiments, such exemplary sorting may allow for users to play One Pocket Pool using the exemplary disclosed automated payment systems (e.g., provided by an operation of tracking system 1410, display assembly 1420, and actuating assembly 1460).

Figure 32A:
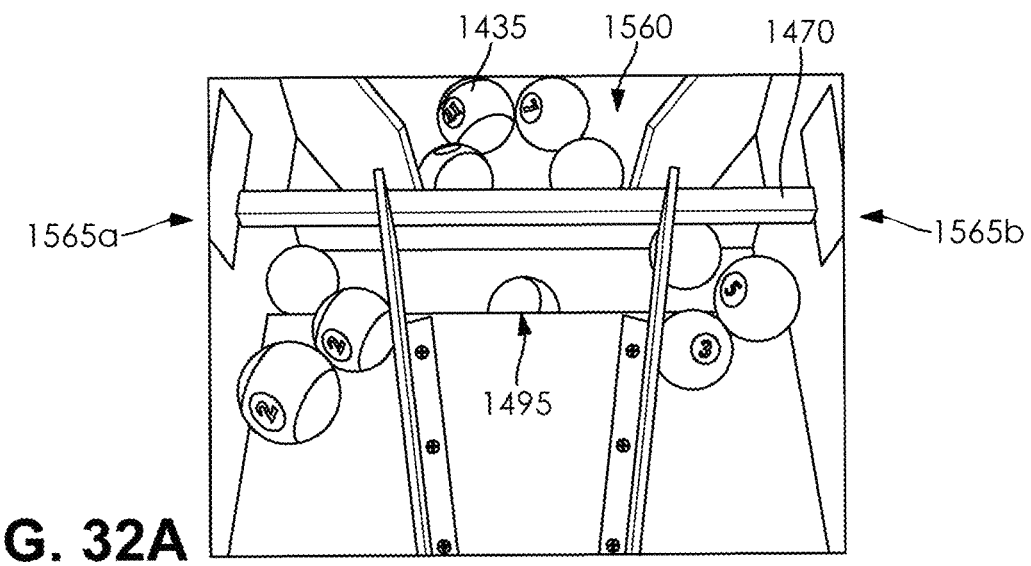
FIG. 32A is a perspective illustration of an exemplary embodiment of the present disclosure.
Figure 32B:
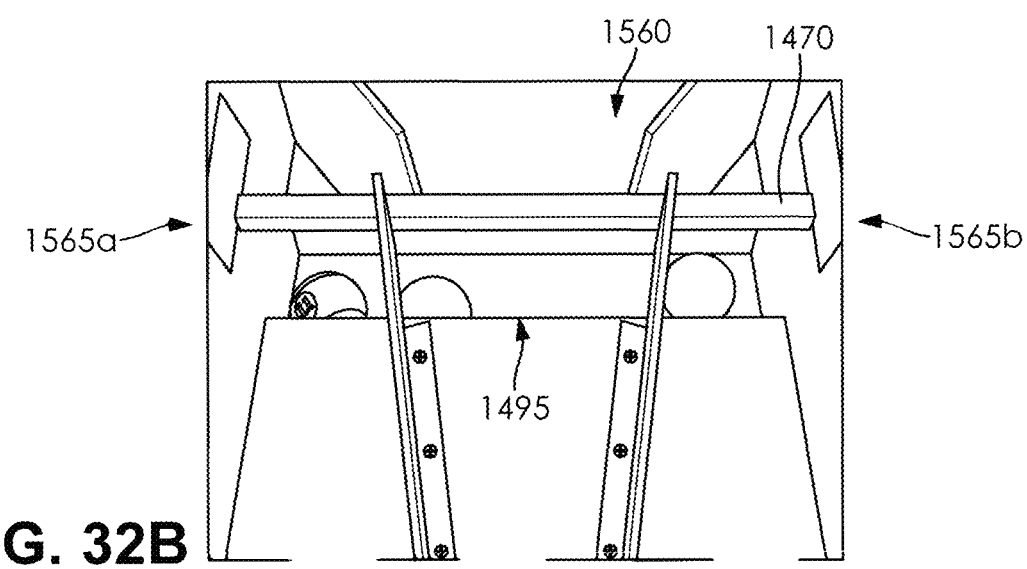
FIG. 32B is a perspective illustration of an exemplary embodiment of the present disclosure.
Figure 32C:
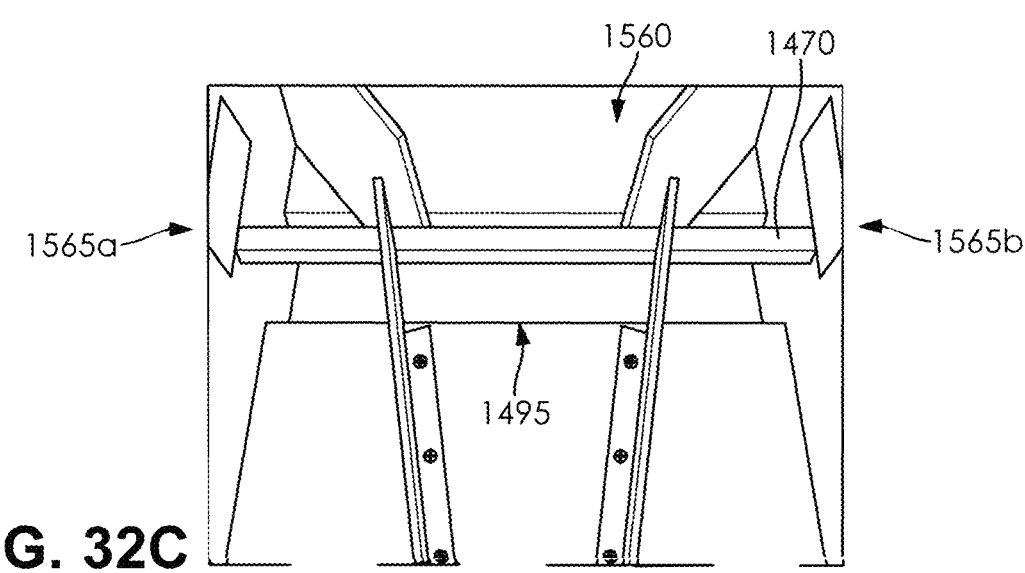
FIG. 32C is a perspective illustration of an exemplary embodiment of the present disclosure.

An exemplary operation of system 1400 will now be described. As users utilize assembly 1405, objects 1435 may move toward actuating assembly 1460 to be retained by structural member 1470. Objects 1435 dropped during play from side pockets 1550 and end pockets 1555 into structural frame 1475 may be guided via members 1510 and 1515 to center portion 1560 of elongated slot 1495. Objects 1435 dropped during play from end pocket 1545*a* into structural frame 1475 may be guided via member 1520 and end member 1530 to end portion 1565*a* of elongated slot 1495. Objects 1435 dropped during play from end pocket 1545*b* into structural frame 1475 may be guided via member 1525 and end member 1530 to end portion 1565*b* of elongated slot 1495. System 1400 may operate for example as described herein to allow players to cause assembly 1405 to operate (e.g., drop balls) based on payment being provided for a single play, tournament play, or any other payment scheme. When a user actuates actuator 1450 at an appropriate time, display assembly 1420 and tracking system 1410 may operate to control actuating assembly 1460 to operate similar to the exemplary operation of the exemplary disclosed systems described herein. Actuating assembly 1460 may operate to move (e.g., raise) structural member 1470 from a first or lowered position retaining objects 1435 to a second or raised position illustrated in FIGS. 32A and 32B, allowing objects 1435 to fall through elongated slot 1495. After a predetermined period of time (e.g., a few seconds, about three seconds, about five seconds, or any other suitable amount of time), actuating assembly 1460 may operate to move (e.g., lower) structural member 1470 from the second or raised position illustrated in FIGS. 32A and 32B back to the first or lowered position illustrated in FIG. 32C. System 1400 may operate to cause actuating assembly 1460 to move back to the second or raised position a second time for a predetermined period of time (e.g., similar to the exemplary disclosed predetermined time period above) to provide for any stuck objects 1435 to fall through elongated slot 1495. System 1400 may then operate to cause actuating assembly 1460 to move back to the first or lowered position to retain and stop further objects 1435 from falling through elongated slot 1495.

When structural member 1470 moves to the second or raised position as described above, one or more structural assemblies 1570 disposed within elongated slot 1495 may guide objects 1435 dropped into end portion 1565*a* of elongated slot 1495 (e.g., from end pocket 1545*a*) into end portion 1585*a* of cavity 1575. One or more structural assemblies 1570 disposed within elongated slot 1495 may guide objects 1435 dropped into central portion 1560 of elongated slot 1495 (e.g., from side pockets 1550 and end pockets 1555) into central portion 1580 of cavity 1575. One or more structural assemblies 1570 disposed within elongated slot 1495 may guide objects 1435 dropped into end portion 1565*b* of elongated slot 1495 (e.g., from end pocket 1545*b*) into end portion 1585*b* of cavity 1575.

Objects 1435 dropped into end pocket 1545*a*, objects 1435 dropped into end pocket 1545*b*, and objects 1435 dropped into side pockets 1550 and end pockets 1555 may thereby be kept separate from each other within assembly 1405. Users of assembly 1405 (e.g., pool players) may thereby know which objects 1435 were dropped in end pocket 1545*a*, which objects 1435 were dropped in pocket 1545*b*, and which objects 1435 were dropped in side pockets 1550 or end pockets 1555 based on looking at cavity 1575

(e.g., objects 1435 disposed in end portion 1585*a* were dropped in end pocket 1545*a*, objects 1435 disposed in end portion 1585*b* were dropped in end pocket 1545*b*, and objects 1435 disposed in center portion 1580 were dropped in side pockets 1550 or end pockets 1555). In at least some exemplary embodiments, this exemplary disclosed separation of objects 1435 may facilitate users playing One Pocket Pool when assembly 1405 is a pool table.

The above exemplary operation may be repeated each time a user actuates actuator 1450. Also for example during tournament play, structural member 1470 may be maintained by an operation of system 1400 in the second or raised position to allow objects 1435 to be freely returned to respective center portion 1580, end portion 1585*a*, and end portion 1585*b* of cavity 1575 for a predetermined amount of time (e.g., 30 minutes, an hour, two hours, or any other desired amount of time for example based on payment provided for example as described herein).

In at least some exemplary embodiments, system 1400 may include a sensor 1590. Sensor 1590 may be an optical sensor. Sensor 1590 may sense whether a given object 1435 is a predetermined object. For example, sensor 1590 may be an optical cue ball sensor that determines whether or not a given object 1435 that is a pool ball is the cue ball. If sensor 1590 determines that a given object 1435 is a cue ball that has been dropped in end pocket 1545*a* or 1545*b* and therefore is guided to respective end portion 1565*a* or 1565*b*, system 1400 may operate to guide the cue ball from end portion 1565*a* or 1565*b* to center portion 1580 (e.g., instead of to respective end portion 1585*a* or 1585*b* as the other objects 1435). For example, system 1400 may divert the cue ball to center portion 1580 via any suitable mechanical or electro-mechanical technique for guiding object 1435.

In at least some exemplary embodiments, system 1400 may provide for use of assembly 1405 as a pool table to play One Pocket Pool. For example, objects 1435 may be held by structural member 1470 in the first or lowered position until a player hits a ball into the wrong pocket during play (e.g., a ball is accidentally hit into side pockets 1550 or end pockets 1555 instead of a player's designated end pocket 1545*a* or 1545*b*). A user may then actuate actuator 1450 to cause actuating assembly 1460 to move structural member 1470 to the second or raised position, which releases objects 1435 to cavity 1575. Object 1435 that was incorrectly shot into the wrong pocket may be guided to center portion 1580 instead of respective end portion 1585*a* or 1585*b* for example as described above.

Figure 33:
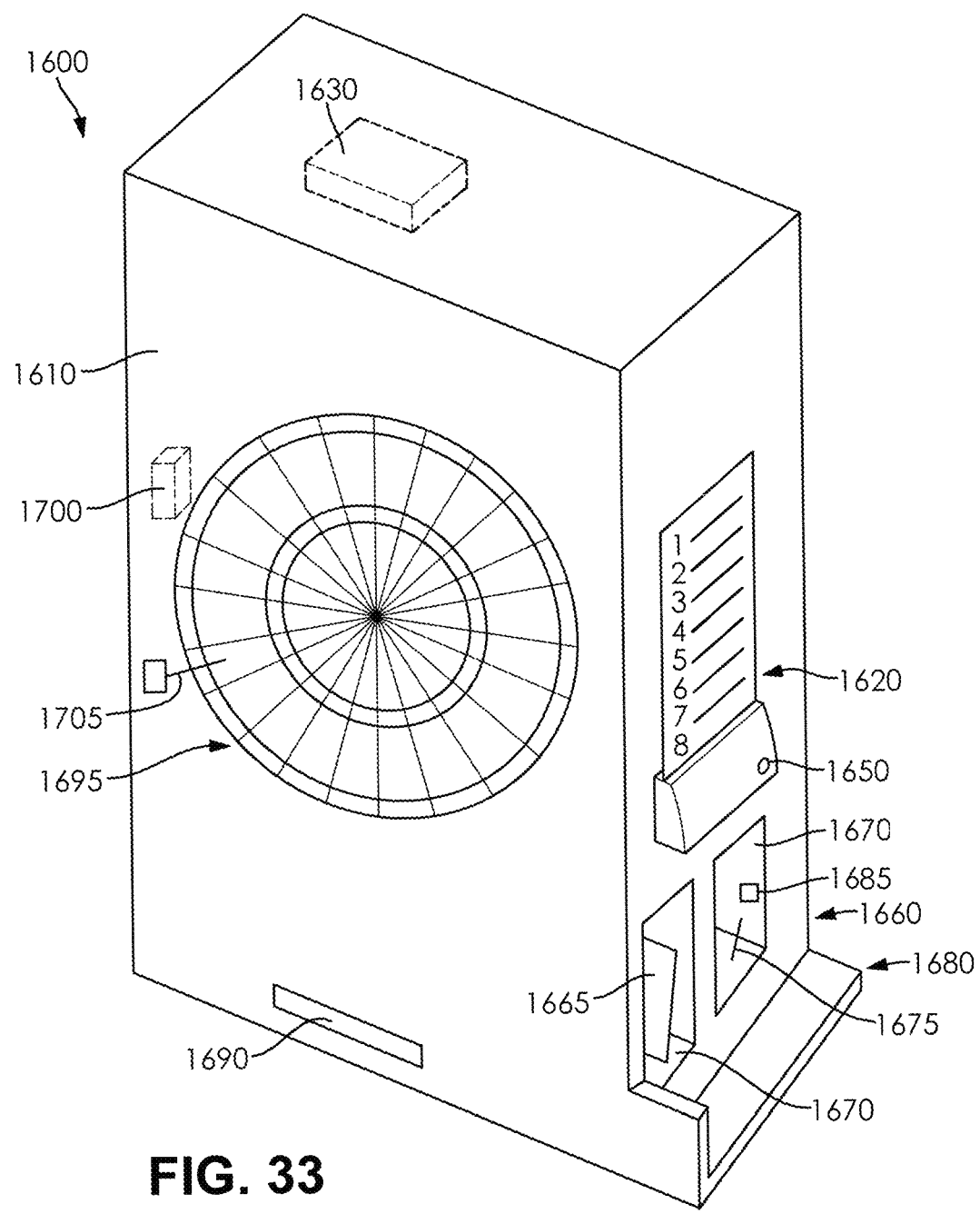
FIG. 33 is a perspective illustration of an exemplary embodiment of the present disclosure.

FIG. 33 illustrates another exemplary embodiment of the exemplary disclosed system, method, and apparatus. System 1600 may include a display unit 1620 that may be similar to display assembly 320, display assembly 520, display assembly 620, display assembly 1105, and/or display assembly 1205. Display assembly 1620 may be attached to a support assembly 1610 of system 1600. Display assembly 1620 may for example include a challenger control board and/or challenger player unit for example as described herein. Display assembly 1620 may include a key switch similar to key switch 642. Display assembly 1620 may include an actuator 1650 that may be similar to actuator 550. System 1600 may also include a tracking system 1630 that may be similar to tracking system 310 and that may be attached to, within, or on support assembly 1610.

System 1600 may include a charging assembly 1660 that users may utilize to power a user device 1665 (e.g., a mobile device such as a smartphone or a tablet) during use of system 1600. Charging assembly 1660 may include a plurality of compartments 1670 that may be attached to and/or built into support assembly 1610. Charging assembly 1660 may include a plurality of charging ports 1675 such as USB charging ports that may electrically connect a plurality of user devices 1665. Charging assembly 1660 may also provide for wireless charging of user devices 1665. Support assembly 1610 may include a shelf 1680 on which user devices 1665 may be placed during charging in addition to being placed in compartments 1670.

System 1600 may also include a plurality of lighting devices (e.g., lighting devices 1685 and 1690) such as LEDs that may activate to emit light when various features of system 1600 are being used. For example, lighting device 1685 may emit light when charging assembly 1660 is being used (e.g., or a given compartment 1670 is being used) to charge a given user device 1665, and lighting device 1690 may emit light when a game assembly 1695 supported on a surface of support assembly 1610 is being used. Display assembly 1620 and tracking system 1630 may operate for example as described herein to receive payment from a user to allow the user to use game assembly 1695 and/or charging assembly 1660.

In at least some exemplary embodiments, system 1600 may include a sensor assembly 1700 that may detect a presence of a playing component 1705. For example, system 1600 may sound an alarm and/or emit a warning (e.g., or notify an operator of system 1600 by any suitable communication technique) when sensor assembly 1700 detects the presence of playing component 1705 when payment for use of system 1600 has not been provided via display assembly 1620 and tracking system 1630. For example, when game assembly 1695 is a dart board (e.g., an English dart board or an American dart board) and playing component 1705 is a dart, sensor assembly 1700 may emit an alarm (e.g., buzzing or beeping) and lighting device 1690 may flash repeatedly on and off when playing component 1705 is thrown into game assembly 1695 when payment for use of system 1600 has not been provided via display assembly 1620 and tracking system 1630. System 1600 may also utilize any suitable feature described above regarding display assembly 320 (e.g., timed limit, company advertising and sponsorship, and/or any other suitable feature described herein). One or more charging assemblies similar to charging assembly 1660, one or more lighting devices similar to lighting devices 1685 and 1690, one or more sensor assemblies similar to sensor assembly 1700, and/or any other feature of system 1600 may be used with any of the other exemplary disclosed systems described herein. For example as illustrated in FIGS. 24 and 27, charging assembly 1660 may be provided at system 1300 and system 1400. Also for example as illustrated in FIGS. 24 and 27, sensor assembly 1700 may be provided at system 1300 and system 1400 to emit a warning or alarm if respective object 1135 or object 1435 is detected in use when payment has not been provided for example as described above.

Figure 37:
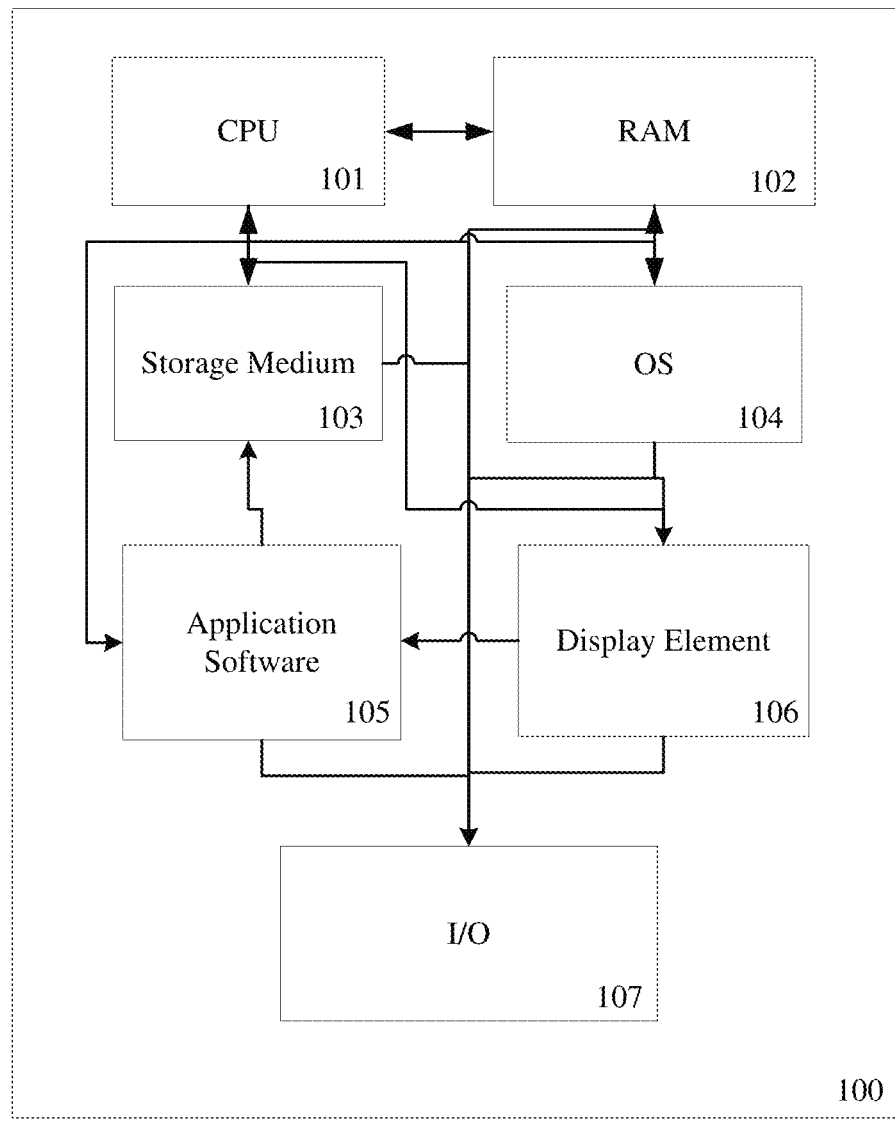
FIG. 37 is a schematic illustration of an exemplary computing device, in accordance with at least some exemplary embodiments of the present disclosure.
Figure 38:
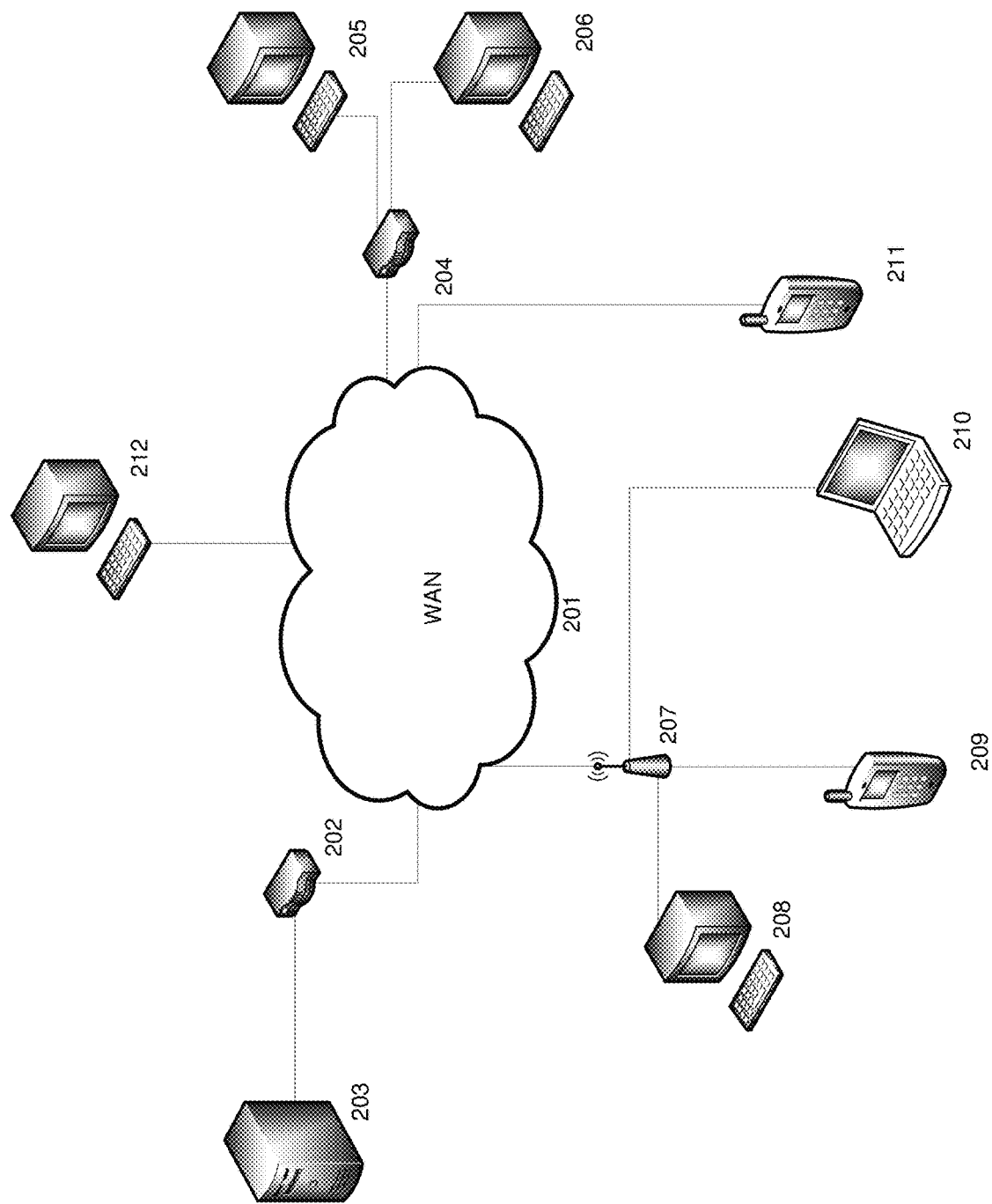
FIG. 38 is a schematic illustration of an exemplary network, in accordance with at least some exemplary embodiments of the present disclosure.
Figure 39:
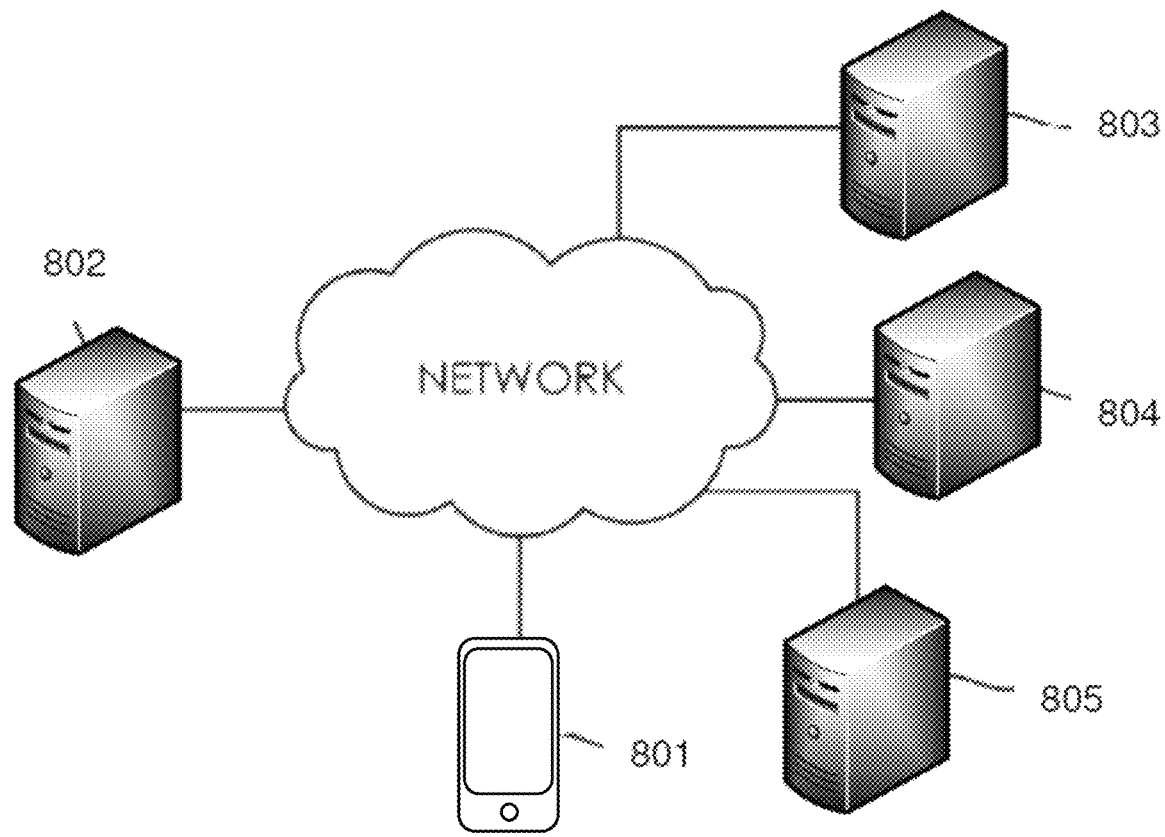
FIG. 39 is a schematic illustration of an exemplary network, in accordance with at least some exemplary embodiments of the present disclosure.

In at least some exemplary embodiments, the exemplary disclosed payment application (e.g., application or API such as a Pay Range App) for example as described herein may operate with any suitable computing device (e.g., for example the exemplary disclosed computing devices illustrated in FIGS. 37-39, e.g., a smartphone or tablet). The exemplary disclosed payment application may display a picture or video of an exemplary disclosed machine or game assembly to be played. For example, machines or game assemblies may be displayed according to location (e.g., based on physical location input by the user into the app and/or based on location data such as GPS data of the user's device). The user may use the app to select the machine or game assembly to be used.

When a user identifies a machine or game assembly to be used for example as described above, the user may use the app to provide payment via the app. In at least some exemplary embodiments, the user may select (e.g., swipe such as swiping up) the desired machine or game assembly using the app, which may apply credit for use of the machine by the user. For example, the app may provide payment by deducting from a balance maintained on the app by a user (e.g., a balance displayed at a bottom of an interface or screen display of the app), charging a credit or debit card, and/or any other suitable payment technique.

By providing payment using the exemplary disclosed app for example as described above, the user may purchase time on the machine or game assembly (e.g., based on predetermined settings of the machine being used or an amount of time input by the user via the app). For example, the machine or game assembly may include a predetermined time setting. For example, when the exemplary disclosed machine or game assembly is used in league play (e.g., a pool league), a user may pay his or her dues for the league, which may be used as payment for an amount of time and/or an amount of uses (e.g., games) of a machine or game assembly.

In at least some exemplary embodiments, the exemplary disclosed payment application may include a time setting feature and/or a credit feature that may be activated based on a user's selection (e.g., input). For example, a time setting feature may provide a certain time of use of the machine or game assembly based on an amount of payment provided. Also for example, a credit feature may provide various options for selection by a user such as 1 pool game for $1.50 or 30 minutes of pool play for $5.00 (e.g., or any other values or amounts, which may be selected by a user using the exemplary disclosed app).

Further for example, a time feature may provide an option of 10 cents (e.g., or any other amount) per minute for a game of pool (e.g., which may be selected by a user using the exemplary disclosed app). For example, when a user selects a time feature using the app, a green start button on the app (e.g., displayed on a graphical user interface of the app) may blink (e.g., or operate in any desired manner). When a user presses a start button for a machine, 10 cents (e.g., or any other amount) may be deducted from the user's balance for every minute the machine is used until the user presses another graphical element (e.g., red stop button that lights up) displayed on the app. For example, payment for use of the machine may be provided by the user (e.g., until the customer presses a start button on the game to begin paid use of the machine for example as described above).

In at least some exemplary embodiments, the exemplary disclosed machine or game assembly for use with the exemplary disclosed payment application may include an active ball drop button feature. For example, if a user moves beyond a predetermined threshold distance away from the machine or game assembly, then the app may automatically stop charging the user (e.g., may stop charging the user 10 cents per minute). The exemplary disclosed payment system may thereby be used to provide time for use of a machine or game assembly to a league player based on payment by the league player as part of his or her pool league dues using the exemplary disclosed app.

In at least some exemplary embodiments, the exemplary disclosed machine or game assembly may automatically transfer data to (e.g., send a signal to) a machine or game assembly to turn off an active ball drop button (e.g., on the exemplary disclosed app) when a user moves more than a predetermined distance away from the machine or game assembly (e.g., which may pause or stop further payment from being deducted via the exemplary disclosed app). For example, the exemplary disclosed tracking system and/or display system may operate to turn off the active ball drop button.

In at least some exemplary embodiments, the exemplary disclosed app may provide a plurality (e.g., two) time setting for an exemplary disclosed machine or game assembly. A first time setting may include a predetermined time (e.g., 30 minutes or any other desired time period) for given cost to be paid. A second time setting may be a running time setting that may be initiated for example as described above and may run (e.g., may continually charge at a set rate per time such as per minute) until a user stops the payment using the exemplary disclosed app for example as described above (e.g., when a user pushes a red button on the app to stop payment). Such exemplary disclosed operation of the app may facilitate league play and/or any other suitable type of play using the exemplary disclosed machine or game assembly.

Figure 34A:
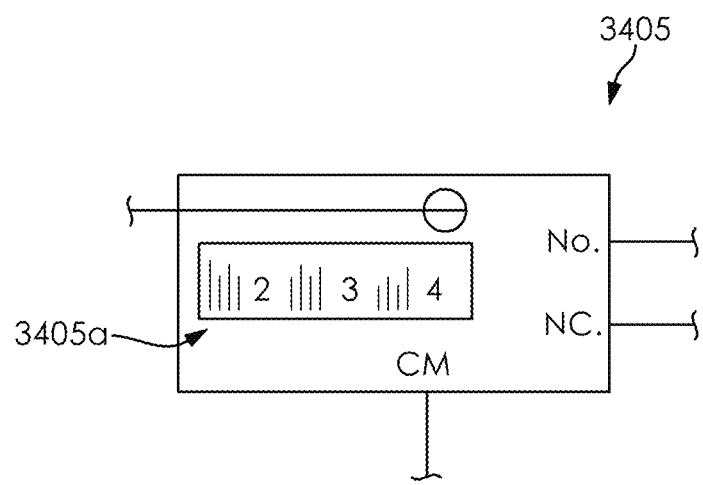
FIG. 34A is a schematic illustration of an exemplary embodiment of the present disclosure.
Figure 34B:
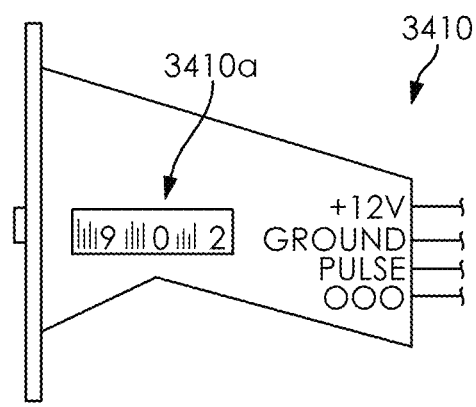
FIG. 34B is a schematic illustration of an exemplary embodiment of the present disclosure.
Figure 34C:
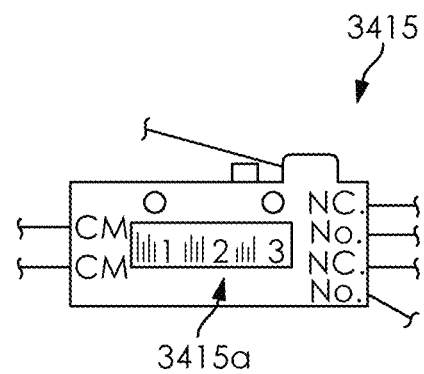
FIG. 34C is a schematic illustration of an exemplary embodiment of the present disclosure.
Figure 34D:
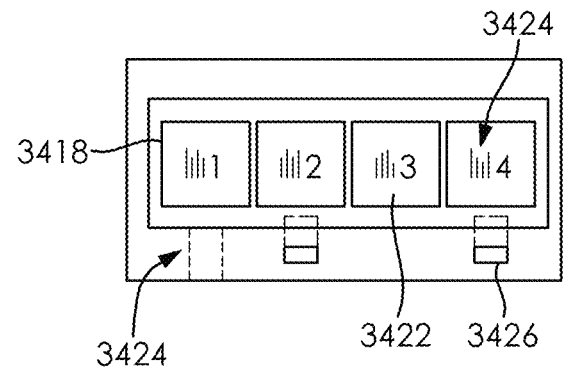
FIG. 34D is a detailed illustration of an exemplary embodiment of the present disclosure.

In at least some exemplary embodiments and as illustrated in FIGS. 34A, 34B, 34C, and 34D, the exemplary disclosed system, method, and apparatus may include an electronic device that may include a barcode (e.g., may be barcoded). The electronic device may be a relay such as a switch including (e.g., or operably connected to) a tracking device such as a counter or meter. For example, FIG. 34A illustrates an exemplary switch 3405 (e.g., coin switch) having a tracking device (e.g., counter or meter) such as an un-resettable coin meter that may be a barcoded meter. Switch 3405 may include and/or be operably connected to a meter (e.g., mechanical meter) such as a barcoded mechanical switch meter (e.g., a counter 3405a). Switch 3405 may include a barcode counter 3405a (e.g., an electro-mechanical barcode counter). FIG. 14B illustrates an exemplary switch 3410 (e.g., coin acceptor) having an un-resettable coin meter. Switch 3410 may include and/or be operably connected to a meter (e.g., mechanical meter) such as a barcoded mechanical switch meter (e.g., a counter 3410a). Switch 3410 may include barcode counter 3410a. For example, switch 3410 may include an electronic coin mechanism with a barcoded mechanical meter. FIG. 14C illustrates an exemplary switch such as a switch 3415 (e.g., DPDT switch) having an un-resettable coin meter. Switch 3415 may include and/or be operably connected to a meter (e.g., mechanical meter) such as a barcoded mechanical switch meter (e.g., a counter 3415a). Switch 3415 may include barcode counter 3415a (e.g., an electro-mechanical barcode counter). For example, switch 3415 may be a barcoded mechanical switch meter. FIG. 34D provides a detailed view of the exemplary disclosed electro-mechanical barcode counter. The exemplary disclosed switch (e.g., switch 3405, 3410, and/or 3415) may include and/or be operably connected to a visual counter (e.g., of a visual electro-mechanical meter such as counters 3405a, 3410a, and/or 3415a). For example, the numbers may be viewed and read by a user to determine an amount of use such as game plays or song plays (e.g., to physically see a number of games or songs played via the electro-mechanical counter). The exemplary disclosed system and method may include hardware and/or software (e.g., a module for example as described herein including an App program that may be programmed) so that users may use devices (e.g., automatically scan the barcoded meters using a device such as a smartphone) to read the barcodes to determine an amount of use of a device (e.g., amount of game plays, music plays, number of songs, hours of use, and/or amount of money). The exemplary disclosed module (e.g., App program) may calculate use for an entire collection or fleet of devices by scanning each meter and determining a value (money) to be paid for use at each location. For example, a camera or application of a user device (e.g., smartphone having a camera or other exemplary device for example as described herein) may be used to read barcodes of the exemplary disclosed meters (e.g., counter 3405a, 3410a, and/or 3415a). A memory device (e.g., USB stick, thumb nail, or other suitable device) may be used to download data (information of device use) efficiently from the exemplary disclosed universal board located with the device being tracked (e.g., pool table or jukebox). Exemplary disclosed meters at some or all locations (e.g., device locations) may be viewed (e.g., viewed online for example using a user device to view a GUI such as a dashboard) by users.

In at least some exemplary embodiments and for example as illustrated in FIG. 34D, the exemplary disclosed counter (e.g., counter 3405a, 3410a, and/or 3415a) may include numbers that may be read by a user disposed near or next to respective barcodes that may be read by the exemplary disclosed App (e.g., of a smartphone). The counter may be electro-mechanical with physical portions (e.g., members for example as illustrated in FIG. 34D such as movable members 3422) that may move as use (e.g., plays) are counted. A plurality of the exemplary disclosed barcodes and/or characters (e.g., digits or numbers) may be included on movable members 3422. A plurality of exemplary disclosed barcodes and/or characters (e.g., barcodes and/or characters 3424) may be concealed from view by a housing of the exemplary disclosed device (e.g., meter and/or switch) for example as illustrated in FIG. 34D (e.g., some barcodes and/or characters may be visible and some barcodes and/or characters may be concealed based on a position of movable members 3422). As plays are counted, both the numbers and respective barcodes alongside the numbers may move (e.g. display a higher count). Movable members 3422 may be moved via an operation of a mechanical member 3426 that may be operably connected to and/or driven by components of the exemplary disclosed device (e.g., meter and/or switch) for example as illustrated in FIG. 34D and as described herein. Because each number may be displayed next to a corresponding barcode, the counted values may be viewed by both a user (e.g., physically viewed) and scanned and counted by an App (e.g., a barcode reader that may be for example a smartphone or tablet App that operates with a device camera). Both a given number and a corresponding barcode may be shown through one or more apertures (e.g., one or more apertures 3418, for example, windows) of the counter or meter. The exemplary disclosed counter may be a barcoded and/or digit-numbered electro-mechanical meter (e.g., counter 3405a, counter 3410a, and/or counter 3415a).

In at least some exemplary embodiments, the exemplary disclosed coin switches and/or coin meters that may be included in operation assembly 315 (e.g., to initiate a start of a pool game by dropping pool balls) may include the exemplary disclosed electro-mechanical coin meters in an exemplary disclosed switch (e.g., switch 3405, switch 3410, or switch 3415) of operation assembly 315. For example, by having a coin switch (e.g., as illustrated in FIGS. 34A-34C, such as a DPDT switch) having built-in meters (e.g., counters 3405a, 3410a, and/or 3415a) that may work mechanically or electronically, a double-check may be provided on a primary or main meter that may be installed in machine 305 (e.g., in operation assembly 315). In at least some exemplary embodiments, an exemplary disclosed coin meter that may be installed in machine 305 may be disconnected (e.g., by a hired collector of a vending company, for example, unsuitably disconnected). By having a switch (e.g., including a coin meter such as illustrated in FIGS. 34A to 34C) built into and/or connected to operation assembly 315, there may be substantially no way to cheat on how many coins or vends may occur on machine 305.

In at least some exemplary embodiments, the exemplary disclosed system, method, and apparatus including the exemplary disclosed switch (e.g., switch 3405, switch 3410, and/or switch 3415) may provide the exemplary disclosed universal board (e.g., BarZcash) with a tracking ability (e.g., substantially full tracking ability) and/or payment system (e.g., App/credit card and/or any other suitable type of payment system). The exemplary disclosed system, method, and apparatus may be used with any suitable type of machine (e.g., recreational device, amusement equipment, and/or automotive device). The exemplary disclosed system, method, and apparatus may be used with any suitable rentable equipment such as moving vans, trailers, tractor trailers, forklifts, and/or any suitable equipment that may be rented based on time (e.g., rented with a meter such as an hour meter). The exemplary disclosed system, method, and apparatus may be used with digital jukeboxes and/or other amusement equipment using the exemplary disclosed switch (e.g., switch 3405, switch 3410, and/or switch 3415) such as, for example, barcoded electro-mechanical counters (e.g., counter 3405a, counter 3410a, and/or counter 3415a). The exemplary disclosed counter (e.g., counter 3405a, counter 3410a, and/or counter 3415a) may include a barcode along with information (e.g., a small numerical number next to the barcode on the counter wheel) that may represent the same barcoded number and/or information (e.g., as illustrated in FIG. 34D). For example, a camera on a user device (e.g., a smartphone or tablet) may read the barcode on the electrical mechanical counter (e.g., as illustrated in FIGS. 34A-34D) so that there may be substantially no human error involved in tracking machine use. Reading the barcode may include translating the code into a readable number on a computer dashboard (e.g., on a computing device that may communicate with the system for example as described herein).

In at least some exemplary embodiments, the exemplary disclosed system, method, and apparatus may be used with digital jukeboxes, pool tables, and/or other suitable systems. The exemplary disclosed BarZcash Universal board may provide the exemplary disclosed payment device (e.g., Pay Range Blue Key) a capability to track machine use. For example, the exemplary disclosed payment device (e.g., Pay Range Blue Key) may involve apps (e.g., smartphone apps) starting a pool table (e.g., billiard table) for one game or for any desired amount of time, and may track some or all league free play and/or cash on a table (e.g., pool table).

In at least some exemplary embodiments, the exemplary disclosed BarZcash Universal board operating with an exemplary disclosed pool table may allow a payment device such as a Pay Range Blue key to connect to the internet via a user device (e.g., a customer's smartphone). For example, a transaction may occur (e.g., be interfaced) in the cloud via a server (e.g., with a TouchTunes server) to complete a transaction that may have been started via an application (e.g., an application using a user device such as a Touch-Tunes App). The exemplary disclosed system and method may involve merging a plurality of applications (e.g., two Apps) on the exemplary disclosed network (e.g., the internet). For example, such merging may involve Pay Range, TouchTunes, and/or any suitable credit card reader that may be located on or with a jukebox and/or pool table. For example, if multiple apps communicate via network (e.g., if both Apps meet in the cloud), then multiple apps (e.g., TouchTunes and Pay Range) may communicate without changing any hardware to complete a transaction for use of any suitable amusement device (e.g., a billiard table and/or jukebox). The exemplary disclosed BarZcash Universal board may provide for this transaction based on its programming and input and output capabilities of the Universal board. Also for example, some or all of the exemplary disclosed transactions may be tracked online and on the barcoded electro-mechanical meters (e.g., counter 3405a, counter 3410a, and/or counter 3415a) in a pool table and/or jukebox. A user such as a customer may then vend the pool table and/or play songs on the jukebox using any of the plurality of apps (e.g., TouchTunes and Pay Range). This type of transaction may start a pool table based on a user using a Touch tunes app or credit card reader. For example, a promotion may be provided to a user via a user device (e.g., on a customer's phone, a promotion may be displayed or pop-up notifying the user that buying an amount such as $6.00 in credits may result in receiving a game of pool for half price). This operation may also work in reverse, with a user playing a game of pool and receiving free Touchtunes App credits and/or a free phone charge (e.g., electric charge). Also for example, the exemplary disclosed system may include operating a pool table with the exemplary disclosed board (e.g., universal BarZcash board) connected to or communicating with a low voltage credit card reader that may operate with (e.g., meet) a payment system (e.g., TouchTunes) using a network to finish the transaction (e.g., in the cloud). The exemplary disclosed system and method may provide payment tracking and/or song tracking for jukeboxes and/or any other suitable tracking system (e.g., any suitable rental system).

In at least some exemplary embodiments, the exemplary disclosed system, method, and apparatus may provide a visual method for a user to view a number of songs that are played using any technique for playing songs from a given jukebox (e.g., whether by app, by coin and/or bill payment, and/or by credit card). Some or all played songs of a given device (e.g., jukebox) may be tracked. The exemplary disclosed system, method, and apparatus may track some or all App-played songs and cash-played songs on a jukebox via the exemplary disclosed universal board. The exemplary disclosed system, method, and apparatus may thereby provide a counter (e.g., counter 3405a, 3410a, and/or 3415a) for App songs (e.g., an App-played song for example a song played on a jukebox by a user using a user device such as a smartphone). The counter (e.g., song counter) may be a mobile meter. The exemplary disclosed system, method, and apparatus may track some or all (e.g., any) songs played on a given jukebox. The exemplary disclosed system, method, and apparatus may provide a user with a technique for double-checking an amount of songs that are purchased via app (e.g., in the cloud using an application such as a mobile App) that may have been reported by a jukebox operator (e.g., jukebox company).

In at least some exemplary embodiments, the exemplary disclosed system, method, and apparatus may operate with pool tables that may be mostly mechanical and/or powered by batteries based on their location (e.g., may not be plugged into a power source such as an outlet). The exemplary disclosed system, method, and apparatus may operate using low voltage (e.g., using 5 VDC or any other desired voltage, which may allow an App capability due to a payment device such as Pay Range that may include a low voltage App receiver that runs on 5 VDC or any other desired voltage). For example, when using a 12 volt cell battery, the battery may drop at least 2 volts DC from the battery without harming the battery (e.g., gel cell battery). Payment devices such as Pay Range may operate via the user's internet connection (e.g., the customer's smartphone internet connection). Accordingly, although no internet connection may be provided in the pool table, the exemplary disclosed system using low voltage may operate with the payment device (e.g., Pay Range) and the pool table to start a game for example as described herein. The exemplary disclosed system, method, and apparatus may also operate using the exemplary disclosed meter (e.g., counter 3405a, counter 3410a, and/or counter 3415a) to track games played using the pool table.

Figure 34E:
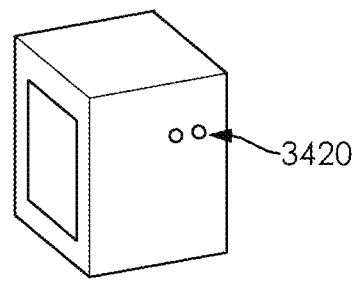
FIG. 34E is a schematic illustration of an exemplary embodiment of the present disclosure.

In at least some exemplary embodiments, the exemplary disclosed system, method, and apparatus may operate with digital jukeboxes. As illustrated in FIGS. 34A-34D, the exemplary disclosed universal board may operate with the exemplary disclosed meter (e.g., switch 3405 including counter 3405a, switch 3410 including counter 3410a, and/or switch 3415 including counter 3415a) such as barcode electrical mechanical meters that may have indicators such as small numbers provided next to barcoded digits (e.g., which may be used to track via an AUX connector). Any suitable song plays may be tracked such as PlayNext, Cash, and/or any App song (e.g., songs played via an app of a user device) paid for and/or given away promotionally on a jukebox. By using the exemplary disclosed board (e.g., BarZcash universal board) with the exemplary disclosed electro-mechanical meters, played songs may be tracked. For example, digital interactive music companies (e.g., TouchTunes) may track some or all played songs at a given jukebox via a visual counter (e.g., a visual electro-mechanical meter such as counter 3405a, 3410a, and/or 3415a). The AUX connector (e.g., AUX input) may be for a signal that is received from another source (e.g., television, tablet, music channel on a cable network, and/or any other input). FIG. 34E illustrates an exemplary AUX input (e.g., input 3420) to which a device may be connected. The exemplary disclosed universal board may track how many minutes the AUX input has been used to receive signals (e.g., including counting a number of songs played). The operator (e.g., of a device such as a jukebox) and/or Juke box providers (e.g., companies) may view (e.g., see) how many songs are played via an AUX RCA input from another output to a jukebox AUX input (e.g., this may be done for customers at a jukebox location to listen to sports events for free at a public location through the jukebox speakers).

In at least some exemplary embodiments, an AUX input (e.g., input 3420) of a device such as a jukebox may be used at the location (e.g., by operators) to play free music from a cable TV channel. However, system owners may prefer for customers to pay the device (e.g., jukebox) for music. The exemplary disclosed board (e.g., BarZcash Universal board) may operate to separate music play from television (e.g., or tablet or cable) broadcasting so that some or any (e.g., substantially all) songs played through the AUX RCA input through the jukebox may be counted and billed (e.g., while having television, tablets, or other devices connected to the AUX input). Operators and music providers (e.g., TouchTunes, AMI, and other music providers and/or record companies, labels, and/or artists of music being played in a public location from a source through the AUX connector of the jukebox) may receive revenue for the music being played (e.g., royalties) based on the songs being tracked (e.g., counted) and billed via the exemplary disclosed system, method, and apparatus. Companies that supply licensed music (e.g., TouchTunes and/or AMI) may thereby bill (e.g., or not bill) a user or operator for songs played via the AUXILIARY RCA input of a device such as a jukebox. That is, the AUX may be used to separate songs that may or may not be billed to a user.

In at least some exemplary embodiments, the exemplary disclosed system, method, and apparatus may track played songs (e.g., any type of song) using an electro-mechanical barcoded meter for music (e.g., any background music) that may be fed through an AUX RCA jack (e.g., input 3420) of a jukebox. For example, the exemplary disclosed system, method, and apparatus may count some or all use of a machine (e.g., every song that has been played or game that has been played) using the exemplary disclosed electro-mechanical meter (e.g., barcoded meter such as switch 3405 including counter 3405a, switch 3410 including counter 3410a, and/or switch 3415 including counter 3415a) based on use that may be cash-paid, App-paid, and/or paid for by any other suitable technique.

In at least some exemplary embodiments, the exemplary disclosed system, method, and apparatus may provide counting of an App song (e.g., song played by using an App via a user device such as a smartphone) played on a digital jukebox and/or an App credit via use of the exemplary disclosed electro-mechanical counters. The exemplary disclosed barcoded meters (e.g., switch 3405 including counter 3405a, switch 3410 including counter 3410a, and/or switch 3415 including counter 3415a) may operate in conjunction with a scannable app program (e.g., an App of a device such as a smartphone having a camera that may be used to read barcodes), which may substantially eliminate human error when reading meters. The exemplary disclosed barcoded meter may provide data of some or substantially all use of a tracked machine (e.g., pool table, jukebox, and/or any other suitable device) made using any suitable type of payment (e.g., App payment by a user device, cash such as coins or bills, credit cards, promotional offers or credits, and/or any other payment type). The exemplary disclosed system, method, and apparatus may provide the number (e.g., a correct number) of App songs played on an operator's device (e.g., jukebox) for example in addition to plays paid for by cash or credit card (e.g., payment directly to the machine).

In at least some exemplary embodiments, the exemplary disclosed system, method, and apparatus may track a PLAY NEXT feature in which a user (e.g., a jukebox customer) may pay extra to skip over other users' songs to have the user's song played first. For example, it may cost a user double the money or more to use this feature. The exemplary disclosed meters (e.g., switch 3405 including counter 3405a, switch 3410 including counter 3410a, and/or switch 3415 including counter 3415a) may track (e.g., count) when this feature is paid for by a user.

In at least some exemplary embodiments, the exemplary disclosed system, method, and apparatus may track a CREDIT feature (e.g., a credit craze feature). With the CREDIT feature, users may receive bonus credits at certain times of the day, but the users will lose the credits if they are not used within a certain time period or before a certain time. Two exemplary disclosed meters (e.g., electro-mechanical counters such as counter 3405a, counter 3410a, and/or counter 3415a) may be used to track the CREDIT feature and/or any other suitable feature providing bonus credits to users. For example, a first meter may be used to track bonus credits provided using the feature, and second meter may be used to deduct credits not used in a timely manner (e.g., per the rules of the feature). For example, the deducted counted number of the second meter may be used to reduce an amount of free credits counted on the first meter to provide a true number of credits (e.g., paid app songs paid for using an App such as an App of a user device). Any other payment or played songs (e.g., including the PLAY NEXT feature) may be included to generate a total revenue from app play (which may be considered in addition to other payment techniques such as credit card or currency payment).

In at least some exemplary embodiments, the exemplary disclosed system, method, and apparatus may include an electrical circuit including the exemplary disclosed universal board and the exemplary disclosed meters (e.g., switch 3405 including counter 3405a, switch 3410 including counter 3410a, and/or switch 3415 including counter 3415a). When the operation of the tracked device is detected (e.g., game or song play), the exemplary disclosed universal board may track the play and the exemplary disclosed meter may count the play. A user may use the exemplary disclosed user device (e.g., smartphone with a camera and an App that may read barcodes) to read the barcodes of the meter to determine data of the amount of use (e.g., plays). The exemplary disclosed system, method, and apparatus may generate a report of use per device location (e.g., locations of pool tables and/or jukeboxes) that may be displayed to a user via a graphical user interface provided by the exemplary disclosed hardware, software, modules, and/or computing devices.

In at least some exemplary embodiments, the exemplary disclosed Universal board may include a data port (e.g., a USB port) that may be connected via an electrical component (e.g., a USB cable) to a tracked device such as a jukebox or pool table (e.g., via a data port of the tracked device) to receive electrical pulses. The electrical pulses may be used to count use (e.g., plays) of the tracked device, which may be counted by the exemplary disclosed electro-mechanical counter. The exemplary disclosed universal board may store data associated with the pulse in a temporary memory of the universal board and may translate the electrical pulses to send to the exemplary disclosed counter (e.g., switch 3405 including counter 3405a, switch 3410 including counter 3410a, and/or switch 3415 including counter 3415a). A user may use the data connection (e.g., USB connection) described above to receive data from the exemplary disclosed universal board (e.g., when a collector takes money out of the tracked machine). The collector may also obtain a correct revenue share from the exemplary disclosed system (e.g., via a barcode scanner and/or viewing numbers of the exemplary disclosed meters that may be mechanical counters). This may provide a user (e.g., a collector) a true number of plays while at the location (e.g., which may be used to deduct from a share of the jukebox collection for a given location owner in which the tracked device is located). Using the exemplary disclosed meter (e.g., barcoded mechanical counter) may provide a user (e.g., collector, operator, and/or location owner) with a technique for double-checking that substantially all machine use is being counted correctly to avoid any errors (e.g., that a jukebox company may have made on an online dashboard). For example related to jukeboxes, the exemplary disclosed switches and counters (e.g., number and bar coded electrical mechanical counters or meters) may be used for tracking some or all App-played songs, PLAY NEXT songs, free songs and/or any other suitable songs that may have been paid for or credited (e.g., as part of a feature or promotion). One or more counters (e.g., counter 3405a, counter 3410a, and/or counter 3415a) may be used. For example, a first counter may track currency (e.g., all cash such as coins and bills). Another counter may track some or all App-played songs (e.g., mobile songs played from a smartphone). Another counter may track features such as PLAY NEXT (e.g., every time a customer paid more money to jump over someone else's song). Another counter may track a total number of songs played by a jukebox so that all other counters taken together may equal that number. The exemplary disclosed system, method, and apparatus may thereby be used to verify (e.g., prove with hard physical evidence) to an operator and/or record company an amount of mobile (e.g., smartphone App) plays, currency plays, PLAY NEXT plays, total number of songs played, and/or any other desired counts. The exemplary disclosed system, method, and apparatus may thereby make digital music licensing revenues transparent to involved parties.

In at least some exemplary embodiments, the exemplary disclosed system, method, and apparatus may track some or substantially all music played through the AUX input (e.g., input 3420) of a machine such as a jukebox. A music provider may contract with a location owner and/or machine owner to charge a fee and/or royalties for music that is played via the AUX input. The exemplary disclosed system, method, and apparatus may thereby provide for royalties to be paid to an artist and/or record companies for music played through the AUX connector (e.g., background music and/or any other desired music or sound).

In at least some exemplary embodiments, the exemplary disclosed system, method, and apparatus may provide for song tracking using the exemplary disclosed meter (e.g., electro-mechanical meter such as switch 3405 including counter 3405a, switch 3410 including counter 3410a, and/or switch 3415 including counter 3415a). The meter may include numbers or numbers and corresponding barcodes that represent respective numbers. The barcode may represent a corresponding number. Both the number and corresponding barcode may be shown through one or more apertures 3418 (e.g., windows) of the meter. The exemplary disclosed meter may track how many App-paid songs (e.g., songs paid for through an App of a user device such as a smartphone or tablet) have been played on a machine such as a jukebox, cash-paid songs, promotional songs, discounted songs, PLAY NEXT songs, and/or auxiliary input songs (e.g., via an AUX such as input 3420) from an outside source. The exemplary disclosed meter may display one or more digits (e.g., and/or barcodes) up to any desired number of places (e.g., 0-9, 0-99, 0-999, 0-9999, and or any other desired amount of number places). Music played through an AUX input (e.g., via input 3420 such as background music) may be timed for how long the music is played (e.g., in a 24 hour period) to create a billable time period. The exemplary disclosed meter (e.g., electro-mechanical meter such as switch 3405 including counter 3405a, switch 3410 including counter 3410a, and/or switch 3415 including counter 3415a) may count hours of music (e.g., each displayed number may represent one hour of background music use).

In at least some exemplary embodiments, the exemplary disclosed system, method, and apparatus may include an electro-mechanical meter that may be scanned by a smartphone that may include a downloadable program that may read barcoded meters. The exemplary disclosed system, method, and apparatus may use data of the read barcodes to produce a collection report that may be viewed on a user device such as a smartphone at a location of the machine (e.g., jukebox or pool table). The exemplary disclosed system, method, and apparatus may also be used for reading devices to obtain an hour meter reading, a water meter, an odometer for any vehicle, wheel mileage meters, gauge reading (e.g., for fluids, gases, and/or solids), electrical pulses, electrical meters, any suitable scale for weight or measurement, and/or any other desired device.

In at least some exemplary embodiments, the exemplary disclosed system, method, and apparatus may include an interface board (e.g., exemplary disclosed Universal board) that may translate computer code of a machine (e.g., a jukebox or pool table) to track plays (e.g., played music or games) on barcoded and/or digit-numbered electro-mechanical meters (e.g., switch 3405 including counter 3405a, switch 3410 including counter 3410a, and/or switch 3415 including counter 3415a). The exemplary disclosed board may count a number of songs played and/or background music played through an AUX input (e.g., input 3420) of a machine (e.g., a jukebox).

In at least some exemplary embodiments, the exemplary disclosed system, method, and apparatus may include coin switches having permanent mechanical meters incorporated into the switch (e.g., switch 3405 including counter 3405a, switch 3410 including counter 3410a, and/or switch 3415 including counter 3415a) that may add one number (e.g., to a count) each time the coin switch and/or any other suitable type of counting is involved. For example, the exemplary disclosed counter may move one digit (e.g., increase one in a count for example from 4 to 5 or from 57 to 58) each time a member (e.g., mechanical member 3426 such as a mechanical arm) of the switch moves downward as a coin passes on top of it. The movement of the arm of the switch may turn the digit one number and may also close an electrical circuit (e.g., the exemplary disclosed electrical circuit for example as described herein). The switch may control the circuit to switch from normally open to common, and then to normally closed and to common. For example, the switch may have more than one set of poles (e.g., NC, NO, and common). The exemplary disclosed system and method may operate similarly when adding barcoded numbers to the same coin switches.

In at least some exemplary embodiments, the exemplary disclosed system, method, and apparatus may be used with existing meters on machines to be tracked (e.g., amusement devices such as jukeboxes and pool tables, rental equipment, forklifts, mileage meters, water meters, gas meters, electric meters, and/or any other desired type of meter). For example, the existing meter may be a mileage meter for rental trailers, tractor trailers, and/or any other desired type of rental equipment. Barcodes may be added to the existing meter. For example, a barcode may be added to each number or digit of an existing meter. The meter may then be read by a user device (e.g., smartphone having a camera and barcode-reading app) for example as described herein. A correct reading of that meter may therefore be obtained by any user (e.g., an operator associated with a music provider, amusement device company or owner, a rental company, a utility company, and/or any other suitable company or organization).

Figure 35:
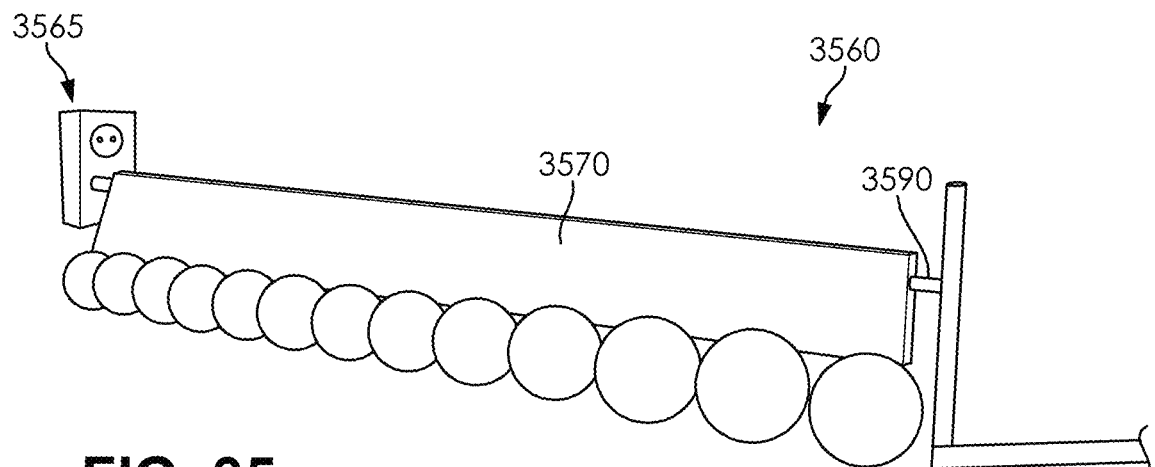
FIG. 35 is a perspective illustration of an exemplary embodiment of the present disclosure.
Figure 36A:
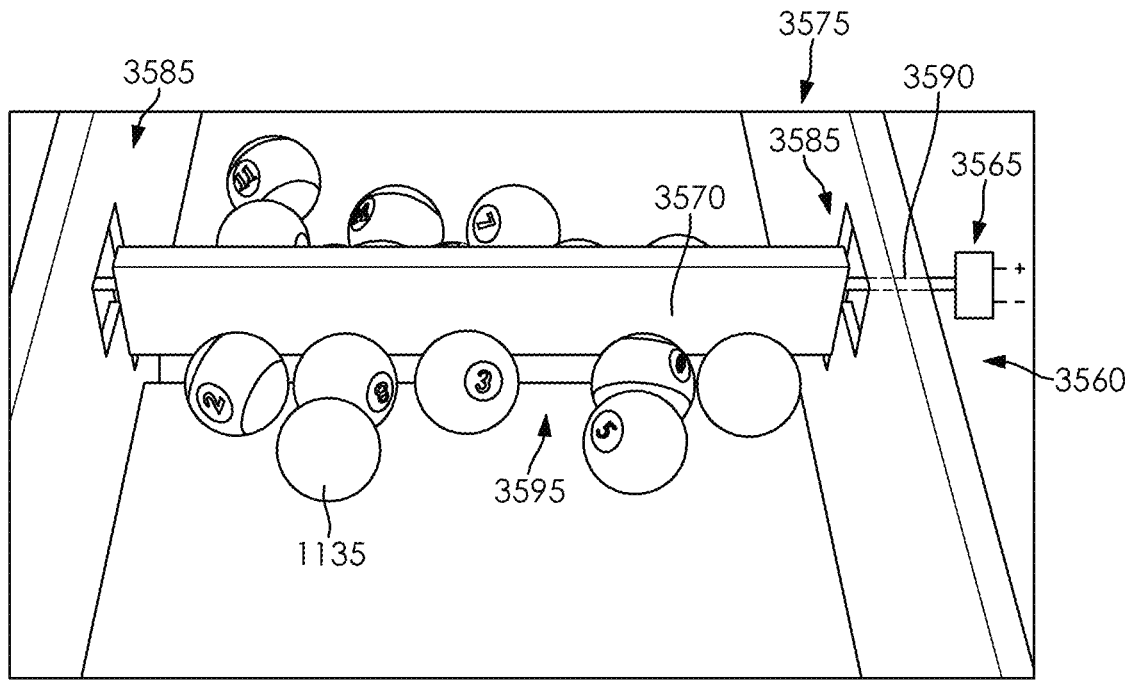
FIG. 36A is a perspective illustration of an exemplary embodiment of the present disclosure.
Figure 36B:
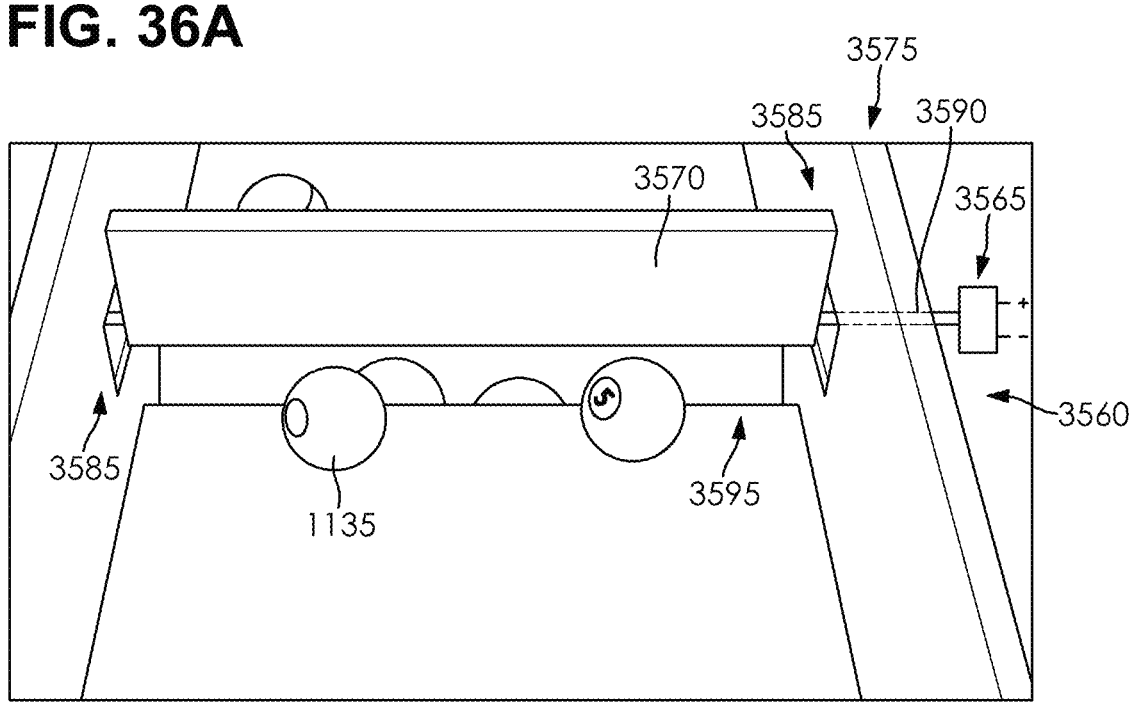
FIG. 36B is a perspective illustration of an exemplary embodiment of the present disclosure.

FIGS. 35, 36A, and 36B illustrate another exemplary embodiment of the exemplary disclosed system, method, and apparatus. An actuating assembly 3560 that may be generally similar to actuating assembly 1360 may be attached to a structural frame 3575 that may be similar to structural frame 1375 disposed inside of assembly 1305. Actuating assembly 3560 may include one or more electrical actuators 3565, which may be similar to electrical actuators 1365, and a structural member 3570 that may be similar to structural member 1130. Electrical actuator 3565 may be a DC motor of any suitable voltage (e.g., 12 VDC or 24 VDC). In at least some exemplary embodiments, actuating assembly 3560 may provide structural member 3570 as a trap bar for example as described below.

As described for example herein, tracking system 1310 may include an electric relay 1312 that may be similar to electric relay 325 and that may be connected to actuating assembly 3560. Actuating assembly 3560 may operate with tracking device 1314 and electric relay 1312 similarly to actuating assembly 1360 for example as described above. Structural member 3570 may be attached to structural frame 3575 similarly to the attachment of structural member 1370 for example as described herein. End portions of a support member 3590 (e.g., or one or more support members 3590) may be disposed through apertures 3585 of structural frame 3575 for example as illustrated in FIGS. 36A and 36B. Support member 3590 may be attached to or integrally formed with structural member 3570 by any suitable technique for example as described above regarding actuating assembly 1360. Apertures 3585 may be elongated apertures (e.g., slots) that may be configured to receive end portions of support member 3590. End portions at both sides of structural member 3570 and support member 3590 may be received in apertures 3585 disposed for example on opposite sides of structural frame 3575. Apertures 3585 may be provided and aligned similarly to aperture 1385 described above. For example as illustrated in FIGS. 35, 36A, and 36B, electrical actuator 3565 (e.g., or one or more electrical actuators 3565) may be attached to both sides of structural frame 3575 via any suitable technique such as via fasteners (e.g., bolts, screws, or nails), adhesive, and/or any other suitable technique. Actuators 3565 may also be any other suitable type of actuators such as hydraulic or pneumatic devices. Electrical actuators 3565 may operate to rotate support member 3590 and/or structural member 3570 as described below.

As illustrated in FIGS. 36A and 36B, structural member 3570 may be disposed above an elongated slot 3595 that may be similar to elongated slot 1395 of assembly 1305. Elongated slot 3595 may be for example a slot for allowing pool balls to return to a storage cavity of an assembly that may be similar to assembly 1305 for retrieval by users of assembly 1305 (e.g., a slot to allow pool balls to return to a container from which players may retrieve the pool balls for play).

In at least some exemplary embodiments, actuating assembly 3560 may operate to selectively trap billiard balls in a pool table. Electrical actuator 3565 may operate to rotate support member 3590 and/or structural member 3570 by any desired angle (e.g., 180 degrees or 90 degrees). For example, electrical actuator 3565 may operate to rotate structural member 3570 between a first position blocking objects 1135 (e.g., billiard balls) from falling into elongated slot 3595 for example as illustrated in FIG. 36A and a second position allowing objects 1135 to fall or drop into elongated slot 3595 for example as illustrated in FIG. 36B. For example, structural member 3570 may act as a trap gate that may be rotated open for a predetermined period (e.g., a short period) of time to the position of FIG. 36B to allow some or all objects 1135 to be released (e.g., fall through elongated slot 3595). Structural member 3570 may remain in the position illustrated in FIG. 36B (e.g., an open position) to allow objects 1135 to drop for any desired time period of a pool game. Structural member 3570 may include a sweeping brush (e.g., attached to or integrated into a bottom portion of structural member 3570) to clear out debris that may build up in the ball track area and/or to prevent objects 1135 from getting stuck in the track (e.g., surface of structural frame 3575 on which objects 1135 roll). Structural member 3570 may remain in the open position illustrated in FIG. 36B for any desired period of time to allow objects 1135 to roll through (e.g., drop into) elongated slot 3595 and into play (e.g., similar to as described herein regarding elongated slot 1395). One or more electrical actuators 3565 may then move structural member 3570 to the closed position illustrated in FIG. 36A after the desired period of time has elapsed. For example, structural member 3570 may be maintained in an open position as illustrated in FIG. 36B for any desired period of time (e.g., during a predetermined period of time for open or league play) so that a select object 1135 (e.g., a cue ball) may be allowed to remain in play (e.g., by repeatedly dropping into elongated slot 3595 during the desired period of time). The exemplary disclosed system, method, and apparatus may thereby operate without a cue ball separator (e.g., during a predetermined time period that may define open play, pre-paid play, league play, or any other desired play).

In at least some exemplary embodiments, structural member 3570 may be attached to support member 3590 so that structural member 3570 is in a relatively lower position blocking objects 1135 when in the closed position illustrated in FIG. 36A and is in a relatively higher position allowing objects 1135 to pass under structural member 3570 when in the open position illustrated in FIG. 36B (e.g., structural member 3570 may be disposed off-center from a centerline of support member 3590). In at least some exemplary embodiments, electrical actuator 3565 may rotate structural member 3570 counterclockwise from the closed position illustrated in FIG. 36A to the open position illustrated in FIG. 36B. Also in at least some exemplary embodiments, electrical actuator 3565 may rotate structural member 3570 counterclockwise from the open position illustrated in FIG. 36B to the closed position illustrated in FIG. 36A.

In at least some exemplary embodiments, when structural member 3570 is in the closed position for example as illustrated in FIG. 36A, structural member 3570 may retain objects 1135 (e.g., pool balls) and prevent them from falling through elongated slot 3595 and returning to users (e.g., to a ball-drop box). When structural member 3570 is in the open position for example as illustrated in FIG. 36B, structural member 3570 may allow objects 1135 (e.g., pool balls) to fall through elongated slot 3595 and return to users. Actuating assembly 3560 including structural member 3570 may thereby be provided in a new assembly 1305 or added to an existing assembly 1305 to selectively allow and block objects 1135 from returning to a user-accessible cavity of assembly 1305.

In at least some exemplary embodiments, a motorized ball gate (e.g., actuating assembly 3560 including structural member 3570) may be provided for some or all suitable styles of pool tables (e.g., billiard tables). The gate may selectively prevent objects 1135 such as balls from being used (e.g., in play) on a pool table. The gate may rotate (e.g., open up) 180 degrees to allow balls to pass under the gate to have the pool balls return to play for the customer. This may occur for 15 minutes, 30 minutes, 60 minutes, or any other desired period of time (e.g., that may be programmed using the exemplary disclosed Universal Board and/or module). Once the period of time has elapsed, the exemplary disclosed actuator (e.g., electrical actuator 3565 such as a motor) may rotate the exemplary disclosed gate (e.g., 180 degrees) to block the balls from returning to play.

In at least some exemplary embodiments, the exemplary disclosed system, method, and apparatus may control a motorized ball gate (e.g., actuating assembly 3560 including structural member 3570) for a timed pool or billiards game, without involving a cue ball separator to vend a game of pool or billiards. Some or all objects 1135 (e.g., pool or billiard balls) may be held in a portion (e.g., center) of a table and released at the same time. All balls (e.g., including a cue ball) may be able to pass through the ball gate (e.g., based on being positioned in the open position as illustrated in FIG. 36B) until a period of time of play has elapsed. When the desired time period has elapsed, some or all balls (e.g., including the cue ball) may be trapped in the pool table (e.g., in the center of the pool table). Structural member 1130, structural member 1370, and/or structural member 1470 may operate generally similarly to the exemplary disclosed operation of structural member 3570.

In at least some exemplary embodiments, structural member 3570 may be configured as a trap door that may selectively cover elongated slot 3595. Electrical actuator 3565 may actuate structural member 3570 to slide back and forth to selectively cover elongated slot 3595 and to selectively allow movement and block movement of objects 1135 through elongated slot 3595. Structural member 3570 may selectively allow movement and block movement to control play based on a desired time period for example as described above.

In at least some exemplary embodiments, the exemplary disclosed electro-mechanical device may include an electrical switch (e.g., switch 3405, switch 3410, or switch 3415) and a mechanical meter (e.g., counter 3405*a*, counter 3410*a*, or counter 3415*a*) operably connected to the electrical switch. The mechanical meter may include at least one aperture. The mechanical meter may include at least one movable member having at least one of a plurality of barcodes or a plurality of characters. The at least one of the plurality of barcodes or the plurality of characters may be selectively visible through the at least one aperture. The at least one movable member may include both the plurality of barcodes and the plurality of characters that may be numbers. Each barcode of the plurality of barcodes may be disposed beside and may correspond to each number of the plurality of characters. The mechanical meter may include a mechanical arm and the at least one movable member may be configured to move based on an actuation of the mechanical arm. The electrical switch may operate based on the actuation of the mechanical arm. The electrical switch may only operate when the mechanical arm actuates. The at least one movable member may be a rotatable member that may be configured to move based on an actuation of a mechanical arm of the mechanical meter. The electrical switch may operate based on the actuation of the mechanical arm. The mechanical meter may be a coin meter and the mechanical arm may be configured to be actuated based on a coin contacting the mechanical arm. The electro-mechanical device may be electrically connected to an operation assembly of a jukebox or a billiards table. The electro-mechanical device may be electrically connected to an operation assembly of a billiards table. The operation assembly may include a rotatable member that may be disposed above an elongated slot of the billiards table and may selectively allow and block movement of pool balls through the elongated slot based on a rotation of the rotatable member. The electro-mechanical device may be electrically connected to an operation assembly of at least one selected from the group of a water meter, a gas meter, an electric meter, an odometer of a vehicle, a wheel mileage meter, and combinations thereof.

In at least some exemplary embodiments, the exemplary disclosed method may include providing an electrical switch (e.g., switch 3405, switch 3410, or switch 3415), providing a mechanical meter (e.g., counter 3405*a*, counter 3410*a*, or counter 3415*a*) including at least one aperture and at least one movable member having a plurality of barcodes, selectively displaying the plurality of barcodes through the at least one aperture based on moving the at least one movable member, and actuating the electrical switch based on moving the at least one movable member. The exemplary disclosed method may also include moving the at least one movable member based on actuating a mechanical arm of the mechanical meter when a coin contacts the mechanical arm. The exemplary disclosed method may further include scanning at least one of the plurality of barcodes when it is visible through the at least one aperture using a user device. The exemplary disclosed method may also include displaying data based on the scanning of the least one of the plurality of barcodes using a graphical user interface of the user device. The exemplary disclosed method may further include electrically connecting the electrical switch to an operation assembly. The data may include a number of operations of the operation assembly counted by the mechanical meter, the number of operations of the operation assembly being equal to a number of actuations of the electrical switch. The exemplary disclosed method may further include electrically connecting the electrical switch to an operation assembly of a jukebox. The data may include a number of songs paid for based on data transfer between one or more user devices and the jukebox. The exemplary disclosed method may also include electrically connecting the electrical switch to an operation assembly of a jukebox. The data may include an amount of music provided from an external music-playing device to the jukebox via an AUX input of the jukebox. The exemplary disclosed method may further include electrically connecting the electrical switch to an operation assembly. The operation assembly may be of at least one selected from the group of a juke box, a billiards table, a water meter, a gas meter, an electric meter, an odometer of a vehicle, a wheel mileage meter, and combinations thereof. The exemplary disclosed method may also include electrically connecting the electrical switch to an operation assembly of a billiards table, and rotating a rotatable member of the operation assembly between a first position blocking a movement of billiard balls through an elongated slot of the billiards table and a second position allowing the movement of the billiard balls through the elongated slot based on the actuating of the electrical switch.

In at least some exemplary embodiments, the exemplary disclosed apparatus may include an electrical switch (e.g., switch 3405, switch 3410, or switch 3415), a mechanical meter (e.g., counter 3405*a*, counter 3410*a*, or counter 3415*a*) operably connected to the electrical switch, and an operation assembly of a jukebox electrically connected to the electrical switch. The mechanical meter may include at least one aperture. The mechanical meter may include a first movable member having a first plurality of barcodes and a corresponding first plurality of characters. The mechanical meter may include a second movable member having a second plurality of barcodes and a corresponding second plurality of characters. The first plurality of barcodes and the corresponding first plurality of characters may be selectively visible through a first portion of the at least one aperture. The second plurality of barcodes and the corresponding second plurality of characters may be selectively visible through a second portion of the at least one aperture.

In at least some exemplary embodiments, the exemplary disclosed operation assembly for a game assembly may include an actuating assembly (e.g., actuating assembly 1360 or actuating assembly 1460), an electric relay that is electrically connected to the actuating assembly, a tracking device that is electrically connected to the electric relay, and a display assembly (e.g., display assembly 1320 or display assembly 1420) that is selectively electrically connected to the electric relay. The display assembly may be configured to transfer an electrical pulse from the display assembly to the tracking device via the electric relay. The actuating assembly may perform an operation when the electrical pulse is transferred to the tracking device. The operation may include activating one or more actuators of the actuating assembly to move a structural member of the actuating assembly. The structural member may be disposed at an elongated slot of the game assembly. The game assembly may be a pool table and the structural member may be a trap bar configured to selectively block pool balls of the pool table from falling into the elongated slot. The display assembly may include an actuator configured to transfer the electrical pulse when actuated by a user. The tracking device may count the electrical pulse. The tracking device may provide a timing circuit for use of the machine for a time period that begins when the electrical pulse is transferred to the tracking device. The exemplary disclosed operation assembly may also include a charging assembly that may be configured to charge one or more user electric devices for a predetermined time period beginning when the actuating assembly performs the operation. The exemplary disclosed operation assembly may further include a sensor assembly that is configured to emit a warning or an alarm when a sensor of the sensor assembly detects a presence of a playing component on the game assembly before the actuating assembly performs the operation. The elongated slot may include one or more structural assemblies that divide the elongated slot into a plurality of separate slot portions configured to separately transfer pool balls when the game assembly is a pool table. The exemplary disclosed operation assembly may also include a plurality of members each having an aperture and configured to support end portions of the structural member on a structural frame of the game assembly, each aperture being elongated to guide a vertical movement of the structural member up and down relative to the structural frame.

In at least some exemplary embodiments, the exemplary disclosed method may include providing an operation assembly (e.g., operation assembly 315) of a game machine, connecting an electric relay (e.g., relay 325) to the operation assembly, connecting a tracking device (e.g., tracing device 335) to the electric relay, selectively connecting a display assembly (e.g., display assembly 320, display assembly 520, or display assembly 620) to the electric relay, transferring an electrical pulse from the display assembly to the tracking device via the electric relay, actuating the operation assembly when the electrical pulse is received by the tracking device, counting the electrical pulse with the tracking device, and activating an indicator of the display assembly when the electrical pulse is received by the tracking device. The electrical pulse may be transferred from the display assembly to the tracking device via the electric relay when an actuator of the display assembly is actuated. The exemplary disclosed method may further include transferring a second electrical pulse from the display assembly to the tracking device via the electric relay when the actuator of the display assembly is again actuated, actuating the operation assembly when the second electrical pulse is received by the tracking device, and counting the second electrical pulse with the tracking device. The exemplary disclosed method may further include deactivating the indicator of the display assembly and activating a second indicator of the display assembly when the second electrical pulse is received by the tracking device. The exemplary disclosed method may further include deactivating the indicator of the display assembly when a predetermined time period has elapsed. The operation assembly may include a pool table switch that releases at least one playing object that is a plurality of pool balls of the game machine that is a pool table. The operation assembly may include a mechanical push slot of the game machine that is a pool table.

The exemplary disclosed system, method, and apparatus may provide an efficient and effective technique for tracking each initiation of machine game play (e.g., release of pool balls) during any desired period such as a league play period or free play period. The exemplary disclosed system, method, and apparatus may also allow audits of a machine such as a pool table to be viewed online via an operation of the system. The exemplary disclosed system, method, and apparatus may also allow advertisements to be displayed and sold on the exemplary application to sponsor pool league players. The exemplary disclosed system, method, and apparatus may also allow discounted games to be offered to desired users such as pool league players.

An illustrative representation of a computing device appropriate for use with embodiments of the system of the present disclosure is shown in FIG. 37. The computing device 100 can generally be comprised of a Central Processing Unit (CPU, 101), optional further processing units including a graphics processing unit (GPU), a Random Access Memory (RAM, 102), a mother board 103, or alternatively/additionally a storage medium (e.g., hard disk drive, solid state drive, flash memory, cloud storage), an operating system (OS, 104), one or more application software 105, a display element 106, and one or more input/output devices/means 107, including one or more communication interfaces (e.g., RS232, Ethernet, Wifi, Bluetooth, USB). Useful examples include, but are not limited to, personal computers, smart phones, laptops, mobile computing devices, tablet PCs, and servers. Multiple computing devices can be operably linked to form a computer network in a manner as to distribute and share one or more resources, such as clustered computing devices and server banks/farms.

Various examples of such general-purpose multi-unit computer networks suitable for embodiments of the disclosure, their typical configuration and many standardized communication links are well known to one skilled in the art, as explained in more detail and illustrated by FIG. 38, which is discussed herein-below.

According to an exemplary embodiment of the present disclosure, data may be transferred to the system, stored by the system and/or transferred by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present disclosure are contemplated for use with any configuration.

In general, the system and methods provided herein may be employed by a user of a computing device whether connected to a network or not. Similarly, some steps of the methods provided herein may be performed by components and modules of the system whether connected or not. While such components/modules are offline, and the data they generated will then be transmitted to the relevant other parts of the system once the offline component/module comes again online with the rest of the network (or a relevant part thereof). According to an embodiment of the present disclosure, some of the applications of the present disclosure may not be accessible when not connected to a network, however a user or a module/component of the system itself may be able to compose data offline from the remainder of the system that will be consumed by the system or its other components when the user/offline system component or module is later connected to the system network.

Referring to FIG. 38, a schematic overview of a system in accordance with an embodiment of the present disclosure is shown. The system is comprised of one or more application servers 203 for electronically storing information used by the system. Applications in the server 203 may retrieve and manipulate information in storage devices and exchange information through a WAN 201 (e.g., the Internet). Applications in server 203 may also be used to manipulate information stored remotely and process and analyze data stored remotely across a WAN 201 (e.g., the Internet).

According to an exemplary embodiment, as shown in FIG. 38, exchange of information through the WAN 201 or other network may occur through one or more high speed connections. In some cases, high speed connections may be over-the-air (OTA), passed through networked systems, directly connected to one or more WANs 201 or directed through one or more routers 202. Router(s) 202 are completely optional and other embodiments in accordance with the present disclosure may or may not utilize one or more routers 202. One of ordinary skill in the art would appreciate that there are numerous ways server 203 may connect to WAN 201 for the exchange of information, and embodiments of the present disclosure are contemplated for use with any method for connecting to networks for the purpose of exchanging information. Further, while this application refers to high speed connections, embodiments of the present disclosure may be utilized with connections of any speed.

Components or modules of the system may connect to server 203 via WAN 201 or other network in numerous ways. For instance, a component or module may connect to the system i) through a computing device 212 directly connected to the WAN 201, ii) through a computing device 205, 206 connected to the WAN 201 through a routing device 204, iii) through a computing device 208, 209, 210 connected to a wireless access point 207 or iv) through a computing device 211 via a wireless connection (e.g., CDMA, GMS, 3G, 4G) to the WAN 201. One of ordinary skill in the art will appreciate that there are numerous ways that a component or module may connect to server 203 via WAN 201 or other network, and embodiments of the present disclosure are contemplated for use with any method for connecting to server 203 via WAN 201 or other network. Furthermore, server 203 could be comprised of a personal computing device, such as a smartphone, acting as a host for other computing devices to connect to.

The communications means of the system may be any means for communicating data, including image and video, over one or more networks or to one or more peripheral devices attached to the system, or to a system module or component. Appropriate communications means may include, but are not limited to, wireless connections, wired connections, cellular connections, data port connections, Bluetooth® connections, near field communications (NFC) connections, or any combination thereof. One of ordinary skill in the art will appreciate that there are numerous communications means that may be utilized with embodiments of the present disclosure, and embodiments of the present disclosure are contemplated for use with any communications means.

Turning now to FIG. 39, a continued schematic overview of a cloud-based system in accordance with an embodiment of the present invention is shown. In FIG. 39, the cloud-based system is shown as it may interact with users and other third party networks or APIs. For instance, a user of a mobile device 801 may be able to connect to application server 802. Application server 802 may be able to enhance or otherwise provide additional services to the user by requesting and receiving information from one or more of an external content provider API/website or other third party system 803, a constituent data service 804, one or more additional data services 805 or any combination thereof. Additionally, application server 802 may be able to enhance or otherwise provide additional services to an external content provider API/website or other third party system 803, a constituent data service 804, one or more additional data services 805 by providing information to those entities that is stored on a database that is connected to the application server 802. One of ordinary skill in the art would appreciate how accessing one or more third-party systems could augment the ability of the system described herein, and embodiments of the present invention are contemplated for use with any third-party system.

Traditionally, a computer program includes a finite sequence of computational instructions or program instructions. It will be appreciated that a programmable apparatus or computing device can receive such a computer program and, by processing the computational instructions thereof, produce a technical effect.

A programmable apparatus or computing device includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computing device can include any and all suitable combinations of at least one general purpose computer, special-purpose computer, programmable data processing apparatus, processor, processor architecture, and so on. It will be understood that a computing device can include a computer-readable storage medium and that this medium may be internal or external, removable and replaceable, or fixed. It will also be understood that a computing device can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the disclosure as claimed herein could include an optical computer, quantum computer, analog computer, or the like.

Regardless of the type of computer program or computing device involved, a computer program can be loaded onto a computing device to produce a particular machine that can perform any and all of the depicted functions. This particular machine (or networked configuration thereof) provides a technique for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Illustrative examples of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A data store may be comprised of one or more of a database, file storage system, relational data storage system or any other data system or structure configured to store data. The data store may be a relational database, working in conjunction with a relational database management system (RDBMS) for receiving, processing and storing data. A data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software components or modules, or as components or modules that employ external routines, code, services, and so forth, or any combination of these. All such implementations are within the scope of the present disclosure. In view of the foregoing, it will be appreciated that elements of the block diagrams and flowchart illustrations support combinations of means for performing the specified functions, combinations of steps for performing the specified functions, program instruction technique for performing the specified functions, and so on.

It will be appreciated that computer program instructions may include computer executable code. A variety of languages for expressing computer program instructions are possible, including without limitation C, C++, Java, JavaScript, assembly language, Lisp, HTML, Perl, and so on. Such languages may include assembly languages, hardware description languages, database programming languages, functional programming languages, imperative programming languages, and so on. In some embodiments, computer program instructions can be stored, compiled, or interpreted to run on a computing device, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computing device enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computing device can process these threads based on priority or any other order based on instructions provided in the program code.

Unless explicitly stated or otherwise clear from the context, the verbs "process" and "execute" are used interchangeably to indicate execute, process, interpret, compile, assemble, link, load, any and all combinations of the foregoing, or the like. Therefore, embodiments that process computer program instructions, computer-executable code, or the like can suitably act upon the instructions or code in any and all of the ways just described.

The functions and operations presented herein are not inherently related to any particular computing device or other apparatus. Various general-purpose systems may also be used with programs in accordance with the teachings herein, or it may prove convenient to construct more specialized apparatus to perform the required method steps. The required structure for a variety of these systems will be apparent to those of ordinary skill in the art, along with equivalent variations. In addition, embodiments of the disclosure are not described with reference to any particular programming language. It is appreciated that a variety of programming languages may be used to implement the present teachings as described herein, and any references to specific languages are provided for disclosure of enablement and best mode of embodiments of the disclosure. Embodiments of the disclosure are well suited to a wide variety of computer network systems over numerous topologies. Within this field, the configuration and management of large networks include storage devices and computing devices that are communicatively coupled to dissimilar computing and storage devices over a network, such as the Internet, also referred to as "web" or "world wide web".

In at least some exemplary embodiments, the exemplary disclosed system may utilize sophisticated machine learning and/or artificial intelligence techniques to prepare and submit datasets and variables to cloud computing clusters and/or other analytical tools (e.g., predictive analytical tools) which may analyze such data using artificial intelligence neural networks. The exemplary disclosed system may for example include cloud computing clusters performing predictive analysis. For example, the exemplary neural network may include a plurality of input nodes that may be interconnected and/or networked with a plurality of additional and/or other processing nodes to determine a predicted result. Exemplary artificial intelligence processes may include filtering and processing datasets, processing to simplify datasets by statistically eliminating irrelevant, invariant or superfluous variables or creating new variables which are an amalgamation of a set of underlying variables, and/or processing for splitting datasets into train, test and validate datasets using at least a stratified sampling technique. The exemplary disclosed system may utilize prediction algorithms and approach that may include regression models, tree-based approaches, logistic regression, Bayesian methods, deep-learning and neural networks both as a stand-alone and on an ensemble basis, and final prediction may be based on the model/structure which delivers the highest degree of accuracy and stability as judged by implementation against the test and validate datasets.

Throughout this disclosure and elsewhere, block diagrams and flowchart illustrations depict methods, apparatuses (e.g., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "component", "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present disclosure are contemplated for use with any language.

While multiple embodiments are disclosed, still other embodiments of the present disclosure will become apparent to those skilled in the art from this detailed description. There may be aspects of this disclosure that may be practiced without the implementation of some features as they are described. It should be understood that some details have not been described in detail in order to not unnecessarily obscure the focus of the disclosure. The disclosure is capable of myriad modifications in various obvious aspects, all without departing from the spirit and scope of the present disclosure. Accordingly, the drawings and descriptions are to be regarded as illustrative rather than restrictive in nature.

What is claimed is:

1. An electro-mechanical device, comprising:
an electrical switch; and
a mechanical meter operably connected to the electrical switch;
wherein the mechanical meter includes at least one aperture;
wherein the mechanical meter includes at least one movable member having at least one of a plurality of barcodes or a plurality of characters; and
wherein the at least one of the plurality of barcodes or the plurality of characters is selectively visible through the at least one aperture.

2. The electro-mechanical device of claim 1, wherein:
the at least one movable member includes both the plurality of barcodes and the plurality of characters that are numbers; and
each barcode of the plurality of barcodes is disposed beside and corresponds to each number of the plurality of characters.

3. The electro-mechanical device of claim 1, wherein the mechanical meter includes a mechanical arm and the at least one movable member is configured to move based on an actuation of the mechanical arm.

4. The electro-mechanical device of claim 3, wherein the electrical switch operates based on the actuation of the mechanical arm.

5. The electro-mechanical device of claim 3, wherein the electrical switch only operates when the mechanical arm actuates.

6. The electro-mechanical device of claim 1, wherein:
the at least one movable member is a rotatable member that is configured to move based on an actuation of a mechanical arm of the mechanical meter; and
the electrical switch operates based on the actuation of the mechanical arm.

7. The electro-mechanical device of claim 6, wherein the mechanical meter is a coin meter and the mechanical arm is configured to be actuated based on a coin contacting the mechanical arm.

8. The electro-mechanical device of claim 1, wherein the electro-mechanical device is electrically connected to an operation assembly of a jukebox or a billiards table.

9. The electro-mechanical device of claim 1, wherein:
the electro-mechanical device is electrically connected to an operation assembly of a billiards table; and
the operation assembly includes a rotatable member that is disposed above an elongated slot of the billiards table and selectively allows and blocks movement of pool balls through the elongated slot based on a rotation of the rotatable member.

10. The electro-mechanical device of claim 1, wherein the electro-mechanical device is electrically connected to an operation assembly of at least one selected from the group of a water meter, a gas meter, an electric meter, an odometer of a vehicle, a wheel mileage meter, and combinations thereof.

11. A method, comprising:
providing an electrical switch;
providing a mechanical meter including at least one aperture and at least one movable member having a plurality of barcodes;
selectively displaying the plurality of barcodes through the at least one aperture based on moving the at least one movable member; and
actuating the electrical switch based on moving the at least one movable member.

12. The method of claim 11, further comprising moving the at least one movable member based on actuating a mechanical arm of the mechanical meter when a coin contacts the mechanical arm.

13. The method of claim 11, further comprising scanning at least one of the plurality of barcodes when it is visible through the at least one aperture using a user device.

14. The method of claim 13, further comprising displaying data based on the scanning of the least one of the plurality of barcodes using a graphical user interface of the user device.

15. The method of claim 14, further comprising electrically connecting the electrical switch to an operation assembly;
wherein the data includes a number of operations of the operation assembly counted by the mechanical meter, the number of operations of the operation assembly being equal to a number of actuations of the electrical switch.

16. The method of claim 14, further comprising electrically connecting the electrical switch to an operation assembly of a jukebox;
wherein the data includes a number of songs paid for based on data transfer between one or more user devices and the jukebox.

17. The method of claim 14, further comprising electrically connecting the electrical switch to an operation assembly of a jukebox;
wherein the data includes an amount of music provided from an external music-playing device to the jukebox via an AUX input of the jukebox.

18. The method of claim 11, further comprising electrically connecting the electrical switch to an operation assembly;
wherein the operation assembly is of at least one selected from the group of a juke box, a billiards table, a water meter, a gas meter, an electric meter, an odometer of a vehicle, a wheel mileage meter, and combinations thereof.

19. The method of claim 11, further comprising:
electrically connecting the electrical switch to an operation assembly of a billiards table; and
rotating a rotatable member of the operation assembly between a first position blocking a movement of billiard balls through an elongated slot of the billiards table and a second position allowing the movement of the billiard balls through the elongated slot based on the actuating of the electrical switch.

20. An apparatus, comprising:
an electrical switch;
a mechanical meter operably connected to the electrical switch;
an operation assembly of a jukebox electrically connected to the electrical switch;
wherein the mechanical meter includes at least one aperture;
wherein the mechanical meter includes a first movable member having a first plurality of barcodes and a corresponding first plurality of characters;
wherein the mechanical meter includes a second movable member having a second plurality of barcodes and a corresponding second plurality of characters;
wherein the first plurality of barcodes and the corresponding first plurality of characters are selectively visible through a first portion of the at least one aperture; and
wherein the second plurality of barcodes and the corresponding second plurality of characters are selectively visible through a second portion of the at least one aperture.

* * * * *